(12) United States Patent
Tillotson et al.

(10) Patent No.: US 10,797,989 B2
(45) Date of Patent: Oct. 6, 2020

(54) SCALABLE VIRTUAL TRAFFIC HUB INTERCONNECTING ISOLATED NETWORKS

(71) Applicant: Amazon Technologies, Inc., Seattle, WA (US)

(72) Inventors: Paul John Tillotson, Herndon, VA (US); Bashuman Deb, Aldie, VA (US); Thomas Spendley, Rockville, MD (US); Omer Hashmi, Chevy Chase, MD (US); Baihu Qian, Herndon, VA (US); Alexander Justin Penney, Falls Church, VA (US)

(73) Assignee: Amazon Technologies, Inc., Seattle, WA (US)

( * ) Notice: Subject to any disclaimer, the term of this patent is extended or adjusted under 35 U.S.C. 154(b) by 177 days.

(21) Appl. No.: 16/136,137

(22) Filed: Sep. 19, 2018

(65) Prior Publication Data

US 2020/0092193 A1    Mar. 19, 2020

(51) Int. Cl.
*H04L 12/715* (2013.01)
*H04L 12/713* (2013.01)
(Continued)

(52) U.S. Cl.
CPC ........ *H04L 45/04* (2013.01); *G06F 16/24573* (2019.01); *H04L 45/02* (2013.01);
(Continued)

(58) Field of Classification Search
CPC ............. H04B 7/18589; G06F 9/45558; G06F 16/24573; H04L 41/08; H04L 41/02; H04L 45/04; H04L 45/14; H04L 45/586; H04L 47/70; H04L 47/2483; H04L 49/70; H04L 49/355; H04L 49/3009; H04L 61/256;
(Continued)

(56) References Cited

U.S. PATENT DOCUMENTS 6,993,021 B1   1/2006  Chuah et al.
7,782,782 B1   8/2010  Ferguson et al.
(Continued)

FOREIGN PATENT DOCUMENTS

EP    3340064    6/2018
FR    3059796    6/2018

OTHER PUBLICATIONS

Yanfang Le et al, "Uno: Unifying Host and Smart NIC Offload for Flexible Packet Processing", dated Sep. 27, 2017, pp. 506-519.
(Continued)

*Primary Examiner* — Walter J Divito
*Assistant Examiner* — Dharmesh J Patel
(74) *Attorney, Agent, or Firm* — Robert C. Kowert; Kowert, Hood, Munyon, Rankin & Goetzel, P.C.

(57) ABSTRACT

Metadata indicating that an action implementation node and a routing decision master node have been assigned to a virtual traffic hub programmatically associated with one or more isolated networks is stored. The routing decision master node determines a first action to be implemented for packets of a network flow using state information of the isolated networks, and provides a representation of a first action to the first action implementation node. Based on performing the first action at the action implementation node, contents of a data packet received from one isolated network are transmitted to another isolated network.

20 Claims, 40 Drawing Sheets

(51) Int. Cl.
  *H04L 12/751* (2013.01)
  *H04L 29/12* (2006.01)
  *H04L 12/851* (2013.01)
  *G06F 16/2457* (2019.01)
  *H04L 12/46* (2006.01)

(52) U.S. Cl.
  CPC ........ *H04L 45/586* (2013.01); *H04L 47/2483* (2013.01); *H04L 61/256* (2013.01); *H04L 12/4633* (2013.01)

(58) Field of Classification Search
  CPC ............. H04L 61/1511; H04L 61/2503; H04L 61/2507; H04L 61/2592; H04L 63/029; H04L 63/0209; H04L 63/0272; H04L 63/0428; H04L 63/0471; H04L 2012/6443; H04L 2012/6472; H04L 12/2856; H04L 12/2874; H04L 12/2898; H04L 12/4633; H04L 12/4641; H04Q 3/0045
  See application file for complete search history.

(56) References Cited

U.S. PATENT DOCUMENTS

| | | | |
|---|---|---|---|
| 7,865,586 | B2 | 1/2011 | Cohn |
| 8,244,909 | B1 | 8/2012 | Hanson et al. |
| 8,331,371 | B2 | 12/2012 | Judge et al. |
| 8,358,658 | B2 | 1/2013 | Flynn et al. |
| 8,478,896 | B2 | 7/2013 | Ehlers |
| 8,693,470 | B1 | 4/2014 | Maxwell et al. |
| 2008/0225875 | A1 | 9/2008 | Wray et al. |

OTHER PUBLICATIONS

"A Brief Primer on Anycast", Matthew Prince, Oct. 21, 2011, pp. 1-4.

"Amazon Elastic Compute Cloud", User Guide for Linux, API Version, Jun. 15, 2014, pp. 1-684.

Amazon Web Services, "Shuffle Sharding: massive and magical fault isolation", http://www.awsarchitectureblog.com/2014/04/shuffle-sharding.html, Sep. 17, 2014, pp. 1-6.

Costin Raiciu, et al "Improving Datacenter Performance and Robustness with Multipath TCP" SIGCOMM'11, Aug. 15-19, 2011, pp. 1-12.

Albert Greenberg, et al "VL2: A Scalable and Flexible Data Center Network" Communications of the ACM, vol. 54, No. 3, Mar. 2011, pp. 1-10.

Chuanxiong Guo, et al "BCube: A High Performance, Server-centric Network Architecture for Modular Data Centers" SIGCOMM'09 Aug. 17-21, pp. 1-12.

"On the Impact of Packet Spraying in Data Center Networks", Advait Dixit, et al., 2013, pp. 1-9.

U.S. Appl. No. 14/565,164, filed Dec. 9, 2014, Tobias Lars-Olov Holgers, et al.

U.S. Appl. No. 14/526,410, filed Oct. 28, 2014, Eric Jason Brandwine.

U.S. Appl. No. 14/736,165, filed Jun. 10, 2015, Colm Maccarthaigh.

U.S. Appl. No. 14/736,167, filed Jun. 10, 2015, Colm Maccarthaigh.

U.S. Appl. No. 14/736,172, filed Jun. 10, 2015, Colm Maccarthaigh.

U.S. Appl. No. 16/136,131, filed Sep. 19, 2018, Paul John Tillotson.

U.S. Appl. No. 16/136,133, filed Sep. 19, 2018, Paul John Tillotson.

U.S. Appl. No. 16/136,138, filed Sep. 19, 2018, Paul John Tillotson.

U.S. Appl. No. 16/136,142, filed Sep. 19, 2018, Paul John Tillotson.

2nd-level route table 2149

| CIDR | Destination |
|---|---|
| 192.168.1.0/24 | Subcell 2150-2131A, (AIN 2130A, VNI-1), (AIN 2130C, VNI-2),(AIN 2130D, VNI-3) |
| 10.10.1.0/24 | Subcell 2150-2131A, (AIN 2130C, VNI-4), (AIN 2130E, VNI-5),(AIN 2130F, VNI-6) |
| 21.12.1.0/24 | Subcell 2150-2131B, (AIN 2130H, VNI-7), (AIN 2130J, VNI-8),(AIN 2130M, VNI-9) |

Filtered route table 2251A (at DMNs of subcell 2150-2131A)

| CIDR | Destination |
|---|---|
| 192.168.1.0/24 | (AIN 2130A, VNI-1), (AIN 2130C, VNI-2),(AIN 2130D, VNI-3) |
| 10.10.1.0/24 | (AIN 2130C, VNI-4), (AIN 2130E, VNI-5),(AIN 2130F, VNI-6) |
| 21.12.1.0/24 | (AIN 2130H@AC2131B), (AIN 2130J@AC2131B), (AIN 2130M@AC2131B) |

Filtered route table 2251B (at DMNs of subcell 2150-2131B)

| CIDR | Destination |
|---|---|
| 192.168.1.0/24 | (AIN 2130A@AC2131A), (AIN 2130C@AC2131A),(AIN 2130D@AC2131A) |
| 10.10.1.0/24 | (AIN 2130C@AC2131A), (AIN 2130E@AC2131A),(AIN 2130F@AC2131A) |
| 21.12.1.0/24 | (AIN 2130H, VNI-7), (AIN 2130J, VNI-8),(AIN 2130M, VNI-9) |

*FIG. 22*

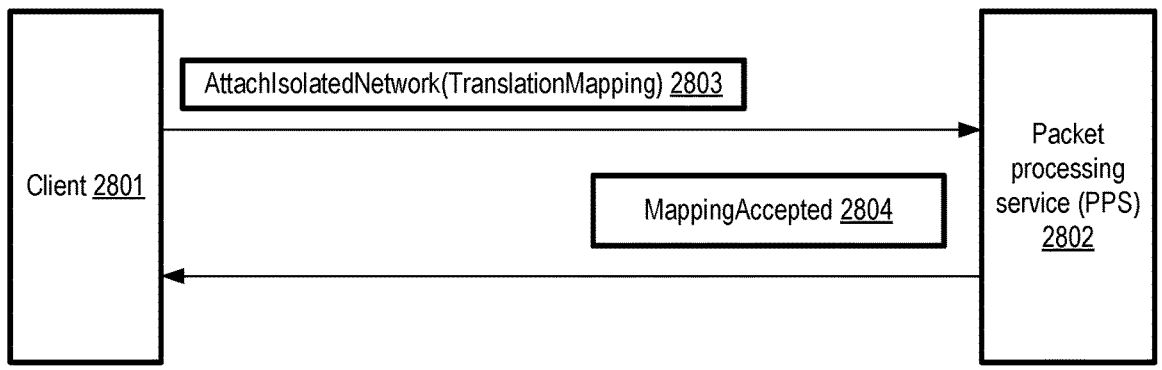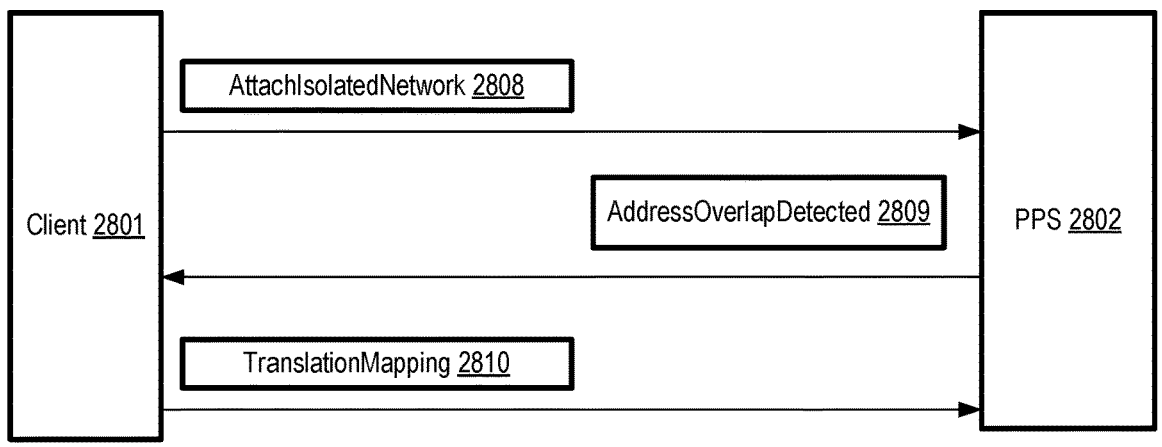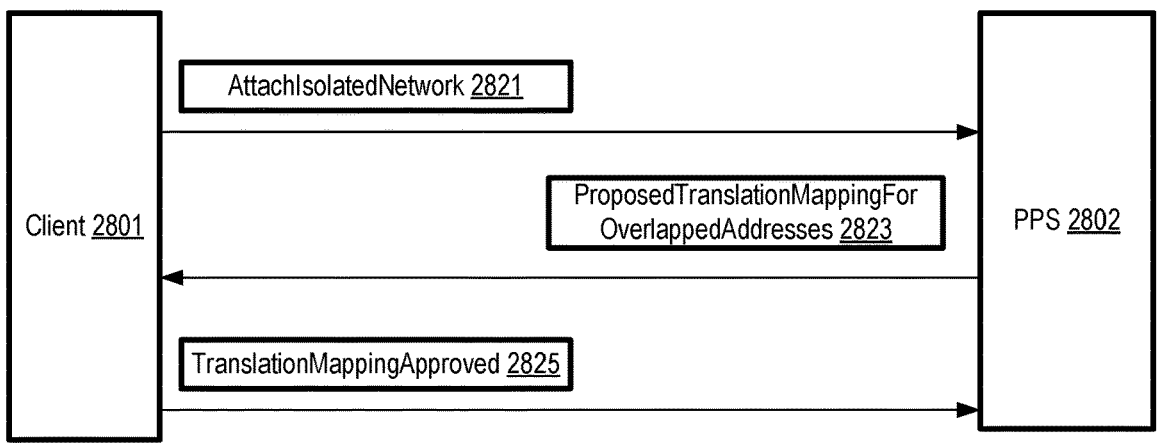
FIG. 28

Option D
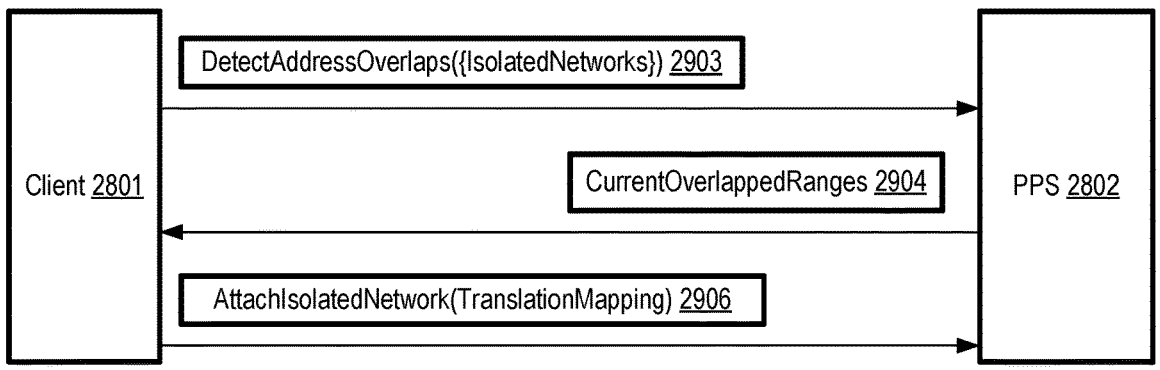
Option E
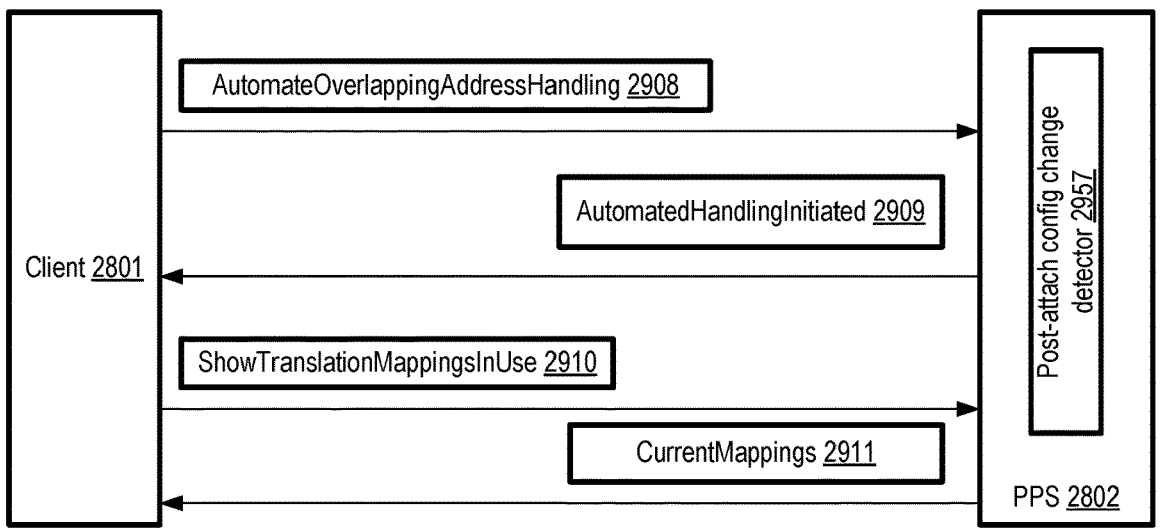
FIG. 29

Triggering event type 1:
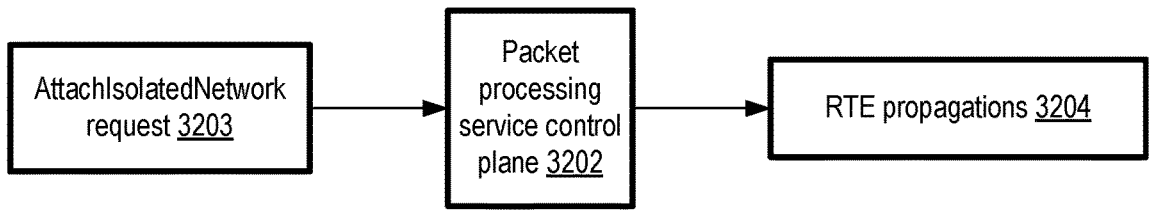
Triggering event type 2:
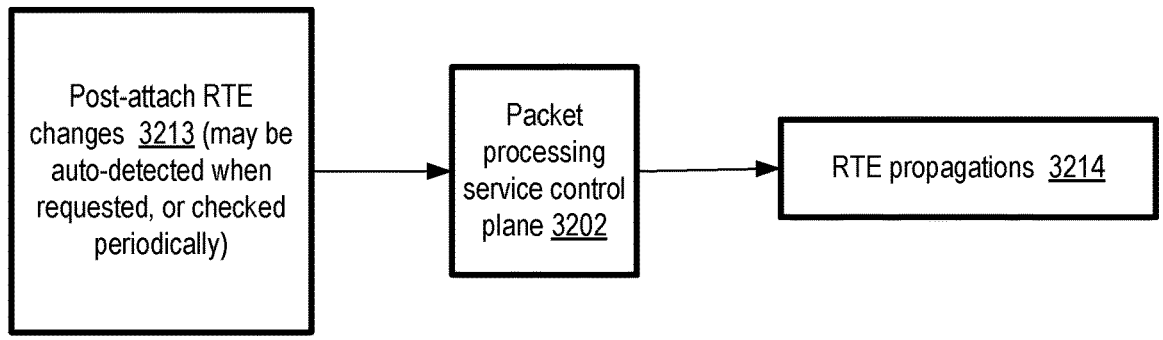
FIG. 32

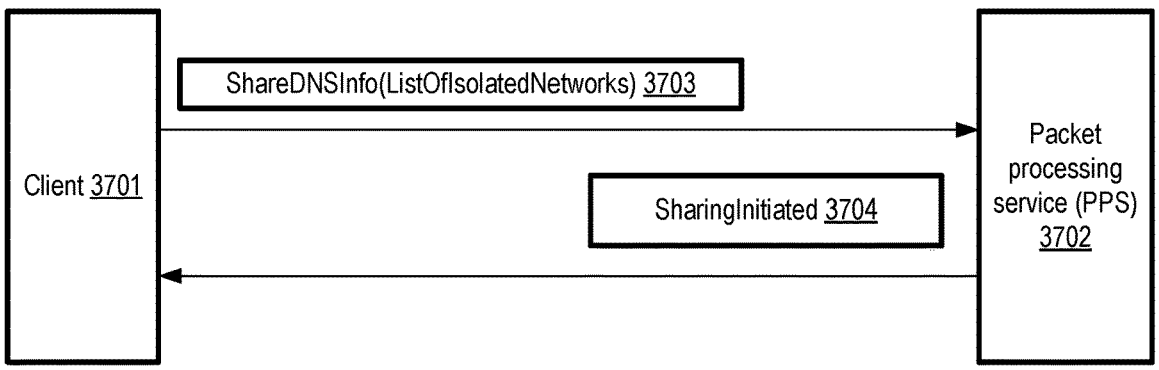
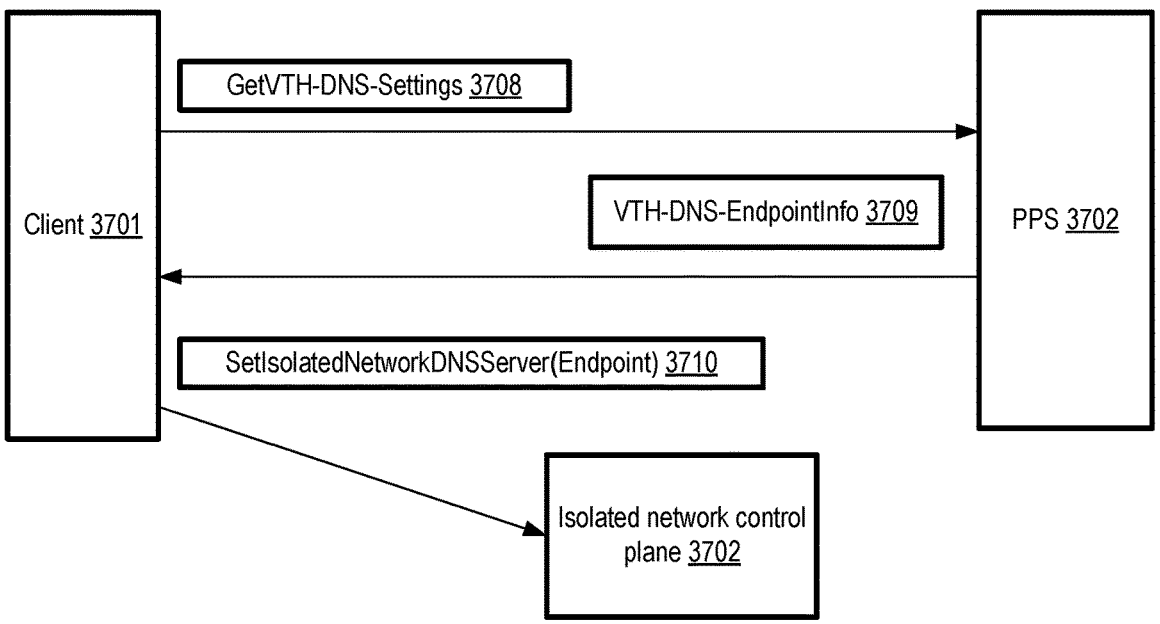
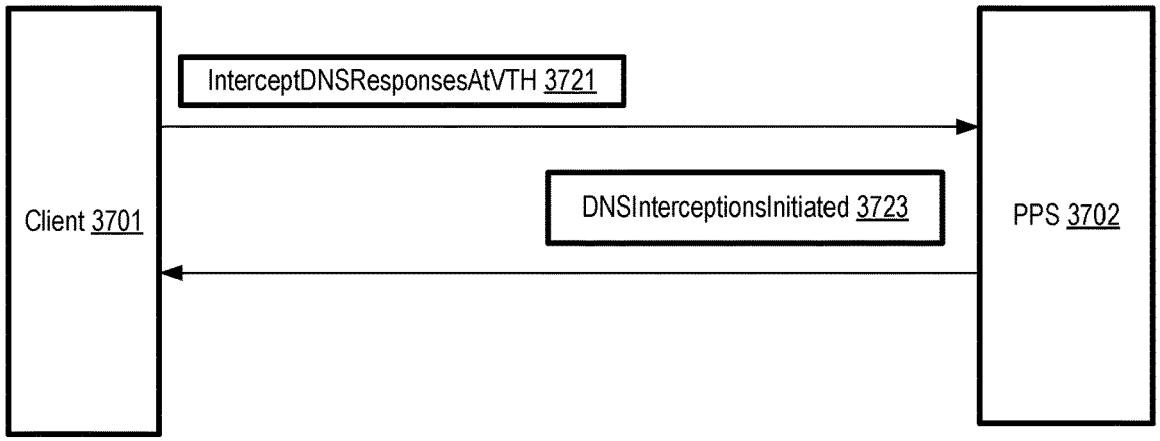
FIG. 37

SCALABLE VIRTUAL TRAFFIC HUB INTERCONNECTING ISOLATED NETWORKS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

As demand for virtualization-based services at provider networks has grown, more and more networking and inter-connectivity-related features may have to be added to meet the requirements of applications being implemented using the services. Many such features may require network packet address manipulation in one form or another, e.g., at level 3 or level 4 of the open systems interconnect stack. Some clients of virtualized computing services may wish to employ customized policy-based packet processing for application traffic flowing between specific sets of endpoints. Using ad-hoc solutions for all the different types of packet transformation requirements may not scale in large provider networks at which the traffic associated with hundreds of thousands of virtual or physical machines may be processed concurrently.

BRIEF DESCRIPTION OF DRAWINGS

FIG. 21, FIG. 22 and FIG. 23 collectively illustrate an example of the creation and use of filtered route tables at decision master nodes designated for a virtual traffic hub, according to at least some embodiments.

FIG. 28 and FIG. 29 collectively illustrate examples of alternative approaches for detecting and responding to overlapping address ranges among isolated networks connected via a virtual traffic hub, according to at least some embodiments.

FIG. 32 illustrates examples of triggering events that may lead to the propagation of routing information by a virtual traffic hub to one or more isolated networks, according to at least some embodiments.

FIG. 37 illustrates examples of programmatic interactions between a client and a packet processing network at which a virtual traffic hub may be used to perform DNS-related operations, according to at least some embodiments.

Figure 1:
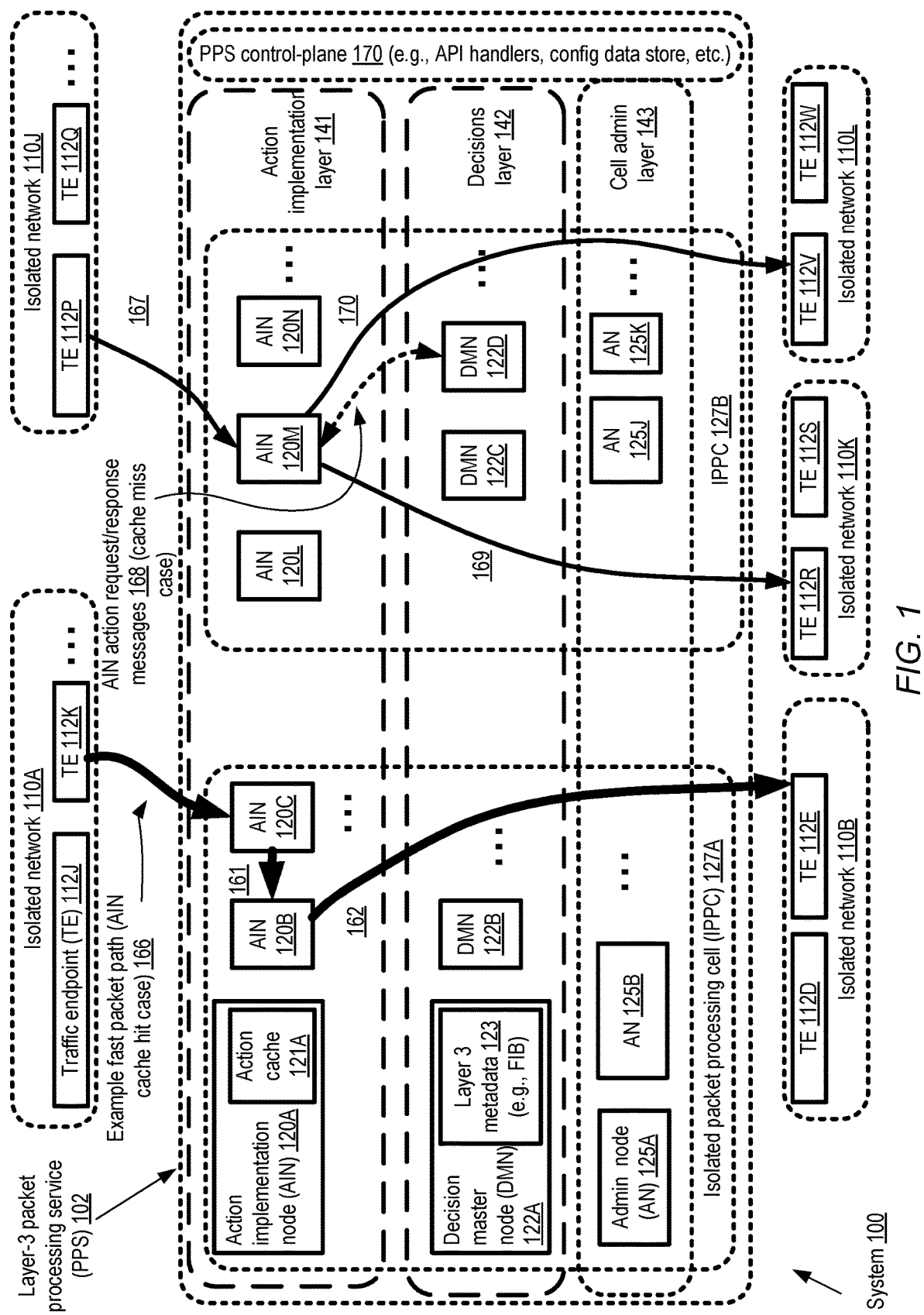
FIG. 1 illustrates an example system environment comprising resources of a scalable cell-based packet processing service at which client-specified forwarding metadata and policies may be used to implement a variety of networking applications, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing a multi-layer packet processing service comprising a plurality of logically isolated cells, and utilizing the service to build a number of higher level applications such as virtual traffic hubs are described. Such a service may comprise two broad categories of resources in at least some embodiments: control plane resources, and data plane resources. The control plane may comprise resources that are primarily responsible for administrative tasks such as setting up the initial service resource configurations for various networking applications, monitoring the configurations, modifying the configurations if needed, and so on. In contrast, the data plane may be responsible for implementing the processing of application packets based on guidelines indicated by clients of the packet processing service, and transferring contents of such packets between endpoints associated with the applications that have been set up on behalf of the clients. In at least some embodiments, a set of data plane nodes and control plane nodes of the packet processing service, where individual ones of the nodes may be implemented using one or more computing devices, may be grouped together to form an isolated packet processing cell (IPPC), and at least one such cell may be assigned to implement a given instance of an application. One such application may, for example, comprise a virtual traffic hub (e.g., a transit gateway) that can be used to (among other functions) route traffic between isolated networks (e.g., virtual networks hosted by a service provider, where the service provider operates a substrate network and virtualizes the Internet Protocol (IP) space made available to resources in the virtual network, networks whose resources may be assigned private Internet Protocol (IP) addresses that are not advertised outside the networks, etc.). In an example embodiment, customers of the service provider can use virtual traffic hubs to centrally manage the interconnectivity of isolated networks and on-premises networks. In an embodiment, multiple virtual traffic hubs may be established, e.g., based on requests received at the packet processing service from different customers with their respective connectivity needs, and each such hub may represent an instance of the virtual traffic hub application and be assigned a respective IPPC. Another example of an application to which one or more cells may be assigned may involve multicasting individual packets from some set of source endpoints to a plurality of destination endpoints in some embodiments.

A given cell of the packet processing service may be referred to in some embodiments as being "isolated" because, at least during normal operating conditions, no data plane network traffic may be expected to flow from that cell to any other cell of the service. In at least one embodiment, control plane traffic may also not flow across cell boundaries under normal operating conditions. As a result of such isolation, a number of benefits may be obtained: e.g., (a) an increase in a workload of one instance of a packet processing application, being implemented using one cell, may have no impact on the resources being used for other applications at other cells, and (b) in the rare event that a failure occurs within a given cell, that failure may not be expected to have any impact on applications to which other cells have been assigned. Software updates may be applied to nodes of one cell at a time, so any bugs potentially introduced from such updates may not affect applications using other cells. The specific type of packet processing being performed may vary from one application to another, and as a result from one cell to another in at least some embodiments. In some embodiments, while at least one isolated packet processing cell may be assigned to a given application instance, a given cell may potentially be employed in a multi-tenant mode for multiple application instances configured on behalf of multiple customers. In at least some embodiments, nodes of the packet processing service cells may generate and run highly efficient executable programs to implement the application-specific packet processing logic based on customer-supplied policies, e.g., using a virtual machine instruction set optimized for networking-related operations.

As one skilled in the art will appreciate in light of this disclosure, certain embodiments may be capable of achieving various advantages, including some or all of the following: (a) enabling a wide variety of client-selected customized packet processing operations (e.g., associated with Layer 3 of the Internet networking protocol stack or its equivalent in other protocol stacks) to be implemented efficiently, thereby reducing the overall CPU load associated with the packet processing, (b) improving the overall responsiveness of applications that utilize the packet processing operations, e.g., by adding packet processing resources as the application workload increases, (c) enhancing the security of networking applications by isolating the set of resources utilized for a given instance of an application, and/or (d) enhancing the user experience of system administrators and/or application owners by providing configuration information and metrics separately on a per-application-instance level. The amount of computing and other resources needed to deal with scenarios such as possible overlaps among private address ranges used in different isolated networks, the propagating of route changes from one isolated network to another, and/or the propagation of DNS information to resources within isolated networks may also be reduced in at least some embodiments.

According to some embodiments, a system may comprise a set of computing devices of a packet processing service. The computing devices may include instructions that upon execution on a processor cause the computing devices to assign, to a first application with a first set of source endpoints and a second set of destination endpoints, a first isolated packet processing cell (IPPC) of a plurality of isolated packet processing cells of the packet processing service. The IPPC may comprise, for example, (a) a plurality of action implementation nodes (AINs), (b) one or more decision master nodes (DMNs), and (c) one or more administration or control plane nodes (ANs) in at least one embodiment. In some embodiments, at least a first AIN of the IPPC may have a programmatically attached virtual network interface (VNI) configured to receive network traffic originating at one or more of the source endpoints, and at least a second AIN of the IPPC may have a programmatically attached VNI enabling transmission of traffic along a path to one or more of the destination endpoints. A VNI, as suggested by the name, may in various embodiments comprise a set of networking configuration settings (such as one or more IP addresses, security rules and the like) that can be programmatically associated with execution platforms such as virtual machines, and potentially programmatically transferred from one platform to another to enable the configuration settings to be used to transmit and receive network traffic over different physical network interfaces. In some cases, a given AIN may be connected (e.g., using one or more VNIs) to one or more sources as well as destinations of the application traffic. An application isolation policy of the packet processing service may prohibit transmission of at least some types of network packets between the first IPPC and other IPPCs in various embodiments. In at least some implementations, network configuration settings (e.g., security-related settings of one or more VNIs used for communicating with/among IPPC nodes, or routing table entries used within the IPPCs) may prohibit/prevent the transmission of some types of messages (e.g., data plane packets) across IPPC boundaries. For example, a given DMN may be configured to provide representations of actions only to AINs of its own IPPC, and not to AINs in other IPPCs in various embodiments.

An indication of a collection of packet forwarding metadata of the first application, such as entries of a forwarding information base, may be received via a programmatic interface from a client of the packet processing service, and the collection may be propagated to the DMNs in various embodiments. Such forwarding metadata may represent one example of decision metadata that be employed to make decisions regarding actions at the DMNs in various embodiments. An action query may be received at a DMN from the first AIN, e.g., as a result of a cache miss in a local action cache accessible at the first AIN when an attempt is made to find an action corresponding to a packet received from a first source endpoint in some embodiments. From the DMN, in response to the action query, a representation of a packet processing action to be implemented with respect to a group of one or more packets may be provided to the first AIN. The group of packets may include the packet that led to the cache miss and the action query, as well as other packets of the same flow in some embodiments, where one flow may be distinguished from other flows by a combination of header entry values and/or other properties. As such, the action may be cached at the first AIN and potentially re-used later, if/when other packets of the group are received. The action determined at the DMN may be based at least in part on the packet forwarding metadata and a packet processing policy indicated by the client or customer on whose behalf the first IPPC is configured in at least some embodiments. At the first AIN, the action may be performed with respect to the packet received from the source endpoint; as a result, at least one outbound (with respect to the packet processing service) packet may be transmitted along a path to a destination endpoint. In some cases, the outbound packet may be transmitted via the second AIN—that is, not all the AINs may have connectivity to all the source or destination endpoints. In other cases, the outbound packet may not have to be transmitted via a path that includes other endpoints.

The administration nodes of the IPPC may monitor various metrics associated with the AINs and the DMNs in some embodiments, and initiate cell reconfiguration operations as and when needed based on resource management policies being enforced for at least the first IPPC in various embodiments. The reconfiguration operations may include, for example, adding AINs/DMNs, removing/decommissioning AINs/DMNs, setting up additional virtual network interfaces, and the like. In some embodiments, e.g., in which the nodes of the IPPC are being used in multi-tenant mode, an application's traffic may be transferred or migrated from one IPPC to another under some conditions, e.g., based on metrics gathered at the administration nodes. A multi-phase migration technique that avoids transferring data plane traffic across the pre-migration IPPC and the post-migration IPPC may be employed in some embodiments.

A given IPPC may be assigned to multiple applications of one or more clients of the packet processing service in some embodiments, e.g., resulting in respective sets of actions being generated (at the DMNs) and executed (at the AINs) for the different applications, in accordance with policies and metadata provided by the clients for the applications. The multiple applications to which a given IPPC is assigned may be instances of the same type of application (e.g., virtual routing applications, providing routing between different groups of isolated networks), or instances of different networking application categories (e.g., both a virtual routing application and a multicast application may be implemented using a given cell).

In at least some embodiments, a shuffle sharding algorithm may be used to assign a subset of nodes (e.g., AINs) of an IPPC to a given set of one or more source or destination endpoints of a given application. According to such an algorithm, if the IPPC comprises N AINs, packets from a given source endpoint E1 may be directed (e.g., based on hashing of packet header values) to one of a subset S1 of K AINs (K<N), and packets from another source endpoint E2 may be directed to another subset S2 of K AINs, where the maximum overlap among S1 and S2 is limited to L common AINs. Similar parameters may be used for connectivity for outbound packets to destination endpoints from the packet processing service in various embodiments. Such shuffle sharding techniques may combine the advantages of hashing based load balancing with higher availability for the traffic of individual ones of the source and destination endpoints in at least some embodiments.

In various embodiments, the packet processing service may be implemented at least in part using resources of a provider network. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In one embodiment, each region may include one or more availability containers, which may also be termed "availability zones". An availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container. Various types of services, including for example a packet processing service of the kind introduced above, may therefore be protected from failures at a single location by launching multiple resources on behalf of a given application in respective availability containers, or (in the case of a packet processing service) distributing the nodes of a given cell across multiple availability containers. Thus, for example, in some embodiments at least one AIN of a given IPPC may be established within each of at least two availability containers, and similarly, respective DMNs and administration nodes (ANs) of the IPPC may also be established in more than one availability container.

In some embodiments, at least some nodes (e.g., AINs, DMNs and/or ANs) of at least some IPPCs may be implemented using virtual machines, e.g., instantiated on hosts of a virtualized computing service (VCS) of a provider network. In other embodiments, physical machines that do not implement virtualization may be used for at least some nodes of a packet processing service. In one embodiment, respective isolated virtual networks (IVNs) may be established on behalf of various clients at the VCS. An isolated virtual network may comprise a collection of networked resources (including, for example, virtual machines) allocated to a given client, which are logically isolated from (and by default, inaccessible from) resources allocated for other clients in other isolated virtual networks. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on. In at least one embodiment, a given IPPC may be implemented using one or more IVNs. In some embodiments in which the packet processing service is being used for routing traffic among isolated networks, the isolated networks themselves may comprise one or more IVNs of a VCS.

A number of programmatic interfaces, such as a set of application programming interfaces (APIs), a web-based console, command-line tools and the like may be implemented by the packet processing service in various embodiments, enabling clients to submit requests and receive responses pertaining to their networking applications. A wide variety of APIs may be supported in some embodiments, e.g., including APIs to register or create a new application instance such as a virtual router hub, to associated virtual network interfaces (VNIs) with applications and IPPCs, to submit routing/forwarding metadata and policies, and the like. In at least some embodiments, VNIs may be configured in a multiplexed manner, in which for example a "trunk" VNI is attached to an AIN and configured to receive packets from (or send packets to) multiple network endpoints accessible from isolated networks whose packets are to be processed at the service.

Example System Environment

FIG. 1 illustrates an example system environment comprising resources of a scalable cell-based packet processing service at which client-specified forwarding metadata and policies may be used to implement a variety of networking applications, according to at least some embodiments. As shown, system 100 comprises various layers of a layer-3 packet processing service (PPS) 102, including an action implementation layer 142, a decisions layer 142 and a cell administration layer 143, as well as a set of service-level control-plane resources 170 including API handlers, metadata stores/repositories and the like in the depicted embodiment. Individual ones of the layers 141, 142 and 143 may comprise a plurality of nodes, such as action implementation nodes (AINs) at layer 141, decision master nodes (DMNs) at layer 142, and administration nodes (ANs) at layer 142. Resources of layers 141, 142, 143 may be organized into groups called isolated packet processing cells (IPPCs) 127 (e.g., 127A or 127) in various embodiments, with a given IPPC 127 comprising some number of AINs, some number of DMNs, and some number of ANs. For example, IPPC 127A may include AINs 120A, 120B and 120C, DMNs 122A and 122B, and ANs 125A and 125B in the depicted embodiment, while IPPC 127B may comprise AINs 120L, 120M and 120N, DMNs 122C and 122D, and ANs 125J and 125K. Individual nodes such AINs, DMNs and/or ANs may be implemented using some combination of software and hardware at one or more computing devices in different embodiments—e.g., in some embodiments, a given AIN, DMN or AN may comprise a virtual machine running at a host managed by a virtualized computing service, while in other embodiments AINs, DMNs and/or ANs may be implemented using non-virtualized servers.

The resources of the packet processing service 102 may serve as an infrastructure or framework that can be used to build a variety of networking applications, such as applications for forwarding/routing packets between isolated networks, applications for multicasting packets, virtual private networking applications and the like in different embodiments. Individual IPPCs 127 may be assigned to implement the logic of one or more instances of such an application in some embodiments, with the traffic associated with that application being processed (at least under normal operating conditions) without crossing IPPC boundaries. For example, in the depicted embodiment, IPPC 127A has been assigned to an application for transmitting packets between at least isolated network 110A and isolated network 110B, while IPPC 127B has been assigned for transmitting packets between at least isolated network 110J and 110K. Individual ones of the isolated networks 110 may have associated private IP address ranges, such that addresses assigned to resources within a given isolated network 110 may not be visible to resources outside the isolated network, and such that at least by default (e.g., prior to the assignment of an IPPC implementing a virtual routing application), a pathway between resources within different isolated networks may not necessarily be available.

In various embodiments, instances of networking applications, such as virtual traffic hubs that perform routing between isolated networks 110, may be set up in response to programmatic requests received from customers of the PPS 102. Such requests may, for example, be received at API handlers of the PPS control-plane 170. In response to a client's request or requests to enable virtualized routing via a hub between isolated networks 110A and 110B, for example, IPCC 127A may be assigned to forward packets among the two isolated networks in the depicted embodiment. Similarly, in response to another client's request (or the same client's request) to enable multicast connectivity among isolated networks 110J, 110K and 110L, IPPC 127B may be assigned. In at least some embodiments, as discussed below in further detail, a collection of virtual network interfaces may be programmatically configured to enable traffic to flow between endpoints (TEs 112, such as 112D, 112E, 112J, 112K, 112P, 112Q, 112R, 112S, 112V and 112W) in the isolated networks and the AINs of the cell assigned to those isolated networks. Clients on whose behalf the networking applications are being configured may provide decision metadata (e.g., layer 3 metadata 123 such as forwarding information base entries, routing information base entries and the like) and/or policies that can be used to determine the packet processing actions that are to be performed via control plane programmatic interfaces of the PPS in some embodiments. The metadata received from the clients may be propagated to the decision manager nodes of the appropriate IPPCs 127, e.g., from the PPS API handlers via the ANs 125 or directly in the depicted embodiment. In at least some embodiments, the metadata initially provided by the clients may be transformed, e.g., by converting high-level routing/forwarding entries into more concrete entries that take into account the identifiers of virtual network interfaces to be used, locality-related information, information about the availability containers in which various AINs are configured, and so on, and the transformed versions may be stored at the different DMNs 122 as discussed below in further detail.

A given packet from a source endpoint such as TE 112K of isolated network 110A may be received at a particular AIN such as 120C in the depicted embodiment. The specific AIN to be used may be selected based, for example, on a shuffle-sharding algorithm in some embodiments, such that packets of a particular flow from a particular endpoint are directed to one of a subset of the AINs of the cell. Individual ones of the AINs may comprise or have access to a respective action cache, such as action cache 121A. An action cache may be indexed by a combination of attributes of the received packets, such as the combination of an identifier of the sending client, the source and destination IP addresses, the source and destination ports, and so on. Actions may be stored in executable form in the caches in some embodiments, e.g., using byte code expressed using instructions of a register-based virtual machine optimized for implementing network processing operations. AIN 120C may try to look up a representation of an action for the received packet in its cache. If such an action is found, the packet may be processed using a "fast path" 166 in the depicted embodiment. For example, an executable version of the action may be implemented at AIN 120C, resulting in the transmission of the contents of the packet on a path towards one or more destination endpoints, such as TE 112E in isolated network 110B. The path may include zero or more additional AINs— e.g., as shown using arrows 161 and 162, the contents of the packet may be transmitted via AIN 120B to TE 112E in the depicted fast packet path. AIN 120B may have a virtual network interface configured to access TE 112E, for example, while AIN 120C may not have such a virtual network interface configured, thus resulting in the transmission of the packet's contents via AIN 120B. Note that at least in some embodiments, one or more header values of the packet may be modified by the action (e.g., in scenarios in which overlapping private address ranges happen to be used at the source and destination isolated networks, as discussed below in further detail)—that is, the packet eventually received at the destination endpoint 112E may differ in one or more header values from the packet submitted from the source endpoint 112K.

If an AIN's local action cache does not contain an action for a received packet, a somewhat longer workflow may ensue. Thus, for example, if a packet is received from TE 112P at AIN 120M (as indicated via arrow 167), and a cache miss occurs in AIN 120M's local cache when a lookup is attempted for the received packet, AIN 120M may send an action query to a selected DMN (DMN 122D) in its IPCC 127B, as indicated by arrow 168. The DMN 122D may determine, e.g., based on a client-supplied policy indicating that a multicast operation is to be performed, and based on forwarding/routing metadata provided by the client, that the contents of the packet are to be transmitted to a pair of endpoints 112R and 112V in isolated networks 110K and 110L respectively in the depicted example. A representation of an action that accomplishes such a multicasting operation may be sent back to AIN 120M, stored in its local cache, and executed at AIN 120M, resulting in the transmissions illustrated by arrows 169 and 170. In this example, AIN 120M can send outbound packets directly to the destination TEs 112R and 112V, and may not need to use a path that includes other AINs of IPCC 127B.

As the traffic associated with the applications flows via the IPCCs 127, their respective ANs may collect various types of metrics. Based at least partly on the metrics, as and when needed, additional AINs, DMNs (or even ANs) may be instantiated in various embodiments. At least in some embodiments, different IPCCs may have differing initial configurations—e.g., some IPCCs may start out with 10 AINs and 3 DMNs, others with 20 AINs and 7 DMNs, and so on. If the total workload being handled by the current set of IPCCs exceeds a threshold, new IPCCs may be instantiated and assigned to new application instances (or, via application migration, to existing application instances) in some embodiments. Similarly, if the overall workload falls below a threshold, or the resource utilization metrics of one or more IPCCs falls below some threshold, selected IPPCs (or individual nodes within selected IPPCs) may be decommissioned in various embodiments. Some application instances may potentially generate more traffic than can be handled by the maximum capacity that be provisioned by a given IPCC—in such scenarios, multiple IPCCs may be used in at least one embodiment for a given application instance.

Interactions Among Cell Components

Figure 2:
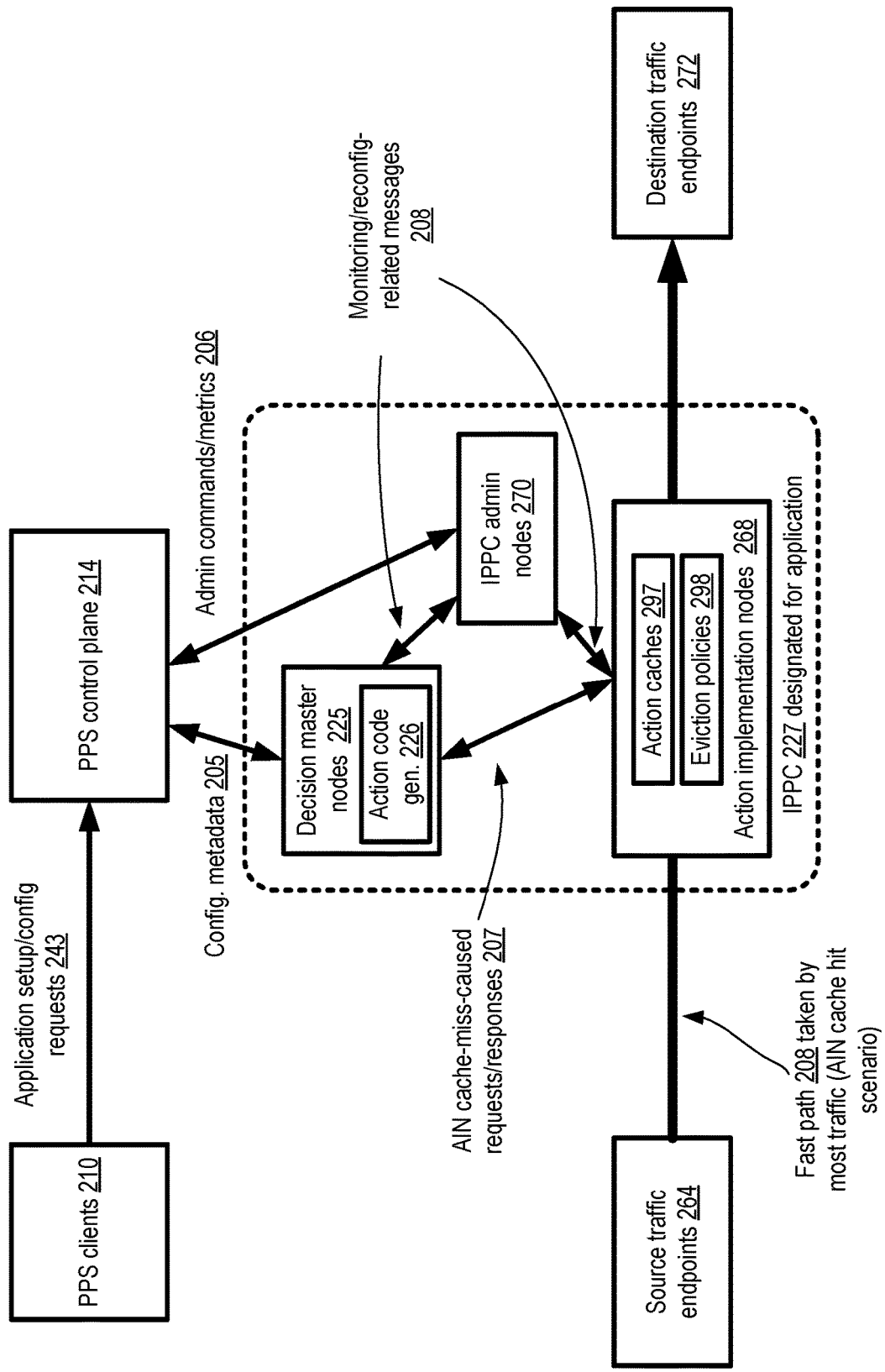
FIG. 2 illustrates a high-level overview of example interactions among components of an isolated cell designated for a particular application at a packet processing service, according to at least some embodiments.

FIG. 2 illustrates a high-level overview of example interactions among components of an isolated cell designated for a particular application at a packet processing service, according to at least some embodiments. In the depicted embodiment, an isolated packet processing cell 227 of a packet processing service (PPS) similar to that discussed in the context of FIG. 1 has been designated for a particular application. Clients 210 of the PPS may submit programmatic requests 243 to the PPS control plane 214 in the depicted embodiment, e.g., via a web-based console, command-line tools, APIs, graphical user interfaces or the like. The requests 243 may indicate the types of applications to be set up (e.g., policies to be implemented for packet processing), desired performance or other goals to be met by the configurations set up for the applications etc. Based on the requirements of the client and/or on the availability and current resource consumption levels at various IPPCs, the PPS control plane 214 may designate IPPC 227 for the client in the depicted embodiment.

Configuration metadata 205 such as forwarding information base (FIB) entries provided by the client, policies/rules indicated by the client etc., to be used for making packet processing decisions, may be transmitted to one or more decision master nodes 225 of IPCC 227 from the PPS control plane 214 in the depicted embodiment. In some embodiments, the configuration metadata may be transmitted first to the IPPC administration nodes (ANs) 270, and from there to the decision master nodes (DMNs) 225. In some embodiments in which a given IPPC 227 comprises multiple DMNs, all the DMNs may be provided all the metadata pertaining to the one or more applications to which the IPPC is assigned. In other embodiments, respective subsets of metadata may be provided to individual DMNs.

When a packet is received from a source traffic endpoint 264 of the application at an action implementation node (AIN) 268, an attempt may be made to find a corresponding action in an action cache 297. If such an action is found, e.g., via a lookup using a key based on some combination of packet header values, a client identifier, and so on, the action may be implemented, resulting in the transmission of at least some contents of the received packet to one or more destination traffic endpoints 272 in the depicted embodiment. This "fast path" packet processing pathway, in which a cache hit occurs at an AIN, and in which decision master nodes are not directly involved, may be much more frequently encountered in practice in various embodiments than the slower cache miss case. Note that at least for some applications, the total number of packets for which the same logical action is to be implemented may be quite large—e.g., hundreds or thousands of packets may be sent using the same long-lived TCP connection from one source endpoint to a destination endpoint.

In the scenario in which the arrival of a packet results in a cache miss at the AIN 268, a request-response interaction with a DMN 225 may be initiated by the AIN in the depicted embodiment. An action query (which may in some implementations include the entire received packet, and in other implementations may include a representation or portion of the packet such as some combination of its header values) may be submitted from the AIN 268 to the DMN 225. The DMN 225 may, for example, examine the contents of the action query and the configuration metadata 205, and determine the action that is to be implemented for the cache-miss-causing packet and related packets (e.g., packets belonging to the same flow, where a flow is defined at least partly by some combination of packet header values) in the depicted embodiment. In at least some embodiments, a DMN 225 may comprise an action code generator 226, which produces an executable version of the action that (a) can be quickly executed at an AIN and (b) need not necessarily be interpreted or "understood" at the AIN. In at least one embodiment, the generated action may comprise some number of instructions of an in-kernel register-based virtual machine instruction set which can be used to perform operations similar to those of the extended Berkeley Packet Filter (eBPF) interface. The action may be passed back to the AIN for caching, and for implementation with respect to the cache-miss-causing packet in at least some embodiments.

At the AIN 268 that submitted the action query, the generated action may be stored in the cache 297, and re-used as needed for other packets in addition to the first packet that led to the identification and generation of the action in various embodiments. Any of a variety of eviction policies 298 may be used to remove entries from the caches 297—e.g., if no packet requiring the implementation of a given action A1 has been received for some threshold time interval, in one embodiment A1 may be removed from the cache. In at least one embodiment, individual entries in the cache may have associated usage timing records, including for example a timestamp corresponding to the last time that action was performed for some packet. In such an embodiment, an entry may be removed from the cache if/when its usage timing record indicates that an eviction criterion has been met (e.g., when the action has not been performed for some threshold number of seconds/minutes). In some embodiments, cached actions may periodically be re-checked with respect to the current state of the configuration metadata 205—e.g., every T seconds (where T is a configurable parameter) the AIN may submit a re-verification query indicating a cached action to the DMN layer, and a DMN may verify that the cached action has not been rendered invalid by some newly updated configuration metadata entries. In at least one embodiment, a DMN may send invalidation messages to the AINs when new configuration metadata 205 supersedes or invalidates one or more actions that were generated earlier. Note that in various embodiments, as long as the action that is eventually performed for a given received packet is correct, from a functional perspective it may not matter whether the action was cached at the AINs or had to be generated at the DMNs. As such, even if an action is occasionally evicted from a cache 297 unnecessarily or as a result of an overly pessimistic eviction decision, the overall impact on the packet processing application is likely to be small (as long as unnecessary evictions are not very frequent) in such embodiments. The IPPC administration nodes 270 may receive monitoring or metric-related messages 208 from the AINs and/or the DMNs in some embodiments, and transmit administrative commands (such as restart commands, shutdown/startup commands) and the like to the AINs and/or DMNs in at least some embodiments. In at least one embodiment, the IPPC admin nodes 270 may initiate reconfiguration of the IPPC 227 based on gathered metrics, e.g., by adding or removing other nodes, changing VNI settings and the like.

Cells Implemented Using Multiple Availability Containers

Figure 3:
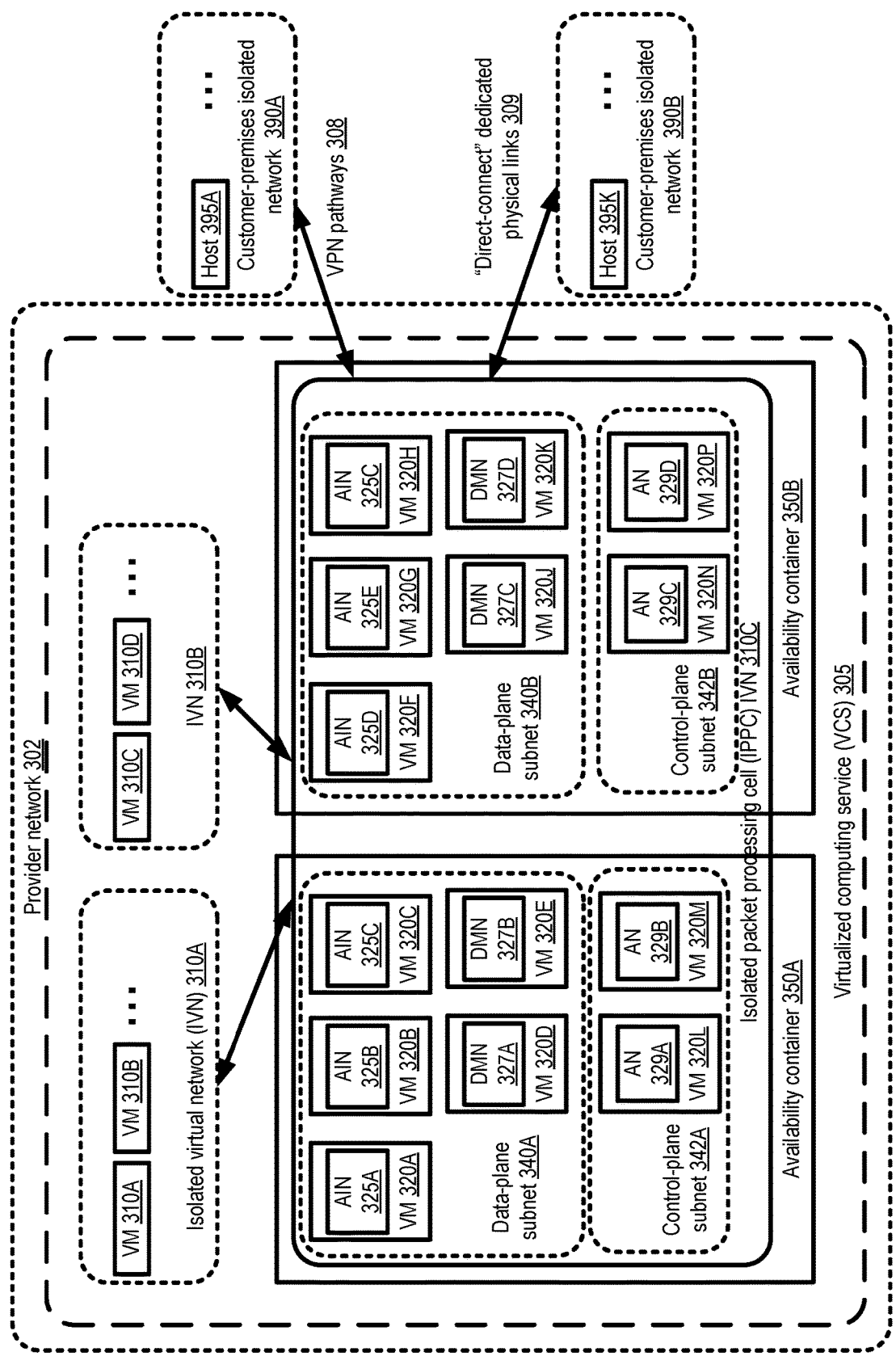
FIG. 3 illustrates an example scenario in which an isolated packet processing cell may comprise nodes distributed among multiple availability containers of a virtualized computing service, according to at least some embodiments.

As mentioned earlier, in some embodiments, at least some cells of a packet processing service similar to that discussed in the context of FIG. 1 may be implemented using resources of a provider network, such as virtual machines implemented at a virtual computing service. FIG. 3 illustrates an example scenario in which an isolated packet processing cell may comprise nodes distributed among multiple availability containers of a virtualized computing service, according to at least some embodiments. In the depicted embodiment, a provider network 302 may comprise a virtualized computing service (VCS) 305 at which isolated virtual networks may be established on behalf of various customers or clients. An isolated virtual network or IVN (such as IVNs 310A and 310B, which may be established for one or more VCS customers, and IVN 310C, which may be configured to implement an IPCC of the packet processing service itself) may comprise a collection of networked resources allocated to one client/customer of the VCS. Such resources (including, for example, virtual machines), may be logically isolated from (and by default, inaccessible from) resources allocated for other clients in other isolated virtual networks in at least some embodiments. In the depicted embodiment, the packet processing service itself may be considered a client or customer of the VCS 305—that is, the packet processing service may be built by leveraging the functionality supported by the VCS 305. The client on whose behalf an IVN is established may be granted substantial flexibility regarding network configuration for the resources of the IVN—e.g., private IP addresses for virtual machines may be selected by the client without having to consider the possibility that other resources within other IVNs may have been assigned the same IP addresses, subnets of the client's choice may be established within the IVN, security rules may be set up by the client for incoming and outgoing traffic with respect to the IVN, and so on.

In at least some embodiments, the resources of the VCS 305, such as the hosts on which various virtual machines are run, may be distributed among a plurality of availability containers 350, such as 350A and 350B. As mentioned earlier, an availability container in turn may comprise portions or all of one or more distinct locations or data centers, engineered in such a way (e.g., with independent infrastructure components such as power-related equipment, cooling equipment, or physical security components) that the resources in a given availability container are insulated from failures in other availability containers. A failure in one availability container may not be expected to result in a failure in any other availability container; thus, the availability profile of a given resource is intended to be independent of the availability profile of resources in a different availability container.

In the depicted embodiment, action implementation nodes (AINs) 325, decision master nodes (DMNs) 327, and administration nodes (ANs) 329 may all be implemented at least in part using respective virtual machines (VMs) 320 of the VCS 305. As shown, AINs 325A, 325B, 325C, 325D, 325E and 325F may be implemented at virtual machines 320A, 320B, 320C, 320F, 320G and 320H respectively. DMNs 327A, 327B, 327C and 327D may be implemented at virtual machines 320D, 320E, 320J and 320K respectively, and ANs 329A, 329B, 329C and 329D may be implemented at VMs 320L, 320M, 320N and 320P respectively. In some embodiments, a given VM 320 may be instantiated at a respective physical virtualization host; in other embodiments, multiple VMs may be set up at a given physical host. The illustrated cell, implemented in IVN 310C, may comprise at least two data-plane subnets 340A and 340B, and at least two control-plane subnets 342A and 342B. One data plane subnet and one control plane subnet may be implemented in each of at least two availability containers 350—e.g., subnets 340A and 342A may be configured in availability container 350A, while subnets 340B and 342B may be configured in availability container 350B. A control-plane subnet 342 may comprise one or more ANs 329 at respective VMs 320 in some embodiments, while a data-plane subnet 340 may comprise one or more AINs 325 and one or more DMNs 327 at respective VMs 320. As a result of the use of multiple availability containers, the probability that the entire IPPC is affected by any given failure event may be minimized in the depicted embodiment. The use of different subnets for control-plane versus data-plane nodes may help to separate at least the majority of the control plane traffic of the IPPC from the data plane traffic of the IPPC in various embodiments.

As shown, the IPPC implemented using IVN 310C may be used for packet processing applications involving traffic between at least four isolated networks—IVNs 310A and 310B, and customer-premises isolated networks 390A and 390B in the depicted embodiment. IVNs 310A and 310B may each comprise, for example, a set of virtual machines 310 (e.g., 310A, 310B, 310C or 310D) set up on behalf of a VCS customer. Isolated network 390A, which may for example be set up at a customer premise or location outside the provider network's own data centers and may include some number of hosts such as host 395A, may communicate with the IPPC via a set of virtual private network (VPN) pathways 308 in the depicted embodiment. Isolated network 390B may also be set up at a set of customer premises or locations outside the provider network 302 and may comprise some number of hosts such as host 395K in the depicted embodiment. Traffic between the isolated network 390B and the IPPC may flow over a set of dedicated physical links 309 in the depicted embodiment (e.g., instead of a set of links that may be shared with traffic of the public Internet), which may also be referred to as "direct-connect"

links. As such, the packet processing service implemented using the VCS 305 of provider network 302 may be capable of processing packets generated at (or directed towards) a variety of network configurations in the depicted embodiment, including (but not necessarily limited to) isolated virtual networks within the VCS itself, external networks such as 390A which use VPN connections over shared links to communicate with the VCS, and external networks such as 390B which use dedicated links to communicate with the VCS. Other types of networks may also be connected using the packet processing service in various embodiments. In at least some embodiments, the nodes of the IPPCs may not utilize the type of multi-availability-container architecture shown in FIG. 3, may use non-virtualized hosts instead of or in addition to virtual machines, and/or may not necessarily use a virtualized computing service or other services of a provider network.

Multiplexed Virtual Network Interfaces

In some embodiments, a virtualized computing service (VCS) may implement virtual network interfaces (VNIs) to help simplify various aspects of networking configuration for virtual machines. As indicated earlier, a virtual network interface may comprise a set of networking configuration properties or attributes (such as IP addresses, subnet settings, security settings, and the like) that can be dynamically associated ("attached" to) or disassociated ("detached" from) with individual virtual machines, without for example having to make changes at physical network interfaces if and when virtual machines migrate from one physical host to another. In some embodiments, at least one IP address "IPaddr1" may be assigned to a given virtual network interface VNI1, and security rules restricting inbound and outbound traffic may be set for VNI1. When that VNI is programmatically attached to a given virtual machine VM1 launched at a host with a physical network interface card NIC1, network packets indicating IPaddr1 as their destination address (and complying with the security rules) may be received at VM1 via NIC1. In addition, outbound packets generated at VM1 may indicate IPaddr1 as their source address and may be physically transmitted towards their destinations via NIC1. If VNI1 is then programmatically detached from VM1 and attached to VM2 (which is executing at a different host with a different physical network interface card NIC2), the IPaddr1 traffic that was previously being received at VM1 may now be received at VM2, with the same security rules in place.

Support for virtual network interfaces may considerably simplify several types of network configuration tasks, including the operation of various nodes of the packet processing service in some embodiments. When a new VNI is created, e.g., in response to a programmatic request from a client of a virtual computing service which supports VNIs, a new interface identifier (VNI-ID) may be generated for it. The provider network in which the VNI is to be used may comprise a plurality of logical partitions (such as the isolated virtual networks (IVNs) described earlier) in some embodiments, and the attributes of the VNI may contain a logical partition identifier in such cases. In some cases the attributes may include a zone identifier, which may for example indicate an availability container, a geographical region, or a set of data centers whose virtual machines may be available for programmatic attachment to the VNI.

Any of several types of network addressing-related fields may be included within the set of attributes of a VNI in different embodiments. One or more private IP addresses may be specified in some embodiments, for example. Such private IP addresses may for example be used internally for routing within IVNs, and may not be directly accessible from outside the IVN. In general, zero or more public IP addresses may also or instead be associated with a given VNI in some embodiments; these IP addresses may be visible outside the provider network, e.g., to various routers of the public Internet or peer networks of the provider network. One or more subnet identifiers (e.g., expressed in Classless Inter-Domain Routing or CIDR format) may be included within a VNI's attributes in some embodiments, such as identifiers of subnets set up by a client within an IVN in which the VNI is to be used. In one embodiment an identification of at least one Domain Name Service (DNS) server responsible for propagating address(es) associated with the VNI, or other DNS-related information, may be included in VNI attributes as well. In some embodiments VNI attributes may include security-related properties. Some provider networks may allow users to specify rules, including for example firewall-related rules, for the types of incoming and/or outgoing traffic allowed at VMs to which a VNI may be attached. Such rules may be termed "security groups" and identified among a VNI's attributes in some embodiments. Various port and protocol restrictions may be enforced using such rules, and multiple rules may be associated with each VNI. For example, a client may use security groups to ensure that only HTTP and HTTPs outgoing or incoming traffic is allowed, to limit the set of TCP or UDP ports to which traffic is permitted, to filter incoming and outgoing traffic according to various policies, and so on. VNI security settings may be used to enforce cell isolation policies (e.g., to permit intra-IPCC traffic, and prohibit inter-IPCC traffic) in some embodiments. A number of other attributes may also be specified for VNIs in various embodiments, such as authorization related settings/permissions and the like.

Figure 4:
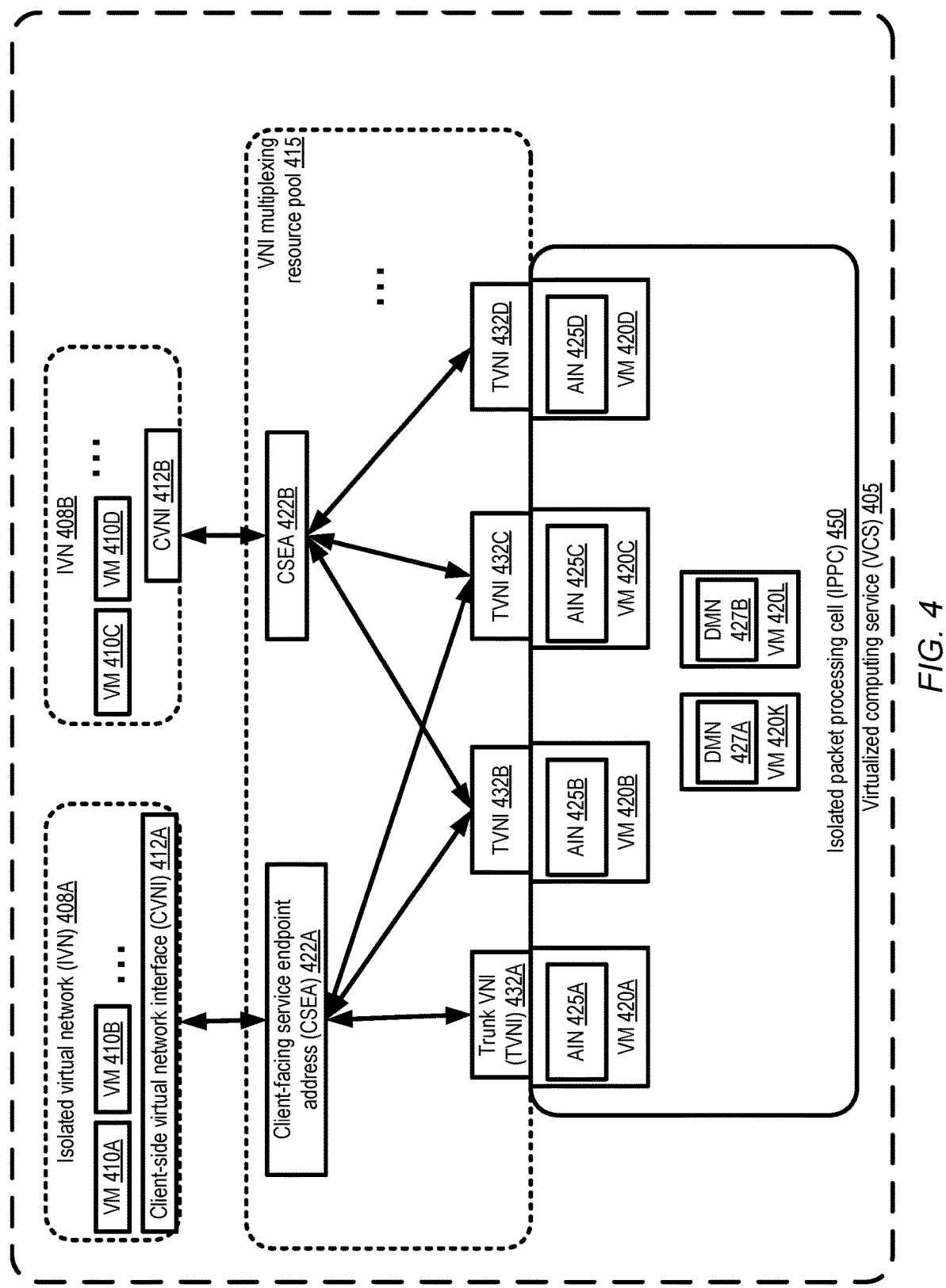
FIG. 4 illustrates an example use of multiplexed virtual network interfaces for communications between isolated networks and a packet processing service, according to at least some embodiments.

In at least one embodiment, VNIs may be arranged in a multiplexed configuration, making it easier to balance traffic workloads among a given set of sources and destinations. FIG. 4 illustrates an example use of multiplexed virtual network interfaces for communications between isolated networks and a packet processing service, according to at least some embodiments. Network packets are to flow between virtual machines (VMs) 410 of at two isolated virtual networks (IVNs) 408A and 408B using the resources of an IPPC 450 of a packet processing service implemented at a VCS 405 in the depicted example scenario. The packet processing service may have capabilities and features similar to the service 102 discussed in the context of FIG. 1. IVN 408A includes VMs 410A and 410B, each of which may have one or more virtual network interfaces attached in the depicted embodiment; similarly, IVN 408B comprises at least VMs 410C and 410D. In addition, the IVNs 408A and 408B may also each include a client-side VNI (CVNI) 412 set up to handle traffic directed to or received from other IVNs via the packet processing service in the depicted embodiment. Thus, IVN 408A comprises CVNI 412A, while IVN 408B comprises CVNI 412B. In various embodiments, APIs or other programmatic interfaces implemented by the packet processing service may be used to associate VNIs to be used for receiving/transmitting packets from isolated virtual networks 408A with AINs. For example, in response to obtaining an indication of a particular VNI (e.g., a CVNI 412) to be used for transmitting an application's packets to one or more action implementation nodes (AINs) of an IPPC, metadata indicating an association between the application, the VNI, and the IPPC may be stored at a control plane repository of the packet processing service in at least some embodiments.

IPPC 450, assigned to process packets flowing between IVNs 408A and 408B, may comprise a set of data plane nodes implemented at respective virtual machines in the depicted embodiment, such as action implementation nodes (AINs) 425A-425D at VMs 420A-420D, and decision manager nodes (DMNs) 427A and 427B at VMs 420K and 420L. An intermediary VNI multiplexing resource pool 415, comprising at least some number of client-facing service endpoint addresses (CSEAs) 422 and some number of trunk VNIs 432 may be utilized for communications between the AINs 425 and the IVNs 408 in at least some embodiments.

In at least some embodiments, a client-facing service endpoint address or CSEA 422 (which may, for example, be provided to a client in response to a request to attach an IVN to an instance of a packet processing application, such as a virtual traffic hub) may in effect serve as an identifier or target address of the packet processing service from the perspective of the IVN for which the CSEA is configured. Thus, in some embodiments the virtualization management stack (e.g., a hypervisor or an offloaded virtualization manager component) that transmits a network packet originating at a VM 410 of an IVN 408 may use the CSEA as a destination of an encapsulation packet, instead of having to obtain addresses of individual AINs. Individual AINs 425 may have their own trunk VNIs (TVNIs) 432 configured to receive packets that were originally directed to any of several CSEAs 422—e.g., each on the TVNIs 432 may receive packets directed to CSEA 422A (from IVN 408A) or 422B (from IVN 408B) in the depicted example scenario. A given CSEA may be used to direct packets to any of several AINs (e.g., using a shuffle sharding algorithm to select the particular AIN for a given packet), representing one level of multiplexing in the depicted embodiment. In a second level of multiplexing, a given TVNI 432 (e.g., TVNI 432A attached to VM 420A at which AIN 425A is instantiated, TVNI 432B attached to VM 420B of AIN 425B, TVNI 432C attached to VM 420C of AIN 420C, or TVNI 432D attached to VM 420D of AIN 425D) may receive packets from (or transmit packets to) VMs any of several IVNs in the depicted embodiment via the respective CSEAs 422 of the IVNs. Using this multiplexing approach in combination with the IPPCs of the packet processing service, numerous (e.g., tens or hundreds of thousands of) resources at a large number of isolated networks may be able to communicate with one another according to client-selected policies and client-provided metadata in various embodiments. In at least some embodiments, a given TVNI may itself be programmatically associated with multiple branch VNIs, e.g., with respective distinct IP addresses and security settings, enabling even more sophisticated multiplexed traffic management at individual VMs 420. It is noted that in at least some embodiments, multiplexing techniques such as those shown in FIG. 4 may not be employed.

Packet Flow Identifier Elements

Figure 5:
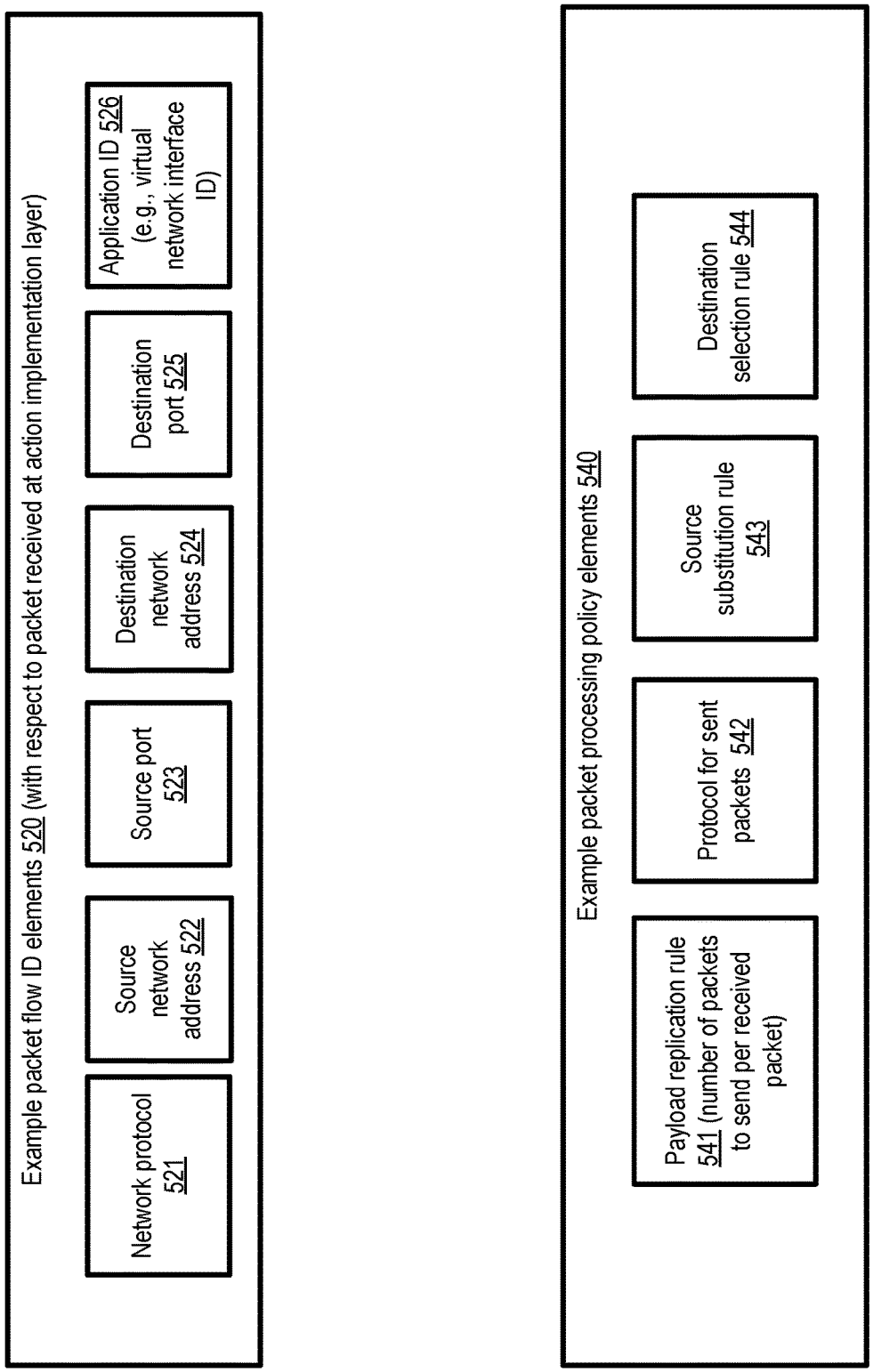
FIG. 5 illustrates example packet flow identifier elements and example packet processing policy elements, according to at least some embodiments.

In at least some embodiments, a given action, generated based on a client-selected policy at the decisions layer of a packet processing service (PPS) similar to service 102 of FIG. 1, may potentially be applied to a group of related packets referred to as a packet flow, or simply as a flow. FIG. 5 illustrates example packet flow identifier elements and example packet processing policy elements, according to at least some embodiments. A flow may be characterized (or distinguished from other flows) based on one or all of the following attributes or elements 520 of packets received at the packet processing service in the depicted embodiment: the network protocol 521 used for sending the packet to the PPS, the source network address 522, the source port 523, the destination network address 524, the destination port 525, and/or an application identifier 526 (e.g., an identifier of a specific virtual network interface set up for communications between an isolated network and the PPS). In some embodiments the direction in which the packets are transmitted (e.g., towards the PPS, or away from the PPS) may also be included as an identifying element for the flow. A number of different networking protocols may be supported in different embodiments—e.g., including the Internet Protocol (IP), the Transmission Control Protocol (TCP), the User Datagram Protocol (UDP), the Internet Control Message Protocol (ICMP), protocols that do not belong to or rely on the TCP/IP suite of protocols, and the like. The particular combination of attributes that are used to distinguish one group of packets from another for a given packet processing application requirement or client may be referred to collectively as packet flow identifier elements 520 in some embodiments. The process of selecting a particular node or cell from among the accessible nodes/cells of the action implementation layer may include flow hashing (e.g., in addition to or instead of shuffle sharding) in some embodiments. Some or all of the packet flow identifier elements 520 of a given packet may be aggregated (e.g., via concatenation or using some other function) in some implementations, and the result of the aggregation may be provided as input to a selected hash function, with the output of the hash function used to select the particular node or cell as part of the flow hashing.

As mentioned earlier, in various embodiments clients of the packet processing service may indicate policies that are used at the decision masters to generate actions for various flows. A given policy may in turn include several types of rules, parameters or elements 540 in the depicted embodiment. The particular set of parameters used for a given client's application may differ from the set of parameters used for a different application of the same client (or from the parameter set used for some other client's application). A payload replication rule 541 may indicate how many replicas of a given received packet's contents or body are to be transmitted to respective destinations—e.g., if a multicast protocol is to be implemented for a given client and the destination multicast group contains eight endpoints, the payload replication parameter may indicate that eight replicas are to be transmitted. By default, e.g., if a payload replication rule is not included, a single outbound or transformed packet may be generated corresponding to each received packet in some embodiments.

For some packet processing applications, in some embodiments the PPS may act as a protocol translator—e.g., incoming packets may be received via a particular networking protocol (such as TCP), while corresponding outgoing packets may be sent via a different protocol (such as UDP, or a custom networking protocol that is not part of the TCP/IP family of protocols). The protocol for sent packets element 542 of the policy may indicate whether such a protocol change is to be implemented, and if so, the specific protocol to be used for the transformed packets. Source substitution rule 543 may indicate whether the source address and/or source port are to be changed, and if so, the acceptable source (address, port) range to be used for the transformed packets in various embodiments. Similarly, destination selection rule 544 may indicate whether the destination address and/or port is to be changed as part of a packet transformation, and if so, what the acceptable destination addresses and/or ports are for the flow being considered. In some cases (e.g., for multicast), multiple destinations may be indicated corresponding to a given received packet. In some embodiments, at least some packet processing policies may not take all the different elements 540 shown in FIG. 5 into account, and/or parameters not shown in FIG. 5 may be considered for some packet processing policies.

Example Application Categories

Figure 6:
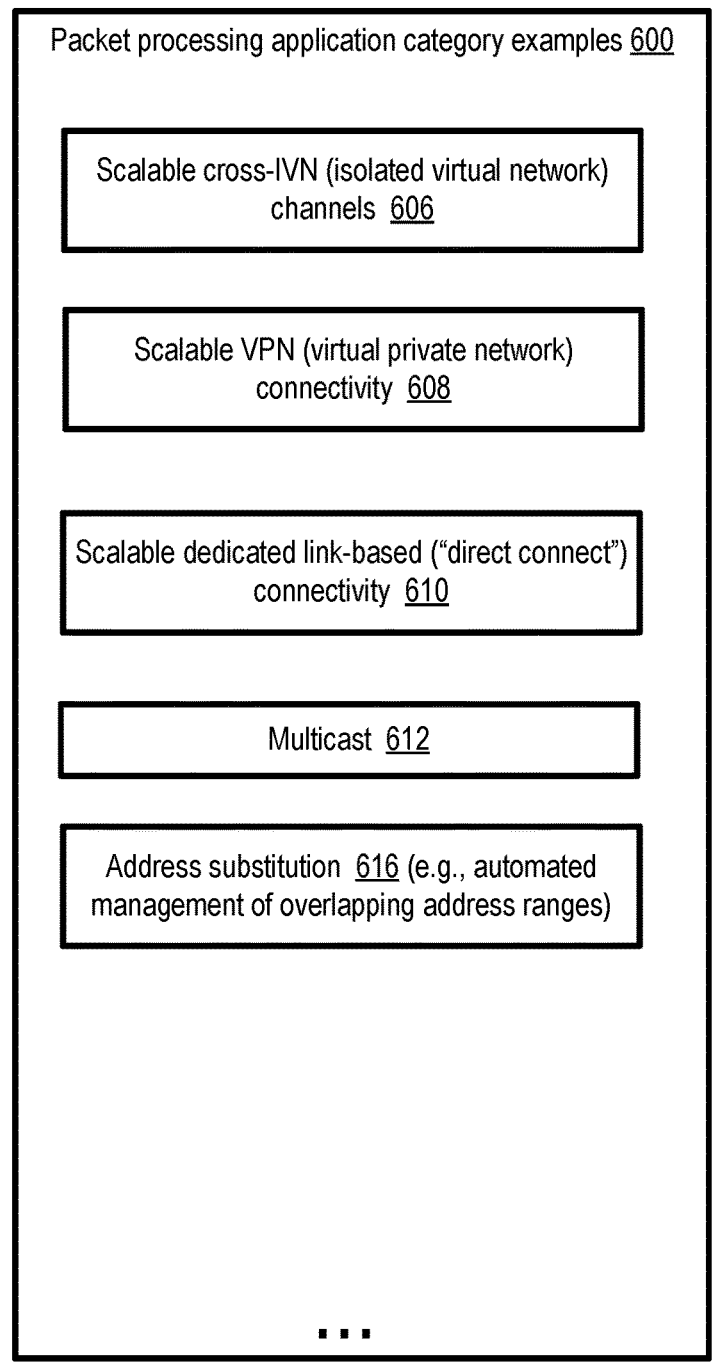
FIG. 6 illustrates example categories of packet processing applications that may be implemented using a cell-based packet processing service, according to at least some embodiments.

FIG. 6 illustrates example categories of packet processing applications that may be implemented using a cell-based packet processing service, according to at least some embodiments. As shown, application categories 600 in the depicted embodiment may include, for example, scalable cross-IVN (isolated virtual network) channels 606, scalable VPN (virtual private network) connectivity 608, scalable dedicated-link connectivity 610, multicast 612, address substitution 616, and the like. Other types of packet processing applications may be supported in various embodiments. In general, a packet processing service with capabilities similar to that of the service shown in FIG. 1 may be configurable to implement any desired type of packet processing or transformations (or combinations of different types of packet processing or transformations), with nodes being assignable dynamically at each layer to support a large range of traffic rates in a transparent and scalable manner.

In some embodiments, as described earlier, the packet processing service may be implemented at a provider network in which isolated virtual networks can be established. In such embodiments, the packet processing service may be used for an application, such as a virtual traffic hub, that acts as intermediary or channel between the private address spaces of two or more different IVNs, in effect setting up scalable and secure cross-IVN channels 606. In at least some embodiments, the PPS may also or instead be used to support scalable VPN connectivity 608 between some set of resources within a provider network and one or more client networks or client premises outside the provider network, or between multiple client-premises networks each linked via VPN connections to the PPS. In some embodiments, a provider network may support connectivity 610 with external networks via dedicated physical links called "direct connect" links, and the traffic between such external networks (and between such external networks and IVNs or VPN-connected external networks) may be managed using the packet processing service. Address substitution 616, as the name suggests, may involve replacing, for the packets of a particular flow, the source address and port in a consistent manner. Such address substitution techniques may be useful, for example, when an overlap exists between the private address ranges of two or more isolated networks, and the packet processing service may be employed as the intermediary responsible for such substitutions in some embodiments. Multicast 612 is a networking technique, implementable using a PPS in some embodiments, in which contents (e.g., the body) of a single packet sent from a source are replicated to multiple destinations of a specified multicast group. Note that at least in some embodiments, a single instance of an application may combine several of the packet processing functions indicated in FIG. 6 (and/or other packet processing techniques). For example, a single instance of a virtual traffic hub application (of the kind discussed below in further detail) built using the PPS may concurrently implement scalable cross-IVN channels, scalable VPN connectivity, scalable dedicated-link based connectivity, and so on in some embodiments. Other categories of packet processing applications may be supported using the PPS in different embodiments, while at least some of the types of applications indicated in FIG. 6 may not be supported in some embodiments.

Cell Configuration Parameters

Figure 7:
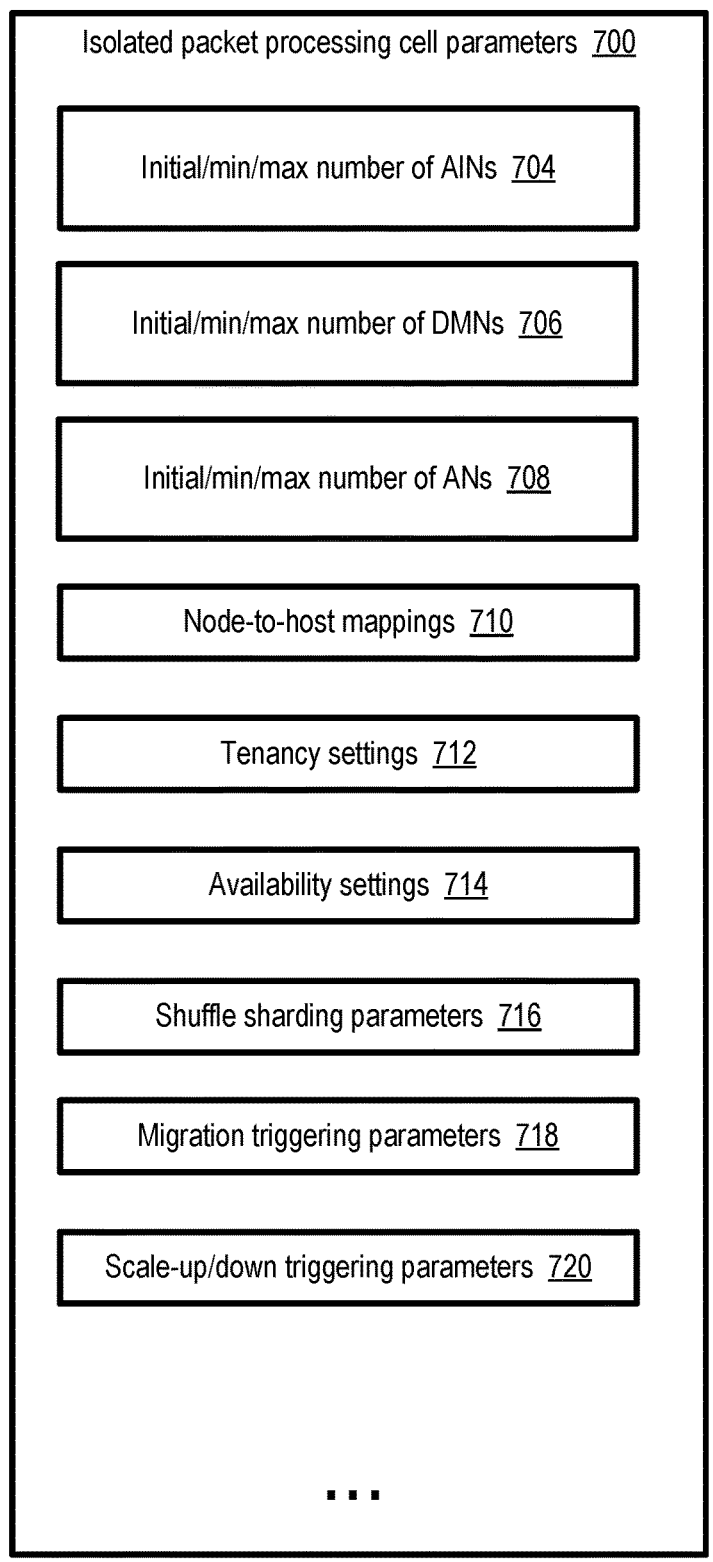
FIG. 7 illustrates example configuration parameters of a cell of a packet processing service, according to at least some embodiments.

As discussed earlier, in various embodiments a packet processing service similar to that shown in FIG. 1 may be organized as a collection isolated cells, enabling the resources assigned to different applications to be managed separately. FIG. 7 illustrates example configuration parameters of a cell of a packet processing service, according to at least some embodiments. At least some of these parameters may be set based on input provided by clients on whose behalf packet processing applications are to run in various embodiments. The packet processing service may assign default values to one or more of the parameters in at least one embodiment.

Initially, when a new isolated packet processing cell (IPPC) is set up, it may be provisioned with a default or baseline number of action implementation nodes (AINs), decision master nodes (DMNs) and administration nodes (ANs) in the depicted embodiment. The control plane components of the packet processing service may analyze various collected metrics, such as resource utilization levels, responsiveness, and the like, of the data plane nodes including the AINs and the DMNs, as well as ANs themselves in various embodiments, and increase/decrease the number of nodes at the various layers as needed based on threshold conditions being met. IPPC parameters 700 may include the initial, minimum and maximum number of AINs 704, DMNs 706 and ANs 708 in the depicted embodiment. In some embodiments, the ratio of the number of nodes at different layers may be kept fixed (e.g., for every DMN, two AINs may be configured), so that when the number of nodes at a given layer is modified, that change is accompanied by proportional changes at other layers.

As mentioned earlier, in at least some embodiments, AINs, DMNs and/or ANs may be implemented as programs running on virtual machines, and a given virtualization host may be able to support multiple virtual machines. Even in scenarios in which virtual machines are not used, e.g., when the individual nodes at one or more layers comprise one or more processes running within operating systems on un-virtualized physical machines, in some implementations multiple nodes of one or more layers may be instantiated at a given host. The node-to-host mappings parameter 710 may indicate how many nodes at the various layers are to be implemented at a given host in the depicted embodiment.

A tenancy settings parameter 712 may govern whether the cell is to be used for a single application of a single client, multiple applications of only a single client, or multiple applications of respective clients in some embodiments. Availability settings 714 may indicate, for example, the minimum/default/maximum number of availability containers to be used for the nodes of the IPPC in some embodiments. Shuffle sharding parameters 716 may indicate how many different AINs of the IPPC are to be used for packets associated with a given source or destination endpoints, and how much overlap is permitted between the sets of AINs used for different endpoints in the depicted parameter. According to a shuffle sharding algorithm, if the IPPC comprises N AINs, packets from a given source endpoint E1 may be directed (e.g., based on hashing of packet header values) to one of a subset S1 of K AINs (K<N), and packets from another source endpoint E2 may be directed to another subset S2 of K AINs, where the maximum overlap among S1 and S2 is limited to L common AINs. Migration triggering parameters 718 may indicate the threshold conditions which are to result in the initiation of an application migration from one IPPC to another (an example of a multi-phase migration procedure is provided below). Scale-up/down triggering parameters 720 may indicate under what conditions new AINs, DMNs and/or ANs are to be instantiated within the IPPC, and under what conditions the number of AINs, DMNs and/or ANs is to be reduced. In some embodiments, the management of an IPPC may be guided by parameter settings other than those shown in FIG. 7. In at least one embodiments, one or more of the parameters 700 may not be used.

Application Migration Across Cells

As suggested above, one of the tenets of the cell-based design of the packet processing service of the kind introduced above is to minimize interactions across cell boundaries. When a multi-tenant mode of operation is being used, however, it may sometimes be the case that the total workload of the set of applications to which a given IPPC is assigned becomes too large to be handled by the maximum number of AINs, DMNs and ANs that the cell can accommodate. In such scenarios, the traffic associated with a given application may be migrated to a different IPPC in at least some embodiments. Such migrations may also be initiated in some embodiments even if the source IPPC (the IPPC from which the application is being migrated) is operating in single-tenant mode—e.g., when the application's workload exceeds the maximum capacity of the source IPPC, a larger IPPC may have to be employed.

Figure 8:
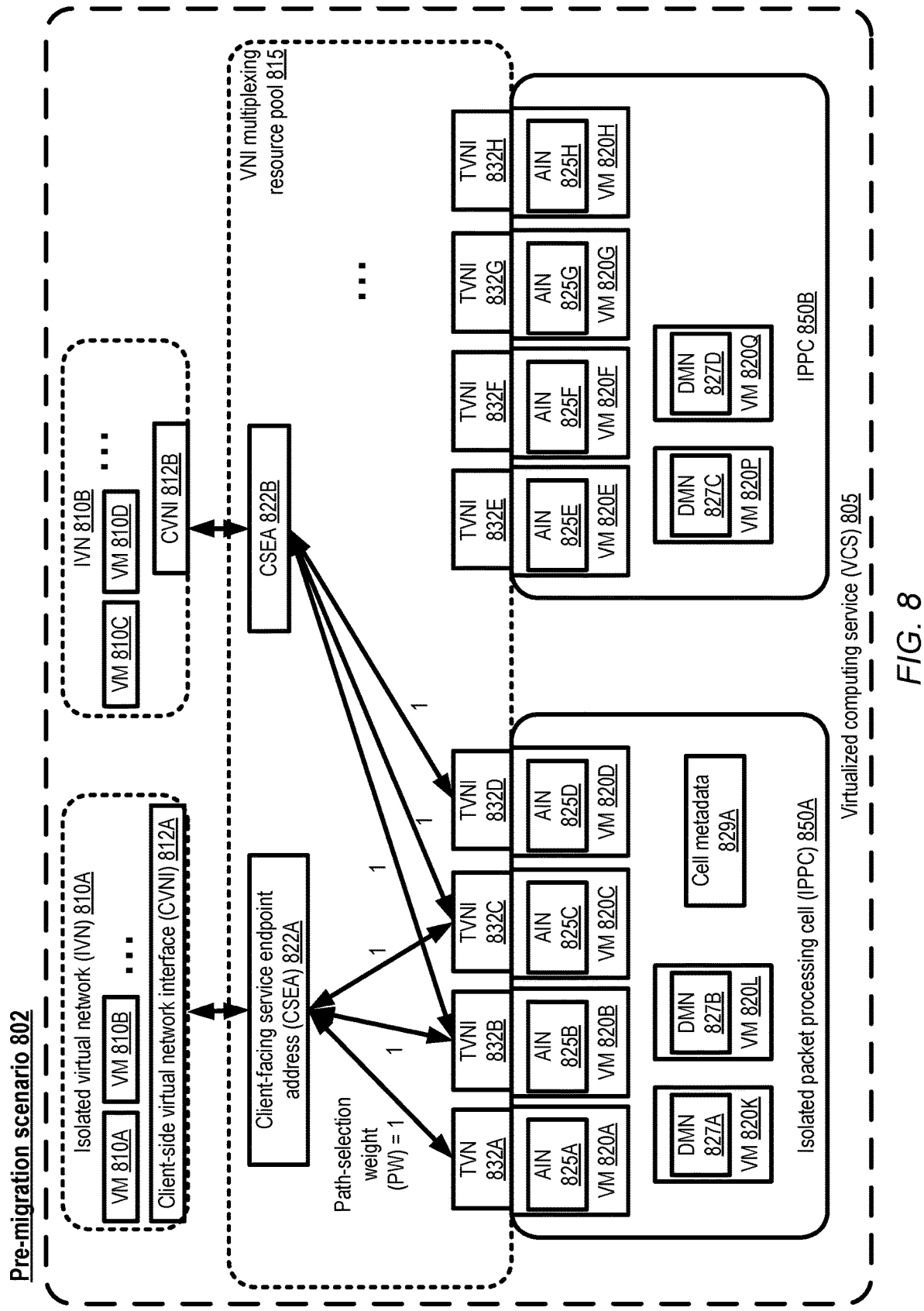
FIG. 8, FIG. 9, FIG. 10 and FIG. 11 collectively illustrate an example technique for migrating traffic of an application between cells of a packet processing service, according to at least some embodiments.

FIG. 8, FIG. 9, FIG. 10 and FIG. 11 collectively illustrate an example technique for migrating traffic of an application between cells of a packet processing service, according to at least some embodiments. FIG. 8 illustrates the pre-migration scenario 802. An IPPC 850A (the source IPPC from which application is to be migrated) is being used to provide connectivity between two isolated virtual networks (IVNs) 810A and 810B of a virtualized computing service. IPPC 850A comprises AINs 825A-825D running on virtual machines (VMs) 820A-820D, as well as DMNs 827A and 827B running on VMs 820K and 820L. Cell metadata 829A of IPPC 850A may comprise, for example, forwarding information base entries, configuration settings identifying the set of AINs and DMNs being used, health information of the DMNs and AINs etc. A virtual network interface (VNI) multiplexing resource pool is being used for connecting the IVNs to the AINs in the depicted embodiment, using techniques similar to those shown in FIG. 4. For IVN 850A, which has a client-side virtual network interface 812A and a collection of VMs such as 810A and 810B from which packets directed to IVN 850B originate (and at which packets originating at IVN 850B may be received), a client-facing service endpoint address (CSEA) 822A has been configured. Individual ones of the AINs 825A-825D have an attached trunk VNI 832 (TVNIs 832A-832D), and traffic being received at CSEA 822A is being distributed among a group of 3 TVNs—TVN 832A 832B and 832C e.g., in accordance with a shuffle sharding algorithm in the depicted embodiment. Similarly, CSEA 822B is established for traffic associated with the CVNI 812B and VMs 810C and 810D of IVN 850B in the depicted example scenario. IPPC 850B, which has its own set of DMNs and AINs running on VMs with attached TVNIs, is not currently in use for the traffic flowing between IVNs 850A and 850B.

In various embodiments in which multiple paths between a CSE 822 and the TVNIs 832 may potentially be available, respective path selection weights (PWs) may be used to control which paths are actually to be used; for example, a PW value of 1 may indicate that the path is to be used for at least some time interval, while a PW value of 0 may indicate that the path is not to be used for at least some time interval. As shown, in the pre-migration scenario 802, path selection weights "1" have been assigned to three paths each between CSEAs 822 and the TVNIs of IPPC 850A. Traffic is flowing between the VMs of IVNs 850A and 850B, via the IPPC 850A, in accordance with a policy and forwarding metadata specified by a client.

Figure 9:
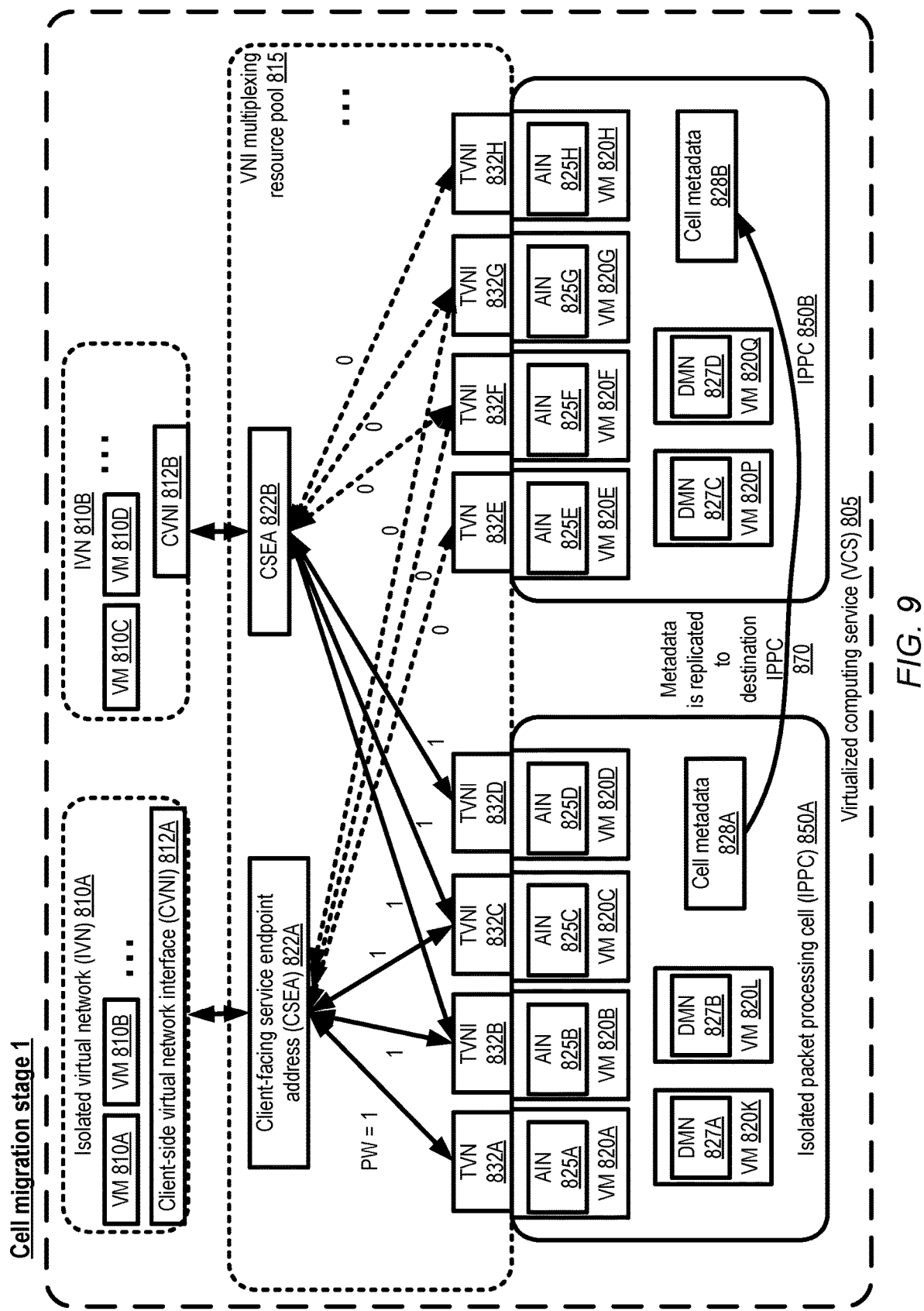

At some point, a decision to migrate the application to IPPC 850B may be made (e.g., based on analysis of metrics obtained from IPPC 850A and/or IPPC 850B), and a phased migration technique may be initiated in the depicted embodiment. The first stage or phase of the migration is illustrated in FIG. 9. As shown, in this stage, configuration changes (e.g., programmatic associations of CSEAs with TVNIs) may be performed to enable traffic to flow between the CSEAs 822 and the TVNs of the IPPC 850B, with three TVNs out of the four (TVNIs 832E-832H) being selected for each CSEA 822 (the same number of TVNIs as were being used at IPPC 850A in the pre-migration scenario). In addition, at least a portion of the cell metadata 828A may be copied to IPPC 870, as indicated by arrow 870. At this first stage, however, path selection weights of zero may be assigned for a brief period to the new paths (e.g., between CSEA 822A and TVCNs 832E-832G, and between CSEA 822B and TVNIs 832F-832H), so the application traffic continues to be processed at IPPC 850A. The brief assignment of zero weights may, for example, enable configuration information to be propagated to the destination cell AINs (AINs 825E-825H) before the implementation of the application's actions is initiated at the destination IPPC 850B.

Figure 10:
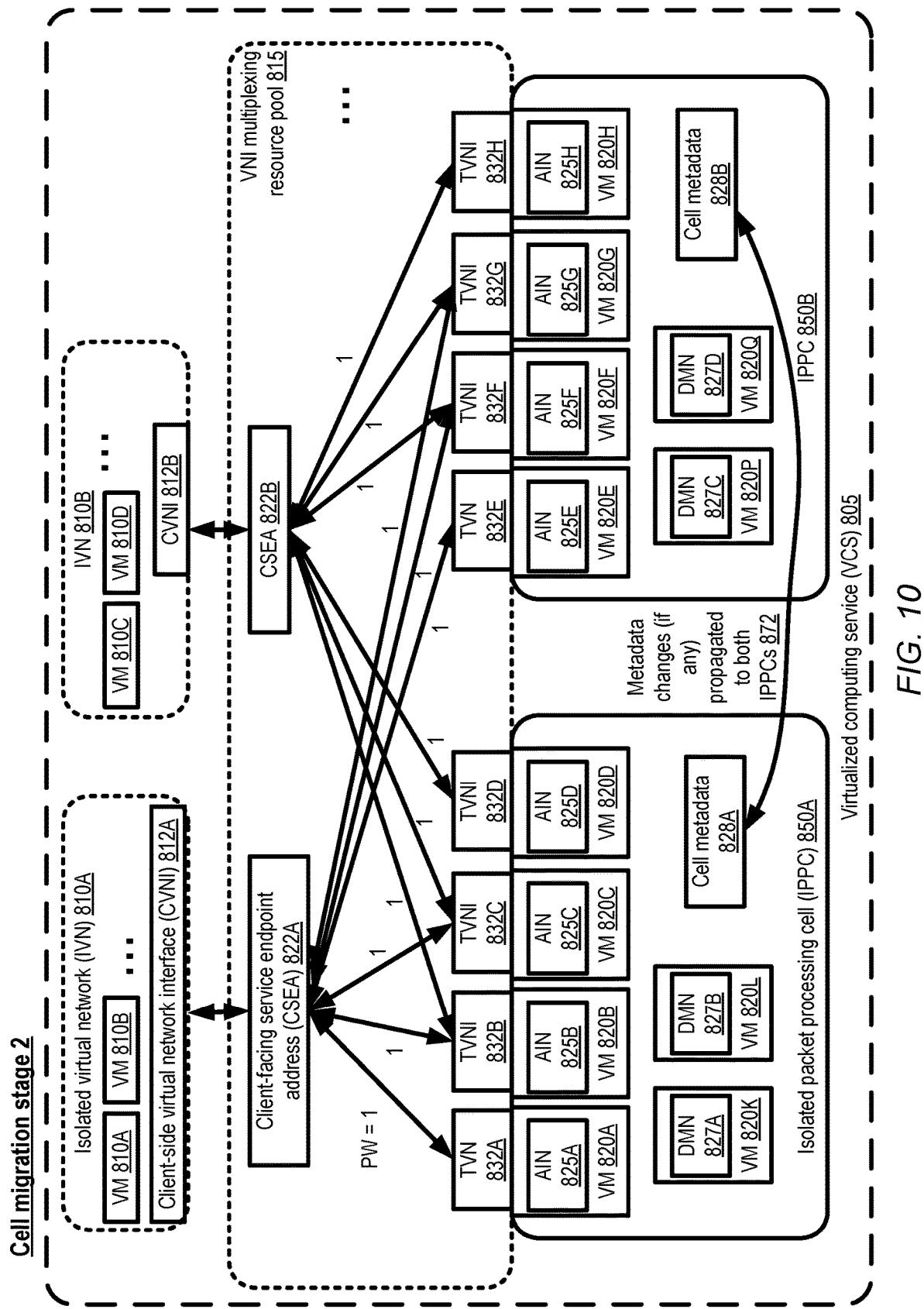

Stage 2 of the migration procedure is illustrated in FIG. 10. At this stage, the path selection weights for both sets of paths may briefly be set to 1, enabling traffic to be directed to both the source and destination IPPCs. As discussed earlier, flow hashing may be used to select individual AINs (from either IPPC) for individual packet flows. Because both cells contain the metadata needed at the DMNs to generate the actions to be implemented, and all possible intra-IPPC (AIN-to-AIN) forwarding paths exist at both IPPCs, all received packets may be processed and forwarded correctly in Stage 2, without requiring packets to be transmitted between the IPPCs 850A and 850B. Metadata changes, if any are indicated by the client, may be propagated to both IPPCs as indicated by arrow 872, keeping both sets of metadata effectively in sync in the depicted embodiment. Note that the replication and propagation of cell metadata, indicated by arrows 870 and 872 in FIG. 9 and FIG. 10 respectively, represent control-plane operations and may be accomplished without using data plane resources in at least some embodiments.

Figure 11:
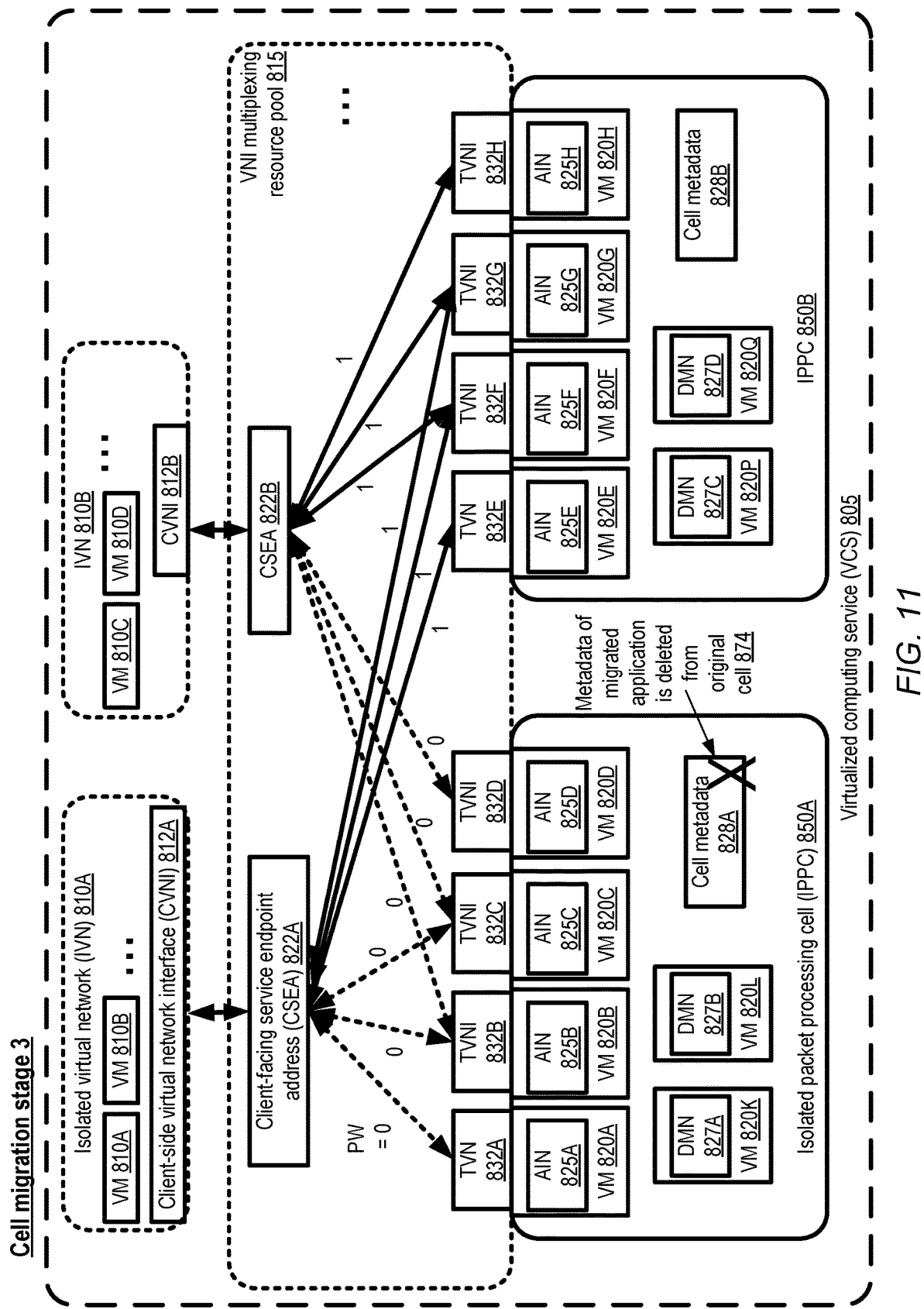

In the final stage (Stage 3) of the migration, depicted in FIG. 11, the path selection weights assigned to the paths that were being used pre-migration may be set to zero, thereby draining the traffic from IPPC 850A and directing all the traffic between IVNs 810A and 810B to IPPC 850B. The portion of cell metadata 828A corresponding to the migrated application may be deleted from IPPC 850A as indicated by arrow 874 in the depicted embodiment. Using the multi-stage approach illustrated in FIG. 8-FIG. 11, applications may be transferred from one IPPC to another without requiring data plane packets to be transferred across cell boundaries in various embodiments, thereby complying with the cell-based isolation principle underlying the design of the packet processing service.

Control Plane Overview

Figure 12:
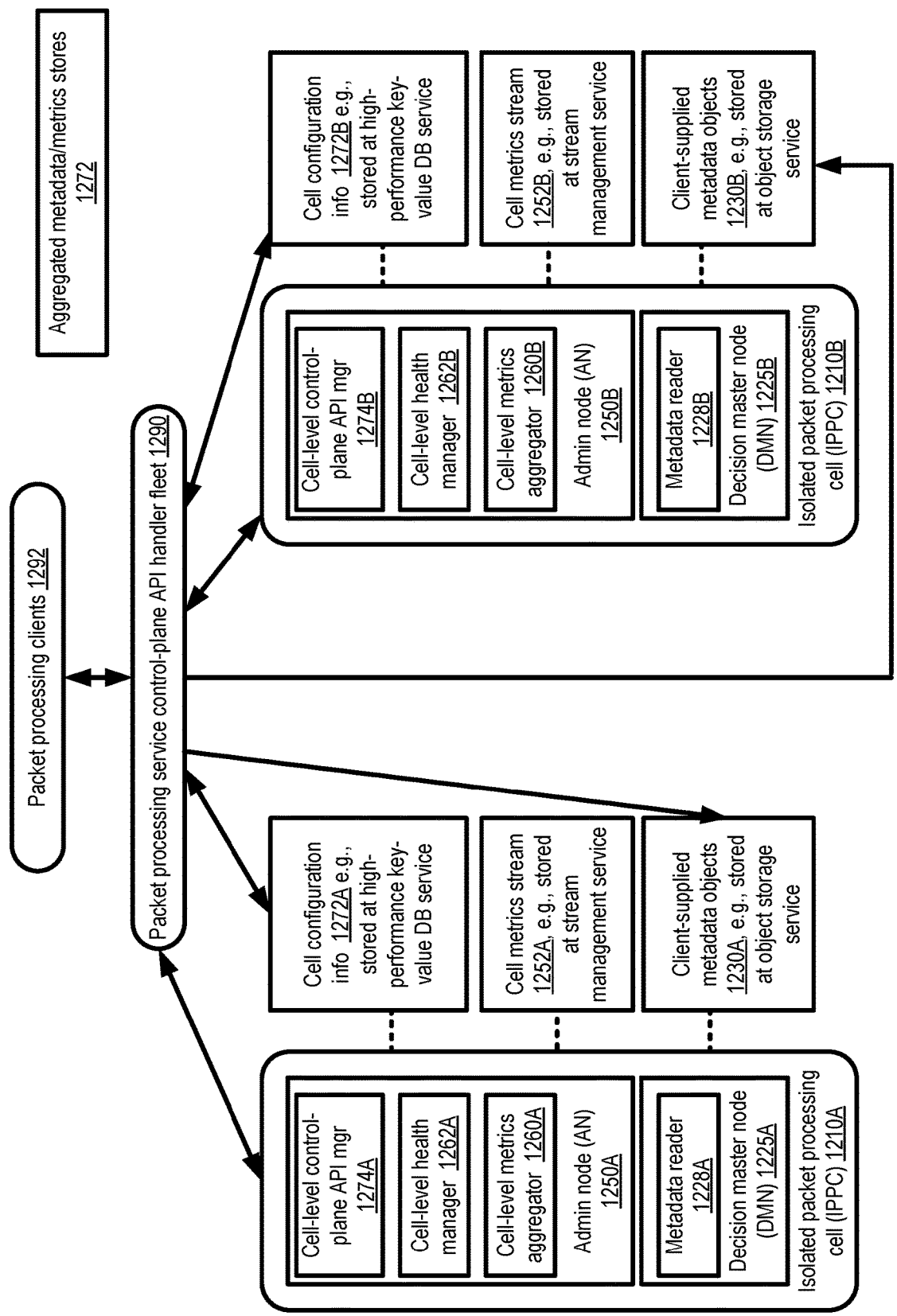
FIG. 12 illustrates example control-plane elements of a packet processing service, according to at least some embodiments.

FIG. 12 illustrates example control-plane elements of a packet processing service, according to at least some embodiments. As shown, an API handler fleet 1290 of a packet processing service with features and capabilities similar to that of service 102 of FIG. 1 may be established to receive programmatic requests from clients 1292 in the depicted embodiment. In some embodiments, API handlers of fleet 1290 may be responsible for assigning a particular isolated packet processing cell (IPPC) 1210, such as IPPC 1210A or 1210B, for a given client's application instance. In other embodiments, a separate cell mapping manager fleet may be responsible for the assignment of IPPCs to clients.

Control plane or administrative information may be managed using a number of components within a given IPPC, as well as a collection of network-accessible services other than the packet processing service itself in the depicted embodiment. As shown, a given IPPC such as 1210A or 1210B may comprise at least one administration node (AN) 1250 such as 1250A or 1250B. An AN 1250 may in turn comprise a cell-level control-plane API manager 1274 (e.g., 1274A or 1274B), a cell-level health manager 1262 (e.g., 1262A or 1262B), and/or a cell-level metrics aggregator 1260 (e.g., 1260A or 1260B). The cell-level API manager 1274, for example, receive administrative commands from, and provide responses to, the API handler fleet 1290. Such administrative commands may, for example include startup/shutdown commands to be transmitted to various data plane nodes and/or other configuration change requests. Configuration information 1272 (e.g., 1272A or 1272B) of the IPPC (e.g., the number and identifiers of the data plane nodes, shuffle-sharding parameters, and the like) may be stored at a separate repository in some embodiments, such as a high-performance key-value database service. In at least one embodiment, a network-accessible data stream management service may be used to store various metrics streams 1252 (e.g., 1252A or 1252B) collected from the data plane and control plane nodes of the IPPC, such as resource usage and other performance measurements, the number of packet processing actions performed per flow or per application during various intervals, and so on. In the depicted embodiment, a cell-level health manager 1262 may be responsible for collecting node health information pertaining to various nodes of the IPPC and providing the health information to higher-level health data aggregators.

While the decision master nodes (DMNs) may primarily perform data plane functions in various embodiments, they may need to obtain metadata (e.g., forwarding information base contents and the like) provided to control plane components by service clients. Accordingly, in at least some embodiments, one or more of the DMNS 1225 (e.g., DMN 1225A or 1225A) may comprise a respective metadata reader 1228 (e.g., 1228A or 1228B) that obtains client-supplied metadata 1230 (e.g., 1230A or 1230B) needed for determining and generating packet processing actions. In some embodiments, when such metadata is received at the API handler fleet 1292, it may be stored as one or more objects within an object storage service, and the metadata readers 1228 of the DMNs of the IPPC for which the metadata may be provided the identifiers of the objects and the appropriate credentials to access the objects. In some embodiments, a push methodology may be used to propagate the metadata—e.g., whenever a client supplies a new version or update, that new version may be immediately transmitted to the metadata readers. In other embodiments, a pull methodology may be employed, in which the metadata readers periodically check for updated client metadata, or a combination of a pull and push methodology may be employed in which the metadata readers periodically verify that they have the most recent metadata.

In various embodiments, cell level metadata and metrics may be collected from a plurality of IPPCs 1210 of the packet processing service and stored in an aggregate metadata/metrics store 1272 (which may, for example, also comprise some number of tables in a high performance key-value database). Such aggregated information may be used, for example, to enable the operator of the packet processing service to analyze trends across different applications and clients, make long-term equipment acquisition plans and the like.

Node Health Management

Figure 13:
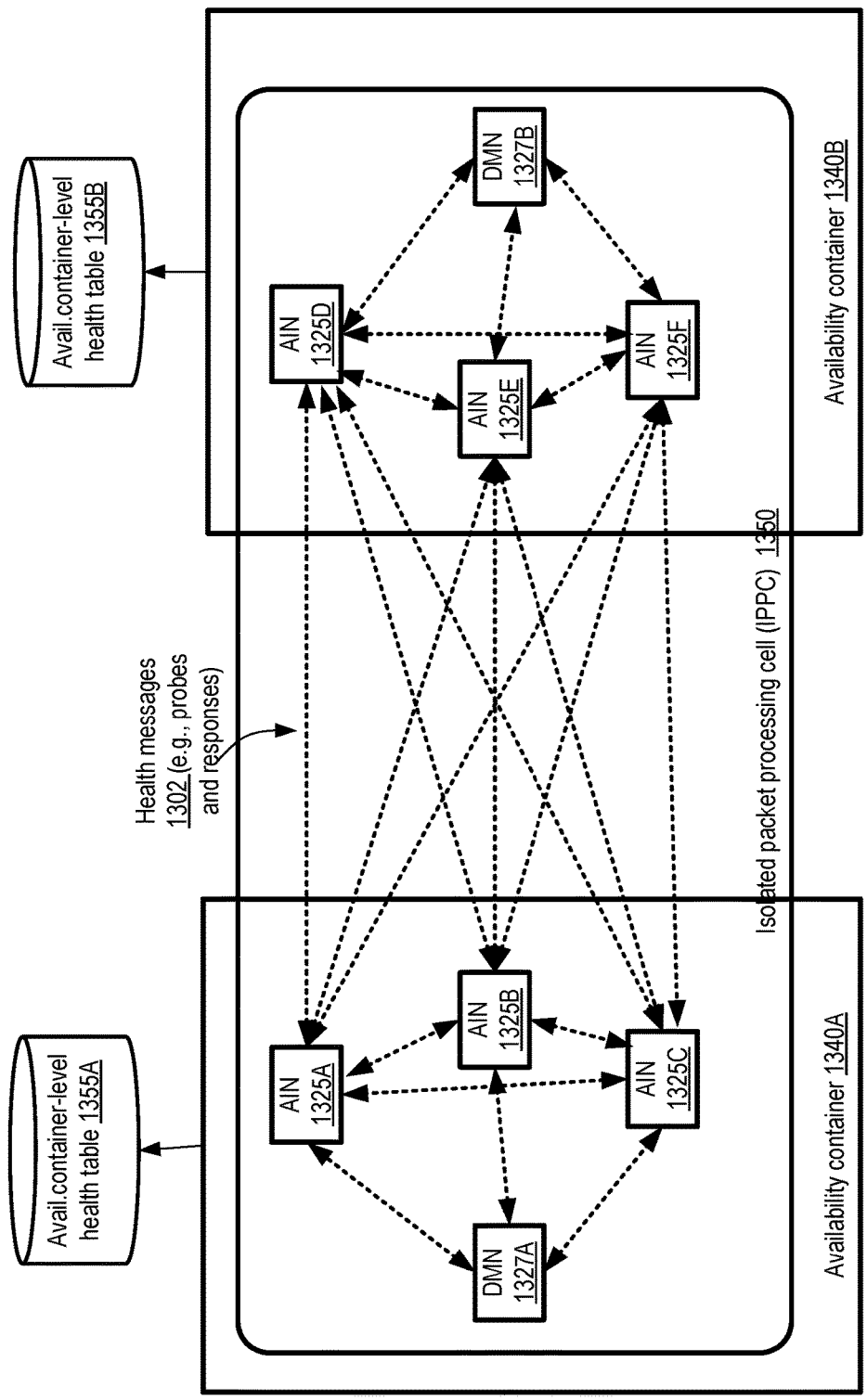
FIG. 13 illustrates example pathways of health-related messages among nodes of an isolated packet processing cell, according to at least some embodiments.

A packet processing service may be responsible for ensuring that sufficient numbers of nodes of the data plane remain operational and responsive in order to be able to process the workloads of client applications. In order to do so, multiple availability containers of the kind introduced above, as well as a number of node health monitoring and analysis techniques may be implemented in various embodiments. FIG. 13 illustrates example pathways of health-related messages among nodes of an isolated packet processing cell, according to at least some embodiments. In the depicted embodiment, an isolated packet processing cell 1350 of a packet processing service similar to that discussed earlier comprises AINs 1325 and DMNs 1327 distributed among two availability containers 1340A and 1340B of a provider network. DMN 1327A, as well as AINs 1325A, 1325B and 1325C are instantiated in availability container 1340A, while DMN 1327B, AINs 1325D, 1325E and 1325F are instantiated in availability container 1340B.

In the depicted embodiment, individual ones of the AINs 1325 may be responsible for monitoring and communicating health (e.g., node reachability and responsiveness) information pertaining to other AINs and/or DMNs of the cell. As such, a given AIN 1325 may send health probe messages periodically to each other AIN of the IPPC, including AINs in its own availability container as well as other availability containers being used by the IPPC, and receive corresponding responses from each of the other AINs. For example, as shown, AIN 1325A may send probes not just to AINs 1325B and 1325C in its own availability container 1340A, but also to AINs 1325D-1325F in availability container 1340B. Furthermore, a given AIN 1325A may also be configured to send health probes to DMNs 1327 within its own availability container 1340—e.g., each of AINs 1325A, 1325B and 1325C of availability container 1340A sends health probes to DMN 1327A within the same availability container 1340A, while in availability container 1340B each of AINs 1325D, 1325E and 1325F sends health probes to DMN 1327B. In at least some embodiments, a form of piggybacking may be used for at least some health information messages 1302. For example, when sending a health probe message to a DMN 1327, an AIN may include the latest health information (e.g., reachability status or the like) available at the AIN regarding other nodes in the message. In at least one embodiment, when a DMN 1327 replies to a health probe, it may include a timestamp indicating when its local metadata reader obtained the most recent version of the client-supplied metadata used to make packet processing decisions at the DMN. In some embodiments, the health information collected at AINs/DMNs of individual availability containers being used for one or more cells may be stored at aggregated tables, such as per-availability-container tables 1355A and 1355B.

Figure 14:
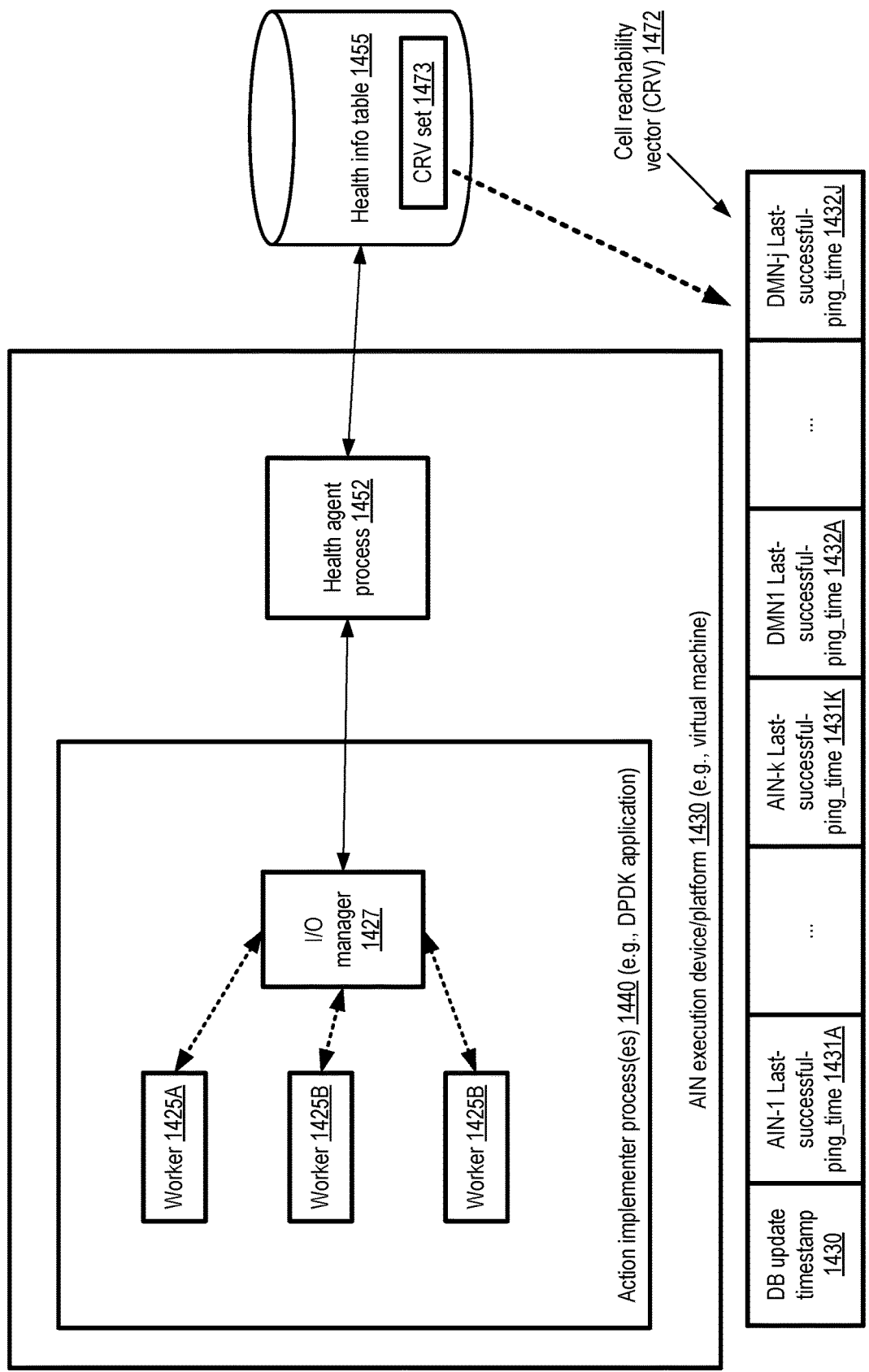
FIG. 14 illustrates an example technique which may be employed to gather health information within an action implementation node of a packet processing service, according to at least some embodiments.

A given AIN or DMN may itself comprise a plurality of execution engines, such as respective virtual cores or threads in embodiments in which virtual machines are being employed for IPCC nodes. FIG. 14 illustrates an example technique which may be employed to gather health information within an action implementation node of a packet processing service, according to at least some embodiments. In some embodiments, an AIN execution device/platform 1430 (e.g., a virtual machine or a physical machine) may comprise one or more action implementer process(es) 1440 as well as a health agent process 1452. In some embodiments, the Data Plane Development Kit (DPDK), which comprises a set of data plane libraries and network interface controller drivers for fast packet processing, may be used to create the programs which are manifested as the processes 1440. In other embodiments, DPDK may not necessarily be used.

An action implementer process 1440 may in turn comprise an I/O manager 1427 as well as some number of workers 1425, such as 1425A-1425C in the depicted embodiment. Individual workers may be responsible for implementing actions for a respective set of packet flows, with workers being selected for various flows using flow hashing in at least some embodiments. The I/O manager 1427 and/or the workers 1425 may each be implemented using a respective virtual core or execution thread in some embodiments. The health agent process 1452 may receive health probes sent from other AINs, and pass them on to the I/O manager 1427 in at least some embodiments. The I/O manager 1427 may in turn forward respective health probes to each of the workers 1425, and collect the corresponding responses. In some embodiments, the probes may be considered the logical equivalents of ping or heartbeat messages, and probe responses may indicate that the probed worker is alive and responsive as of a particular timestamp. From the individual worker-level health responses, the health status of the AIN as a whole may be determined— e.g., in some embodiments, all the workers 1425 may be expected to be responsive in order to declare the AIN healthy. In addition, the health agent process may also send health probes to other AINs and DMNs, receive responses from those nodes (based on a similar per-worker response obtained at those nodes), and pass them on to the I/O manager in various embodiments. In at least some embodiments, individual DMNs may also comprise a health agent process and a decision making process with workers and an I/O manager, and a similar health related message flow to that illustrated in FIG. 14 may be employed at DMNs.

The health agent process 1452 may transmit the collected health status from the action implementer process 1440 to a health information tables 1455 in the depicted embodiment. The table 1455 may comprise a set 1473 of cell reachability vectors (CRVs) 1472 in some embodiments. A given CRV 1472 may, for example, include a database update timestamp 1430 indicating the time at which the CRV was created/inserted into the table, and a respective last-successful-ping-time value for individual ones of the AINs (e.g., ping-time value entries 1431A-1431K) and DMNs (e.g., ping-time value entries 1432A-1432J) of the IPPC. The cell reachability vectors 1472 may be analyzed and used, for example, at the packet processing service control plane to make decisions regarding replacement of unhealthy nodes and the like. In the depicted embodiment, each AIN (e.g., the action implementer process of the AIN) may receive responses to the health probes sent from the AIN to other nodes, and construct a local reachability vector with entries indicating the responsiveness of other nodes in at least some embodiments, similar in concept to the cell reachability vectors. Similar local reachability vectors may also be constructed at DMNs in such embodiments. In scenarios in which the IPPC comprises several DMNs, the local reachability information at AINs may be used to pick the "healthiest" (most responsive) DMN as the target for action queries in some embodiments. Similarly, when responding to an action request, local reachability information (which may have been provided by AINs to the DMN) may be used at a DMN to pick the healthiest (most responsive) AIN for an action in at least some embodiments, e.g., if several AINs are available as potential next-hops for a routing/forwarding action.

Methods for Implementing Cell-Based Packet Processing Service

Figure 15:
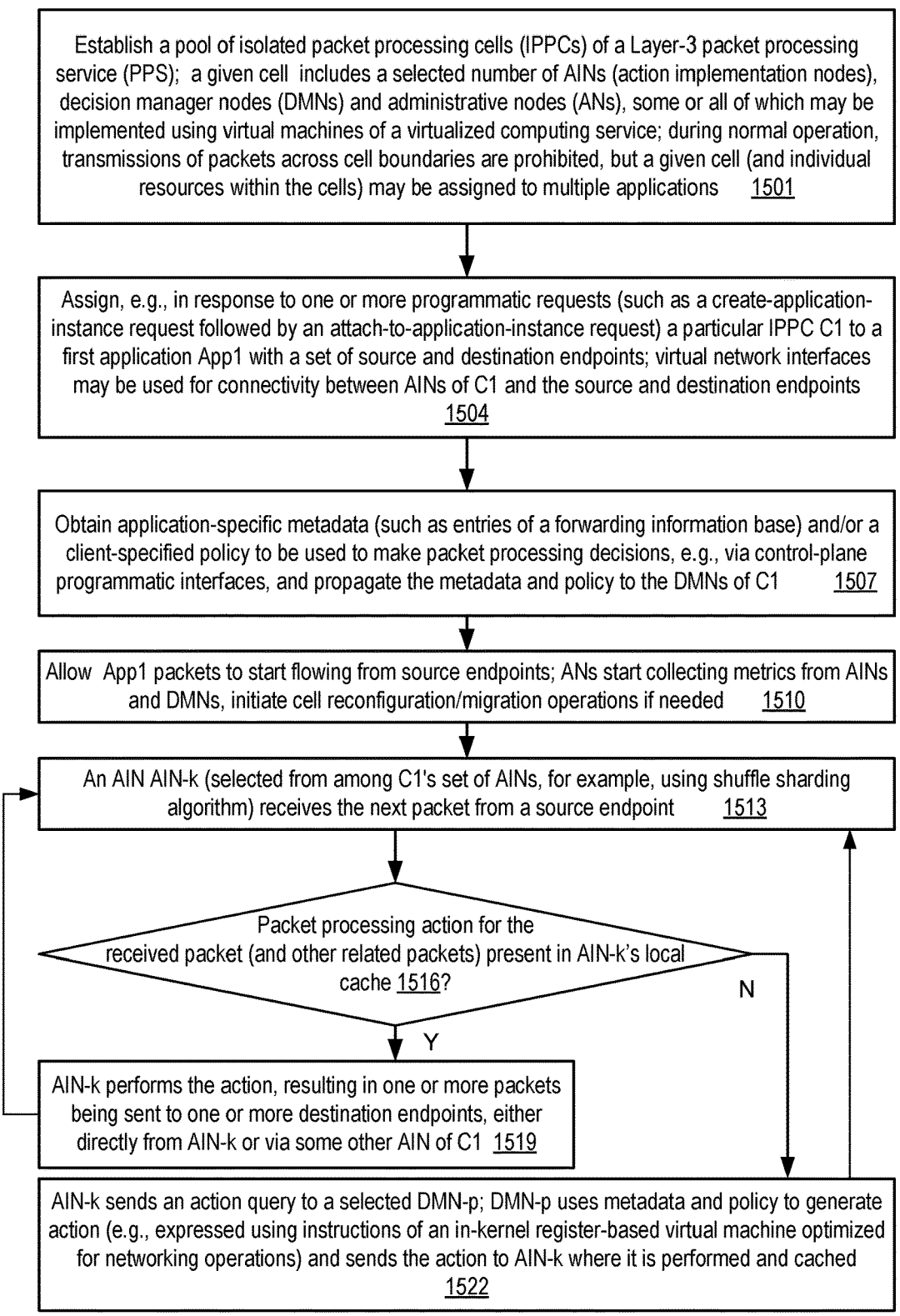
FIG. 15 is a flow diagram illustrating aspects of operations that may be performed to implement a multi-layer cell-based packet processing service, according to at least some embodiments.

FIG. 15 is a flow diagram illustrating aspects of operations that may be performed to implement a multi-layer cell-based packet processing service, according to at least some embodiments. As shown in element 1501, a pool of isolated packet processing cells (IPPCs) of a Layer-3 packet processing service (PPS), similar in features and functionality to the PPS 102 of FIG. 1, may be established in the depicted embodiment. A given IPPC may include a selected number of AINs (action implementation nodes), decision manager nodes (DMNs) and administrative nodes (ANs), some or all of which may be implemented using virtual machines of a virtualized computing service in one embodiment. In various embodiments, during normal operation, transmissions of packets of at least some types (e.g., data plane packets) across cell boundaries may generally be prohibited, but a given cell (and individual resources within the cells) may be assigned to multiple applications in at least some embodiments. In at least one embodiment, a pool of IPPCs may be set up in advance of requests to establish particular application instances (such as virtual traffic hubs of the kind discussed below), with individual ones of the pre-provisioned IPPCs being assigned from the pool for new application instances as needed. In other embodiments, at least some new IPPCs may be established on demand, e.g., instead of being selected from a pre-created pool.

A particular IPPC C1 may be assigned to a first application App1 with a set of source and destination endpoints in the depicted embodiment (element 1504). Such an assignment may be triggered in response to one or more programmatic requests (e.g., a create-application-instance request followed by an attach-to-application-instance request, as discussed in further detail below) in some embodiments. In at least one embodiment virtual network interfaces may be used for connectivity between AINs of C1 and the source and destination endpoints, e.g., using a multiplexing scheme similar to that discussed earlier.

Application-specific metadata (such as entries of a forwarding information base) and/or a client-specified policy to be used to make packet processing decisions may be obtained, e.g., via control-plane programmatic interfaces of the PPS in some embodiments (element 1507). The metadata and policy may be propagated to the DMNs of C1 in various embodiments. In some embodiments, as discussed earlier, a fleet of API handlers of the PPS may receive the metadata and policies and transmit them to one or more ANs of the relevant IPPCs, where the ANs may transmit the metadata to the DMNs. In other embodiments, the API handlers may transmit the metadata and policies directly to the DMNs of the appropriate cells. In some embodiments, an intermediary fleet of API handlers may not be required; instead, an AN of the IPPC may receive client-submitted administrative or control plane requests. The policies may, for example, indicate various aspects of the logic to be used to generate packet processing actions for the applications—e.g., which combination of headers of received packets should be analyzed to determine contents of headers of outbound packets, how the header contents of outbound packets should be generated, how many outbound packets are to be transmitted per received packet, etc.

After the metadata has been distributed, App1 packets may be permitted to start flowing from source endpoints to selected AINs (element 1510) (e.g., with the particular AIN used for a given packet of a group or flow being selected using a shuffle sharding technique of the kind introduced above). ANs may start collecting metrics from AINs and DMNs, and may initiate cell reconfiguration/migration operations as and when needed—e.g., when some AINs/DMNs become unhealthy or unresponsive, or when the overall workload of C1 exceeds a threshold (which may occur due to other applications to which C1 has been assigned).

A particular AIN of C1, AIN-k, may receive a packet from a source endpoint of App1 (element 1513). AIN-k may attempt to find (e.g., using a key generated by applying a hash function to some combination of the packet's headers or flow identifier) a corresponding action in a local action cache in at least some embodiments. If an action for the packet (and other related packets of the flow) is found in the cache, as detected in operations corresponding to element 1516, the action may be performed by AIN-k (element 1519), resulting in one or more packets being sent to one or more destination endpoints of App1. In some cases, depending on the manner in which source and destination endpoints are connected to the various AINs of C1, AIN-k may be able to send the packets to a destination endpoint without utilizing another AIN; in other cases, the outbound packets may be sent along a path that includes one or more other AINs of C1. The outbound packets may comprise transformed versions of the received packet in some embodiments—e.g., one or more header element values may be changed in the packet processing action.

If an action for the received packet is not found in the local cache at AIN-k (also via operations corresponding to element 1516), an action query may be transmitted to a selected DMN DMN-p of C1 from AIN-k in the depicted embodiment (element 1522). DMN-p may be selected using any of a number of techniques, such as flow-hashing, random selection, responsiveness of the different DMNs of C1 to health probes from AIN-k, and so on in different embodiments. DMN-p may use the propagated application metadata and/or policy to generate the action in the depicted embodiment, and provide a representation (e.g., an executable representation) of the action to AIN-k. The action may for example be expressed using instructions of an in-kernel register-based virtual machine optimized for networking operations, such as eBPF or the like, in some embodiments. AIN-k may perform the received action and store it in its cache, from where it may be retrieved if/when additional related packets are received at AIN-k in the depicted embodiment. When additional packets arrive at any of the AINs, operations corresponding to elements 1513 onwards may be performed in various embodiments.

Virtual Traffic Hub Leveraging Packet Processing Service

Figure 16:
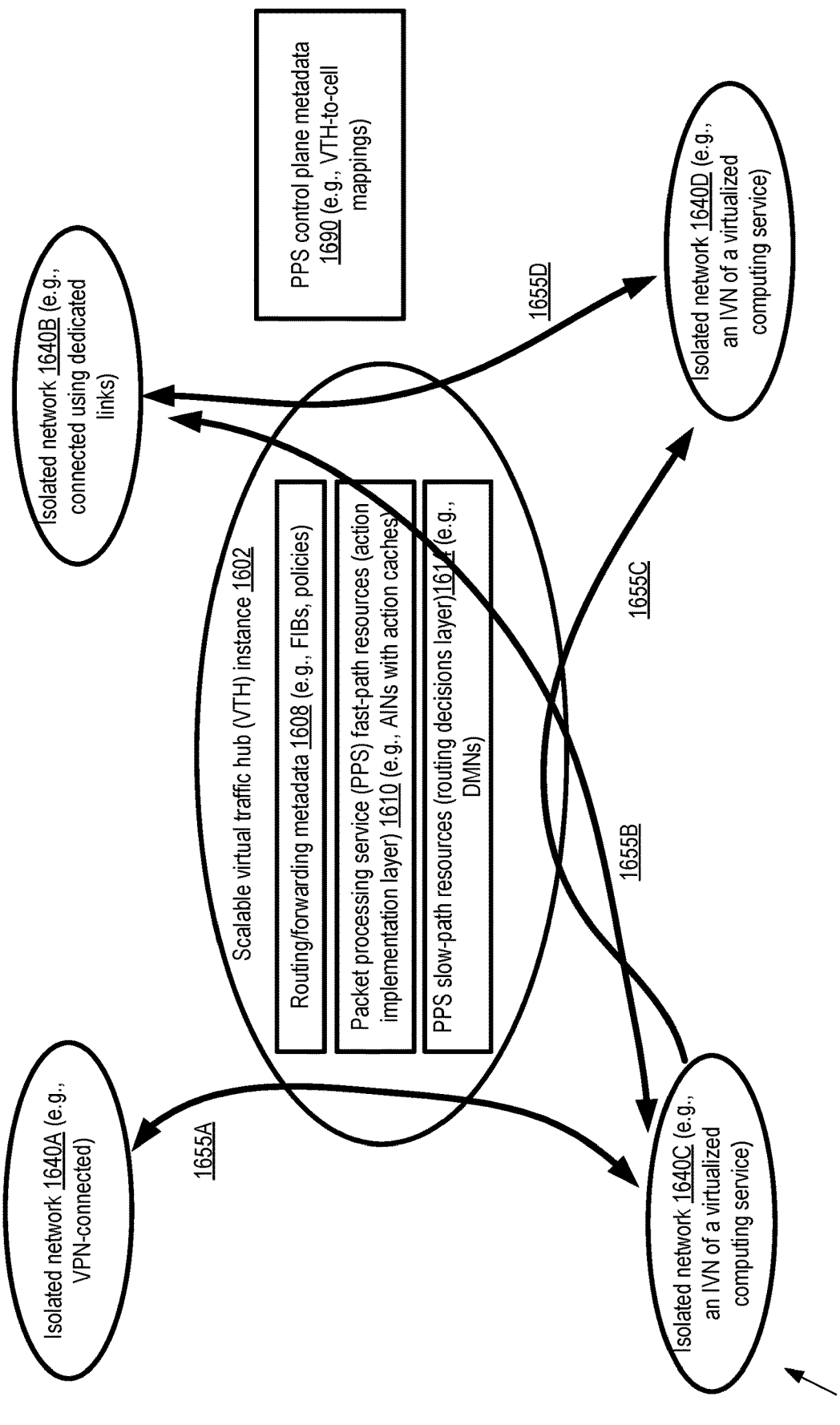
FIG. 16 illustrates an example system environment in which a virtual traffic hub for managing the flow of traffic between isolated networks using a cell-based packet processing service may be implemented, according to at least some embodiments.

A packet processing service of the kind introduced above may be employed for a variety of applications in different embodiments. FIG. 16 illustrates an example system environment in which a virtual traffic hub for managing the flow of traffic between isolated networks using a cell-based packet processing service may be implemented, according to at least some embodiments. As shown, system 1600 may comprise a plurality of isolated networks 1640, such as 1640A, 1640B, 1640C and 1640D, each of which may comprise one or more computing devices with respective network addresses selected from a range of addresses selected for the isolated network. In at least some embodiments, the address ranges used within one or more of the isolated networks 1640 may comprise private addresses that are not advertised by default outside the network. As a result, a routing/forwarding intermediary may be needed to enable packets to flow between resources of the different isolated networks in such embodiments, and a scalable virtual traffic hub (VTH) 1602 may be established to help fulfill such connectivity requirements. Conceptually, a higher-level hub-and-spoke network may be constructed with the isolated virtual networks 1640 in the roles of spokes, linked to one another via the virtual traffic hub 1602. The VTH may be set up using control plane and data plane resources of the packet processing service (PPS) in the depicted embodiment—for example, the control plane of the PPS may be responsible for automatically adding data plane nodes as more isolated virtual networks are programmatically attached to the VTH, or as the amount of traffic from existing isolated virtual networks that have been programmatically attached to the VTH increases. A virtual traffic hub may be referred to as a virtual router or a virtual gateway in some embodiments.

At a high level, a given instance of a VTH may comprise a set of fast-path PPS resources 1610 (such as a collection of one or more action implementation nodes or AINs with respective action caches, similar to the AINs discussed earlier), a set of slow-path PPS resources 1614 (such as a collection of routing decision master nodes or DMNs, similar to the DMNs discussed earlier), and a set of routing/forwarding metadata or network state information entries 1608 (e.g., forwarding information bases or FIB entries, associated policies and the like) in various embodiments. The routing/forwarding metadata 1608 may be employed to determine and generate actions in accordance with the requirements of a client of the PPS in the depicted embodiment. PPS control plane metadata 1690 may, for example, indicate the mappings between various VTH instances and the respective data plane resources (AINs, DMNS, etc.) assigned to the VTH instances in some embodiments. The term "routing decisions layer" may be used to refer collectively to the DMNs assigned to a VTH in at least some embodiments, and the term "action implementation layer" may be used to refer collectively to the AINs. The term "routing action" may be used to refer to at least some of the actions (which may be as simple as forwarding packets, and in some cases may include transforming/replicating packets in various ways before forwarding the packets) performed at the action implementation layer in various embodiments. In some embodiments, at least some of the AINs and/or DMNs assigned to a VTH instance may be part of (e.g., implemented using respective virtual machines of) an isolated virtual network of a provider network. In at least some embodiments, individual ones of the hosts/servers used for AINs and/or DMNs may be utilized for multiple VTHs and/or multiple clients, e.g., a multi-tenant approach may be used for managing resources used for VTHs.

Based on its routing/forwarding metadata 1602, a VTH may not necessarily permit network traffic to flow among all pairs of isolated networks attached to the VTH in at least some embodiments. For example, as indicated by arrows 1655A, 1655B, 1655C, resources in isolated network 1640C may communicate with resources in each of the other three isolated networks 1640A, 1640B and 1640C in the depicted scenario of FIG. 15 via VTH 1602. However, while resources in isolated network 1640B and 1640D may communicate with resources in each other (as indicated by arrow 1655D) and with resources in isolated network 1640C via the VTH 1602, they may not communicate with resources in isolated network 1640A. Similarly, resources in isolated network 1640A may only communicate with resources in isolated network 1640C via the VTH 1602 in the depicted example scenario. In effect, one or more routing domains (each with a respective routing table) may be generated and managed using the VTH 1602, with traffic being routed only within the specific isolated networks that belong to a given domain, in accordance with domain-specific metadata 1608 provided to the VTH in at least some embodiments. Note that connectivity among several different types of isolated networks may be implemented using a single VTH instance 1602 in at least some embodiments. For example, in one scenario, isolated networks 1640C and 1640D of FIG. 16 may be a pair of isolated virtual networks (IVNs) of a virtualized computing service (VCS), each comprising resources located within data centers of a provider network. Isolated network 1640A may comprise a set of resources at a location external to the provider network, such as a customer's data center, connected to the VCS via a VPN connection, while isolated network 1640B may also comprise a different set of external resources, connected to the VCS via dedicated physical links of the kind discussed above. Some VTH instances may be used for connectivity among a homogeneous set of isolated networks (e.g., all IVNs within the provider network, all VPN-connected external networks, or all dedicated link-connected external networks) in various embodiments, while others may be used for connectivity among a heterogeneous set of isolated networks.

According to some embodiments, a system may comprise one or more computing devices of a packet processing service. The computing devices may include instructions that when executed on a processor cause the computing devices to obtain or receive one or more programmatic requests to configure a virtual traffic hub (VTH) as an intermediary for network traffic between a plurality of isolated networks. In response to the programmatic requests, metadata indicating a set of resources assigned to the VTH may be stored, e.g., in a control plane repository of the service in various embodiments. The set of resources may include, for example, at least a first action implementation node (AIN) and at least a first routing decision master node (DMN). In some embodiments, an isolated packet processing cell (IPPC) of the kind introduced earlier may be assigned to the VTH. Network state information entries, such as FIB entries or the like, may be propagated to the DMNs assigned to the VTH in various embodiments, e.g., from the PPS control plane.

At the first AIN, a first executable action or directive may be obtained from the first DMN, for example in response to an action query in the depicted embodiment. The action may be generated for one or more packets of a first network flow in some embodiments, where the first network flow is distinguished from other network flows by one or more header entries of at least one data packet received at the first action implementation node from the first isolated network. The first executable action may be generated at the DMN based at least in part on the network state information entries. In at least some embodiments, an indication of semantics of the first executable action may not be provided to the AIN—that is, details of exactly what is being done in the action may not be provided, and the action implementation node may simply be responsible for quickly executing the action when a packet corresponding to the action is received. In at least some embodiments, the executable action may be expressed using an instruction set of an in-kernel register-based virtual machine optimized for network processing. The executable action may be stored in a flow-indexed cache (e.g., a cache in which a flow identifier may be used as the key to perform a lookup for an action) at the AIN. Based at least in part on implementing the executable action at the first AIN, contents of one or more packets of the first network flow may be transmitted on a pathway to another isolated network from the first AIN in various embodiments. The pathway may, in some cases, include one or more other AINs in some embodiments. A number of programmatic interfaces (e.g., APIs, command-line tools, web-based consoles, graphical user interfaces and the like) may be implemented to enable PPS clients to submit various types of requests pertaining to VTHs, and to receive corresponding responses in different embodiments. In at least some embodiments, equal cost multi-pathing (ECMP) techniques may be employed at a VTH, enabling high bandwidths of message traffic to be supported. In embodiments in which VTHs are established using a managed packet processing service of the kind described, clients of the service may not need to dedicate any of their own resources (e.g., hardware routers or virtual machines acquired by or allocated to the clients) to enable scalable routing of network packets between various isolated networks.

In at least one embodiment, a number of different metrics associated with a virtual traffic hub instance 1602 may be collected at the packet processing service, and provided on demand to clients, e.g., via easy-to-use visualization interfaces and/or other programmatic interfaces. For example, for a given VTH hub, metrics collected and provided may include the total number of inbound packets received during a given time interval, the total number of outbound packets transmitted during a given time interval, the total number of inbound packets for which outbound packets were not generated during a given time interval (e.g., either because routing/forwarding metadata for the inbound packets was not provided to the VTH, or because clients have sent programmatic instructions to drop packets that meet specified criteria), and so on. In some implementations, rates of inbound, outbound and dropped packets, e.g., expressed in per-second units, may also or instead be provided. In some embodiments, separate metrics may be provided for the different causes of dropped packets—e.g., the number of packets that were dropped due to insufficient routing/forwarding information may be separated out from the number of packets that were dropped based on directive submitted by clients. In at least one embodiment, the metrics may also be broken down by isolated network—e.g., respective sets of metrics may be presented for each of the four isolated networks 1640A-1640D. In one embodiment, metrics aggregated for different categories of isolated networks—e.g., IVNs within a provider network's VCS, versus networks connected via VPNs, versus networks connected via dedicated physical links—may be presented. In at least some embodiments, the provider network at which the packet processing service is implemented may implement a metrics service which can be used to obtain metrics about various other services of the provider network, and the VTH-related metrics may be presented via such a metrics service.

Customer Perspective Vs. Underlying Implementation

Figure 17:
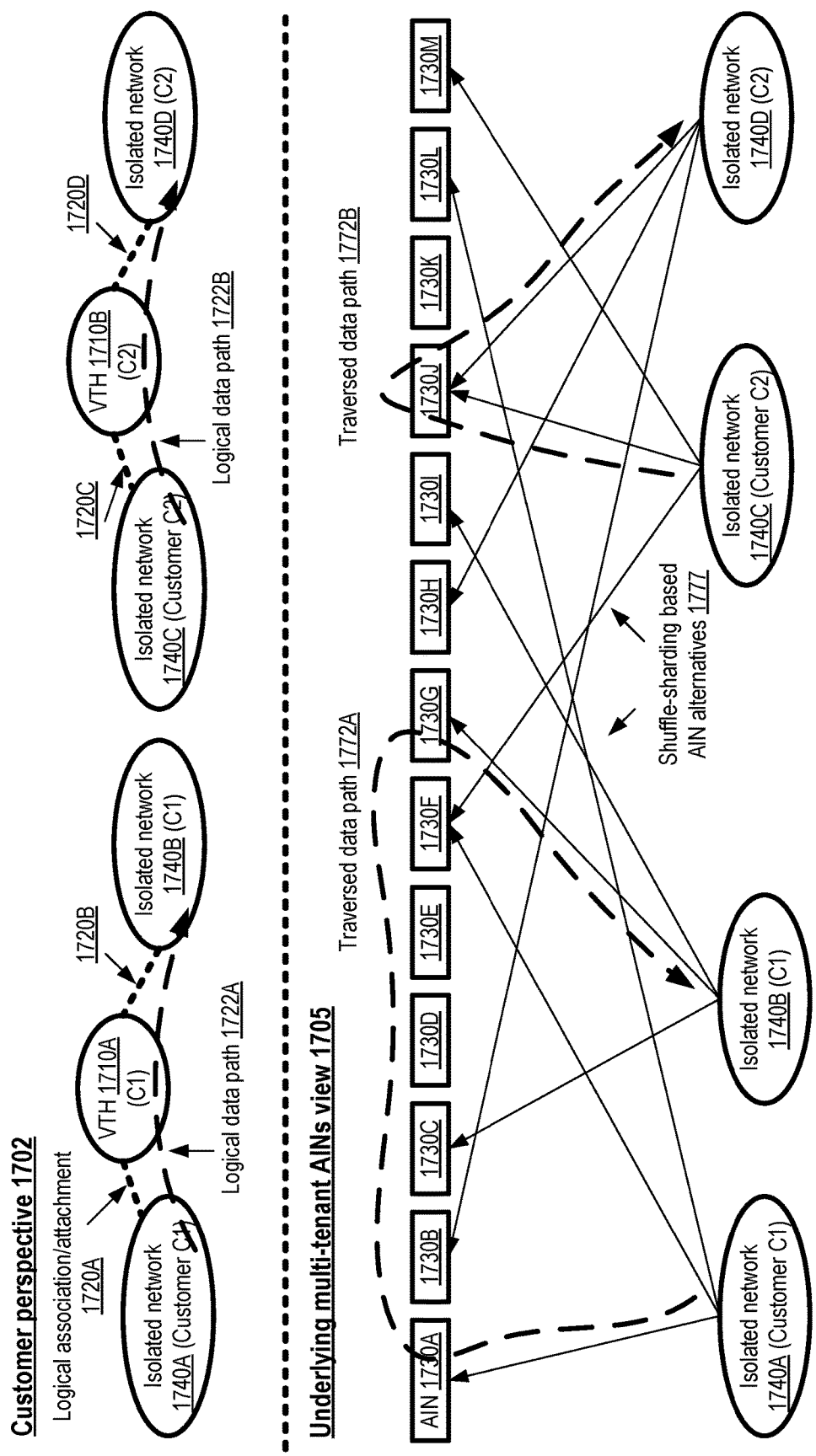
FIG. 17 illustrates examples of packet data paths between isolated networks connected via a virtual traffic hub, as viewed from a customer perspective and as implemented using a packet processing service, according to at least some embodiments.

FIG. 17 illustrates examples of packet data paths between isolated networks connected via a virtual traffic hub, as viewed from a customer perspective and as implemented using a packet processing service, according to at least some embodiments. VTH instances 1710A and 1710B, similar in functionality to VTH 1602 of FIG. 16, may be set up on behalf of respective customers or clients C1 and C2 of a packet processing service in the depicted example scenario. From the perspective 1702 of the customers, one programmatic request may, for example, be submitted to create a VTH instance, and another programmatic request may be used to programmatically attach or associate an isolated network 1740 (e.g., 1740A, 1740B, 1740C or 1740D) to a specified VTH. In some cases, another programmatic request may be used to submit the routing/forwarding metadata that is to be used to determine or generate actions for a given routing domain at a given VTH. After a VTH instance 1710 has been created, and the isolated virtual networks' logical associations/attachments 1720 (e.g., 1720A, 1720B, 1720C or 1720D) to the VTHs have been performed, from the customer perspective traffic may begin to flow among the isolated networks 1740 via the VTH, e.g., along logical data paths 1722A or 1722B. A customer may not necessarily be made aware of the details of exactly how many nodes are being used at the VTH instance, the paths along which packets are transmitted among nodes of the packet processing service, and so on in some embodiments. In other embodiments, at least some of the details may be provided to the customers, e.g., in response to programmatic requests.

Within the packet processing service, as indicated in the underlying multi-tenant AINs view 1705, a plurality of AINs 1730 (e.g., action implementation nodes 1730A-1730M belonging to a given isolated packet processing cell of the kind discussed earlier) may be assigned for each of the two CTH instances 1710A and 1710B. A shuffle-sharding algorithm may be used to identify, for a given flow, a subset of AINs 1730 to be used for packets of a given flow originating at a given isolated network 1740. Thus, for example, for a given flow of packets transmitted from isolated network 1740A to isolated network 1740B, any of three AINs 1730A, 1730F and 1730L may be used to process inbound packets, while AINs 1730C, 1730I or 1730G may be available for transmitting outbound packets. Similarly, for another flow associated with customer C2's isolated networks, AINs 1730B 1730J and 1730M may be usable for inbound packets from isolated network 1740C as per shuffle-sharding alternatives 1777, and AINs 1730B, 1730H and 1730J may be usable for outbound packets to isolated network 1740D. A given packet of a flow from a source resource or endpoint of isolated network 1740A may, for example, be processed at AIN 1730A, and, as a result of an action implemented at AIN 1730A, a corresponding forwarded packet may be sent from AIN 1730A along path 1772A to AIN 1730G and from AIN 1730G to a destination resource at isolated network 1740B in the depicted embodiment. In some cases, as in the case of traversed data path 1772B, the AIN (e.g., 1730) that receives an inbound packet of a flow may be able to directly transmit the corresponding outbound packet to the destination isolated network (1740D in the example associated with path 1772B), instead of using another intermediary AIN in various embodiments. As indicated in FIG. 17, at least some AINs may be configured in a multi-tenant mode, for use on behalf of different customers' VTHs—e.g., AIN 1730F may be used for packets associated with isolated network 1740A of customer C1, and for packets associated with isolated network 1740C of customer C2. In some embodiments in which a cell comprising a plurality of AINs 1730 (or a plurality of DMNs) is assigned to more than one VTH instance, any of the AINs (or DMNs) of the cell may be used for any of the VTHs, depending for example on the shuffle sharding or other workload distribution algorithms being used.

Hub Data Plane Node Elements

Figure 18:
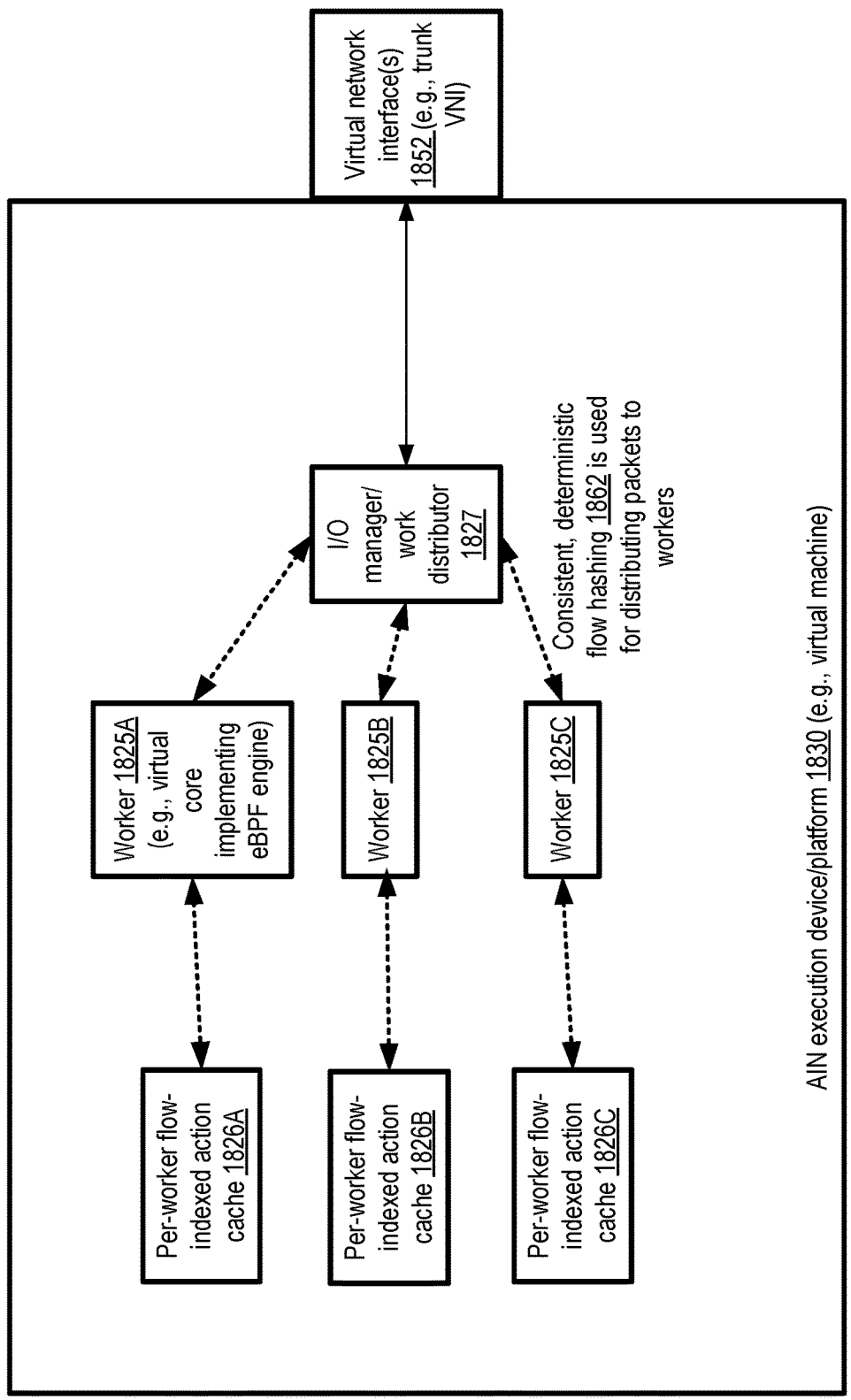
FIG. 18 illustrates an example of the management of virtual traffic hub-related packet processing workloads at an action implementation node of a packet processing service, according to at least some embodiments.

As mentioned earlier, a virtual traffic hub may be assigned a set of one or more action implementation nodes and a set of one or more routing decision master nodes in at least some embodiments. FIG. 18 illustrates an example of the management of virtual traffic hub-related packet processing workloads at an action implementation node of a packet processing service, according to at least some embodiments. In the depicted embodiment, at least one virtual network interface 1852 (similar to the trunk VNIs shown in FIG. 4) may be established for the network traffic entering and exiting an AIN (action implementation node) execution device/platform 1830. For example, in some embodiments, the platform 1830 may comprise a virtual machine implemented at a virtualized computing service of a provider network. The action implementation node itself may comprise an I/O manager 1827 and one or more workers 1825 (e.g., 1825A, 1825B or 1825C) in the depicted embodiment. Note that control-plane and health-management-related operations may also be performed by the I/O manager and the workers in some embodiments, as discussed earlier in the context of FIG. 14; FIG. 18 is focused more on data plane operations.

The I/O manager 1827 may be referred to as a work distributor in at least some embodiments, as it may be responsible for receiving packets via the virtual network interface 1852 and directing a given packet to a particular worker 1825 for processing, with the worker being selected for example using a consistent, deterministic flow hashing algorithm 1862 applied to a flow identifier associated with the packet. Input to the flow hashing algorithm may include one or more flow identification packet header elements of the kind discussed earlier, e.g. in the context of FIG. 5. The deterministic flow hashing may represent one example of deterministic mapping functions that may be used to select workers 1825 for a given packet or flow in different embodiments. In at least some embodiments, individual ones of the workers 1825 and/or the I/O manager 1827 may comprise one or more virtual cores or threads. In at least some embodiments, a worker 1825 may comprise an execution engine for programs expressed in an instruction set of an in-kernel register-based virtual machine optimized for network processing similar to eBPF. In other embodiments, such virtual machine instruction set execution engines may not be employed. In some embodiments, each worker 1825 may instantiate and/or use an associated per-worker flow-indexed action cache, within which representations of executable actions generated at the decision master nodes may be stored. When a packet is received at a worker 1825 from the I/O manager, the action for it may be looked up in the corresponding cache, and performed if a cache hit occurs. If the action is not in the cache, the worker may indicate to the I/O manager that a cache miss occurred, and an action query may be sent from the I/O manager to a decision master node in at least some embodiments. In various embodiments, entries may be removed or evicted from the action caches based on various factors, such as usage timing records that indicate that a given action has not been performed for some threshold amount of time. In at least some embodiments, locks or other concurrency control mechanisms may not be required to access the individual caches, and/or to store/evict cache entries, e.g., because only a single worker may be expected to access entries associated with a given flow when deterministic mapping techniques of the kind discussed above are used to select workers for handling flows.

As suggested by its name, the I/O manager 1827 may be responsible for data plane input/output operations of the workers 1825 in the depicted embodiment—e.g., the I/O manager may act as an intermediary for messages between an individual worker 1825 and other entities (including other AINs, DMNs and the like). In at least some embodiments, a given worker 1825 may not have to communicate directly with other workers at the device 1830; instead, all communications to/from a worker may flow through the I/O manager. In some embodiments, the workers and the I/O manager may be implemented as part of the same program or application, e.g., a program implemented using the Data Plane Development Kit or DPDK.

In at least one embodiment, a virtual machine or execution device being used for an AIN of a virtual traffic hub may have several different virtual network interfaces (VNIs) attached—e.g., one for traffic from/to isolated networks, and others for communication with DMNs, other AINs of the same cell, administration nodes and so on. In some embodiments, one or more branch VNIs may be programmatically associated with a single trunk VNI, and such branch VNIs may be used for communications with other AINs, DMNs etc.

Figure 19:
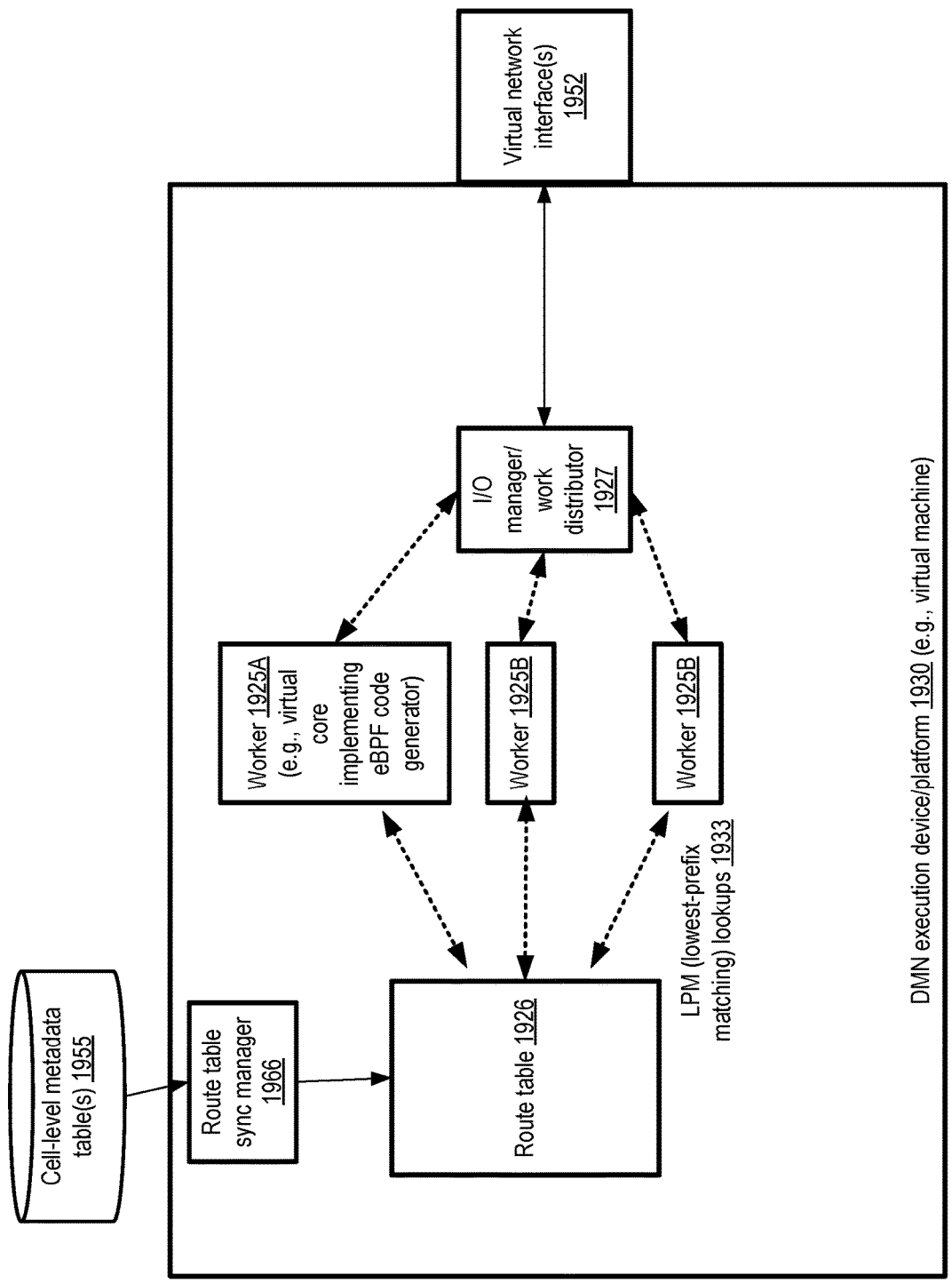
FIG. 19 illustrates an example of the management of virtual traffic hub-related packet processing workloads at a decision master node of a packet processing service, according to at least some embodiments.

FIG. 19 illustrates an example of the management of virtual traffic hub-related packet processing workloads at a decision master node of a packet processing service, according to at least some embodiments. In the depicted embodiment, at least one virtual network interface 1952 may be established for the network traffic entering and exiting a DMN (decision master node) execution device/platform 1930. For example, in some embodiments, the platform 1930 may comprise a virtual machine implemented at a virtualized computing service of a provider network. The DMN itself may comprise an I/O manager 1927, one or more workers 1925 (e.g., 1925A, 1925B or 1925C), a local copy of at least a portion of a route table 1926, and/or a route table synchronization manager 1966 in the depicted embodiment.

As in the case of the I/O manager of an AIN, the I/O manager 1927 of a DMN may be referred to as a work distributor in at least some embodiments, as it may be responsible for receiving messages (e.g., action queries corresponding to packets received at an AIN) via the virtual network interface 1952 and directing a given message to a particular worker 1925 for processing. In some embodiments, a DMN worker 1927 may be selected at random from among the available workers at the device 1930, while in other embodiments, a worker may be selected for example using a consistent, deterministic flow hashing algorithm. In at least some embodiments, individual ones of the workers 1925, the route table synchronization manager 1966 and/or the I/O manager 1927 may comprise virtual cores or threads. In some embodiments, a worker 1925 may comprise a code generator for programs expressed in an instruction set of an in-kernel register-based virtual machine optimized for network processing similar to eBPF. In other embodiments, such code generators may not be employed. In some embodiments, each DMN worker 1925 may have access to a common or shared route table 1926, into which contents of metadata tables 1955 (e.g., managed by the packet processing control plane), or information derived from such tables, may be stored by the synchronization manager 1966. The synchronization manager 1966 may, for example, update the route table 1926 using entries from cell-level metadata tables 1955 in some embodiments, ensuring that recent changes to routing/forwarding information provided by clients are reflected at the DMN.

When an action query (comprising some indication of a packet for which a cache miss occurred at an AIN) is received at a worker 1925 from the I/O manager 1927, a corresponding route for the cache-miss-causing packet may be looked up (e.g., using a longest prefix match (LPM) lookup algorithm) in at least some embodiments. If the lookup 1933 succeeds, an executable version of an action to route the packet (and other packets of the same flow, if any) may be generated at the worker 1925, and sent back, e.g., via the I/O manager 1927, to the AIN from which the action query was received. In some embodiments, if no route is found for the packet, a default action (such as an action that results in dropping the received packet), or an error-handling action (such as sending an error message to the source endpoint from which the packet was received at the AIN) may be generated in some embodiments and sent to the AIN. The DMN I/O manager 1927 may be responsible for data plane input/output operations of the workers 1925 in the depicted embodiment—e.g., the I/O manager may act as an intermediary for messages between an individual worker 1925 and other entities (including AINs and the like). In at least some embodiments, a given worker 1925 may not necessarily communicate with other workers at the device 1930. In some embodiments, the DMN workers 1925 and the DMN I/O manager 1927 may be implemented as part of the same program or application, e.g., a program implemented using the Data Plane Development Kit or DPDK.

In at least one embodiment, a virtual machine or execution device being used for a DMN of a virtual traffic hub may have several different virtual network interfaces (VNIs) 1952 attached. For example, one VNI 1952 may be used for traffic from/to AINs, and others for communication with other DMNs of the same cell, administration nodes and so on.

Protocol for AIN-DMN Interactions

In some embodiments, an encapsulation protocol may be used for communications between AINs and DMNs assigned to a virtual traffic hub. Such a protocol may be used, for example, in embodiments in which the AINs and/or DMNs are implemented using respective virtual machines, each of which may have one or more virtual network interfaces with respective IP addresses. In such an embodiment, encapsulation may be performed for the AIN-to-DMN and DMN-to-AIN communications because the network addresses of the physical network interfaces at the hosts where the AINs/DMNs are instantiated do not match the addresses of the virtual network interfaces attached to the AINs/DMNs. (Encapsulation may also be performed, for similar reasons, during communications between source virtual machines at isolated networks from which application packets originate, and the AINs in at least some embodiments.)

Figure 20:
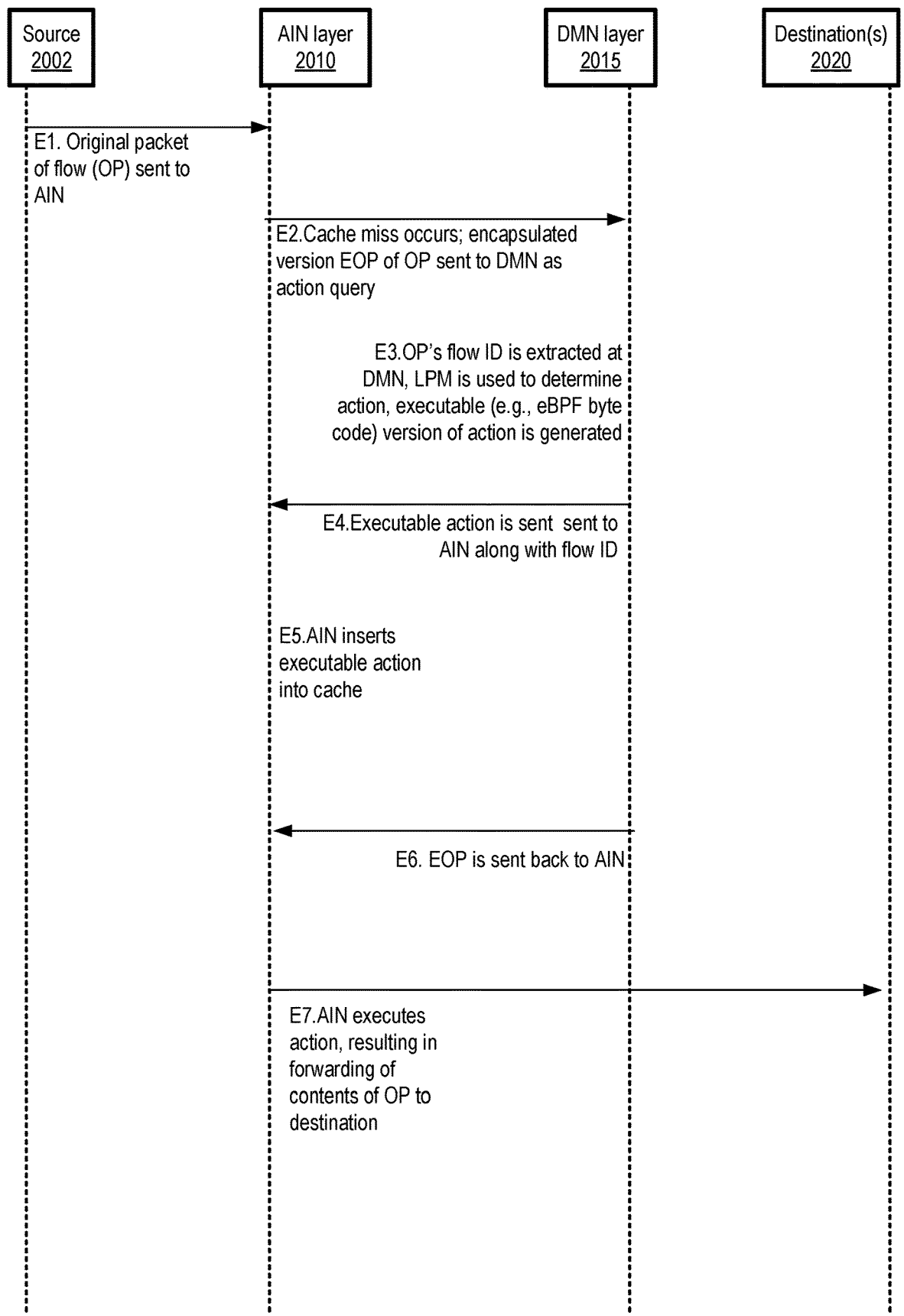
FIG. 20 illustrates an example of a sequence of interactions between an action implementation node and a decision master node, according to at least some embodiments.

FIG. 20 illustrates an example of a sequence of interactions between an action implementation node and a decision master node, according to at least some embodiments. Events at four types of entities are illustrated in the depicted example: the source endpoint 2002 at which a packet is generated and sent to a virtual traffic hub similar to that discussed above, the AIN layer 2010 of the virtual traffic hub, the DMN layer 2015 of the virtual traffic hub, and the destination endpoints 2020 to which the original packet was directed. Note that individual ones of the events illustrated in FIG. 20 may take different amounts of time in various embodiments, e.g., generating an executable action may take longer than transmitting a message.

In an event labeled E1, an original packet OP (e.g., the very first packet of the flow) is generated and sent to the AIN layer 2010. In event E2, a cache miss occurs in the action cache of the AIN which receives OP, and an encapsulated version EOP of the received packet, representing an action query, is sent to a selected DMN at DMN layer 2015. Note that for at least some applications, fairly large messages may be transmitted from sources 2002 to destinations 2020, so in at least some cases it may not be straightforward or possible to add a lot of metadata (e.g., encapsulation headers, generated executable actions etc.) to a message frame that includes the OP. Because the executable action generated at a DMN itself may comprise a non-trivial number of bytes (e.g., several hundred bytes or even a few kilobytes), the action and the OP may be sent back to the requesting AIN in multiple messages instead of a single message in some embodiments.

Upon receiving the EOP, the DMN may extract the OP from the EOP, and obtain a flow identifier from the OP in the depicted embodiment as part of event E3. A longest prefix match (LPM) algorithm may be used to query a route table and/or a forwarding table to determine an action to be performed for the OP, and an executable version of the action may be generated (e.g., in the form of eBPF byte code) in some embodiments. In event E4, the action and the flow identifier may be sent back to the AIN from which the action query was received in the depicted embodiment. At the AIN layer 2005, in event E5, the executable version of the action may be inserted into the local action cache in the depicted embodiment, e.g., using the flow identifier as a key for the cache entry.

In event E6, the EOP may be sent back to the AIN from which the action query was received in the depicted embodiment. Note that in at least some embodiments, AINs may be stateless, so no information may have been retained at the AIN regarding the fact that it had sent an action query for the OP earlier. When the AIN receives the EOP, it may extract the OP and its flow identifier, look up the corresponding action in its cache (which has been inserted in event E5), and execute the action, resulting in forwarding of contents of the OP to a destination 2020 in the depicted embodiment. Given a fixed MTU (maximum transmission unit) size for communications between the various layers, in at least some embodiments it may become possible to support larger OPs (and/or larger executable actions) by using separate messages to send the executable action and the OP back to the requesting AIN, than may have been supportable if a single message were sent back to the requesting AIN from the DMN layer. In effect, in the example scenario shown in FIG. 20, two messages may be sent back in response to an action query—one which contains a representation of the action, and causes the AIN to store the action in its cache, and a second message which is used by the AIN to retrieve the action from the cache and execute/perform the action. In at least one embodiment, if the size of an executable action exceeds a threshold, the action may be split into a plurality of segments, and individual ones of the segments may be sent back (e.g., along with the flow identifier and a token indicating whether additional segments remain for the flow identifier) from the DMN layer to the AIN layer.

Routing Examples

Figure 21:
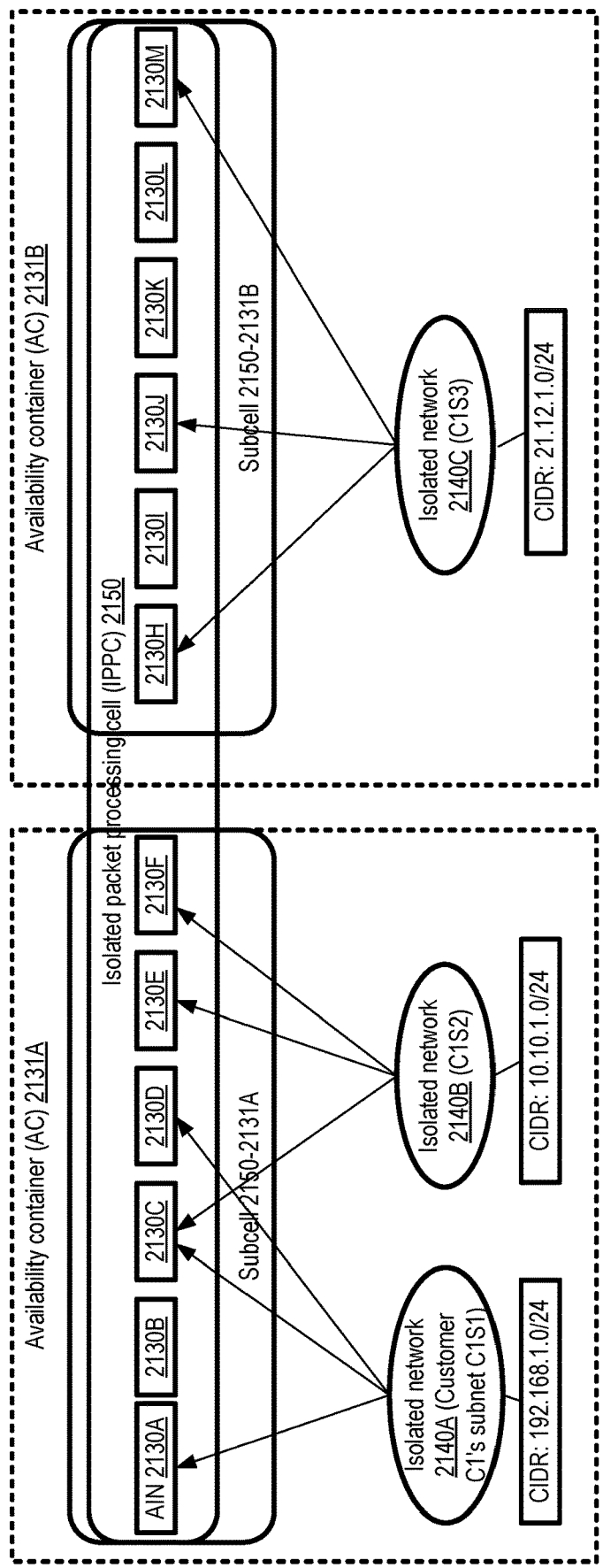
Figure 23:
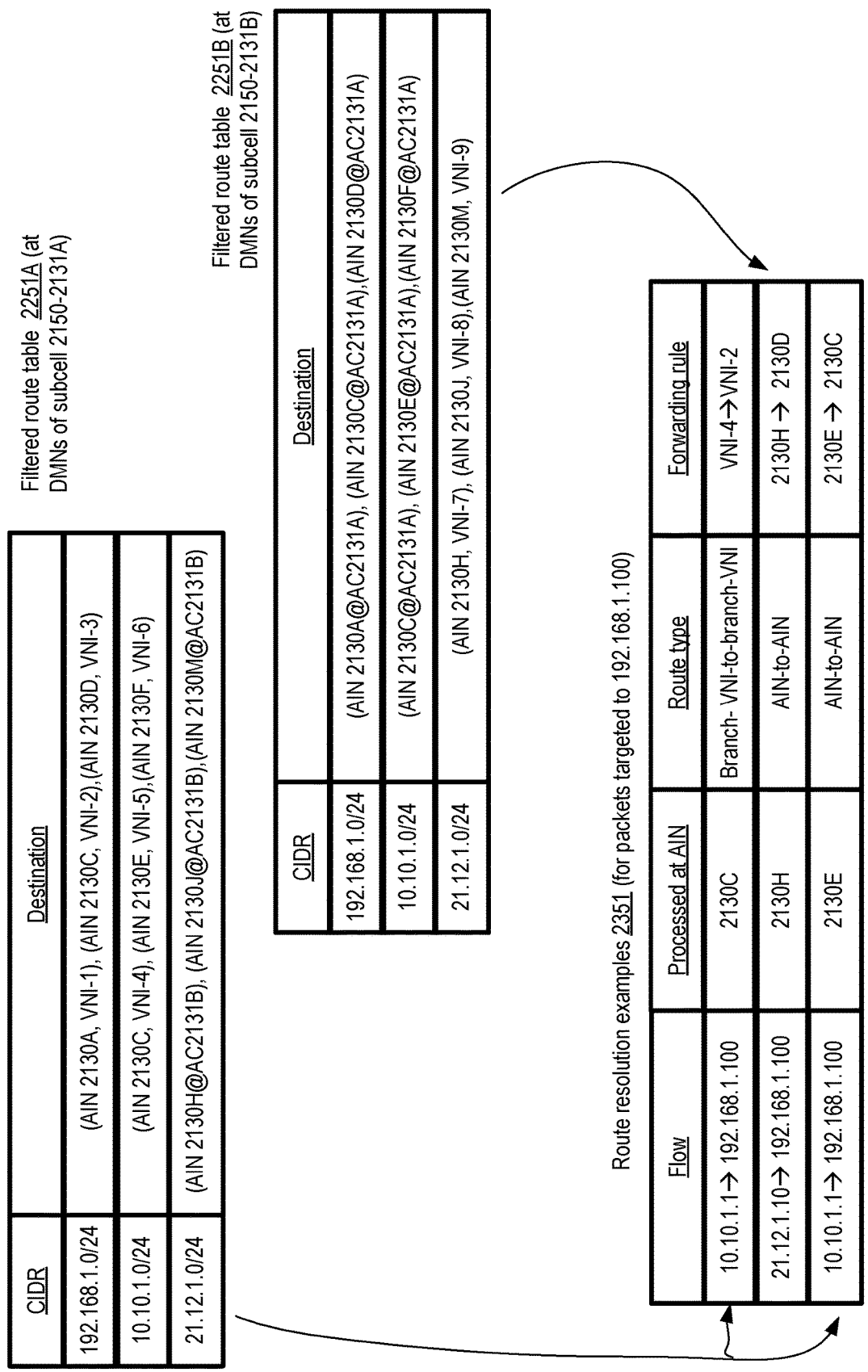

In at least some embodiments, starting from high-level routing/forwarding metadata provided by a client on whose behalf a virtual traffic hub (VTH) is established, filtered route tables may be created at decision master nodes assigned to the VTH, which may take into account details such as subnet membership, availability container membership and the like to choose the most actions for client-submitted packets. FIG. 21, FIG. 22 and FIG. 23 collectively illustrate an example of the creation and use of filtered route tables at decision master nodes designated for a virtual traffic hub, according to at least some embodiments.

In the embodiment depicted in FIG. 21, an isolated packet processing cell (IPPC) 2150 has been assigned to a particular VTH which is to act as a network intermediary between resources distributed among three isolated networks of a customer C1: isolated network 2140A which comprises a subnet C1S1, isolated network 2140B which comprises a different subnet C1S2, and isolated network 2140C which comprises a third subnet C1S3. The IPPC 2150 comprises at least twelve AINs 2130, six of which (2130A-2130F) are in a first availability container (AC) 2131A, and the remaining six (2130H-2130M) are in a second AC 2131B. Subnets C1S1 and C1S2 are also established in AC 2131A, while subnet C1S3 is in AC 2131B. The six AINs in AC 2131A may be referred to as members of a sub-cell 2150-2131A of IPPC 2150 for the purposes of the discussion regarding FIG. 21-FIG. 23, and the six AINs in AC 2131B may be referred to as members of a sub-cell 2150-2131B.

Subnet C1S1 has an associated CIDR (Classless Inter-Domain Routing) block 192.168.1.0/24, subnet C1S2 has a CIDR block 10.10.1.0/24, and subnet C1S3 has a CIDR block 21.12.1.0/24 in the depicted example scenario. From the customer C1's perspective, the isolated networks 2140A, 2140B and 2140C may simply be programmatically attached to the VTH to enable connectivity among them in the depicted embodiment. Within the packet processing service used for the VTH, specific pathways may be set up in various embodiments, e.g., using virtual network interfaces (VNIs), between individual isolated networks and respective subsets of AINs. For example, each subnet may be programmatically associated with three AINs within its own availability container in the depicted embodiment: subnet C1S1 with AINs 2130A, 2130C and 2130D, subnet C1S2 with AINs 2130C, 2130E and 2130F, and subnet C1S3 with AINs 2130H, 2130J and 2130M. In at least some embodiments, a respective VNI may be set up at an AIN for each subnet with which that AIN is associated—e.g., if a given AIN is associated with three subnets, that AIN may have three separate VNIs established. Such VNIs may be referred to as branch VNIs in various embodiments. A branch VNI may represent a VNI that can be programmatically associated, with very little overhead, with a trunk VNI of the kind discussed earlier, to perform an additional level of multiplexing in some embodiments. For example, in some embodiments, a trunk VNI may have several associated private IP addresses, and at least some of the associated branch VNIs may be assigned individual ones of that set of associated private IP addresses.

A high-level route table 2148 may be provided to the control plane of the packet processing service at which the VTH is established for connectivity between the three isolated networks shown in FIG. 21. At this level, the route table may simply indicate that if a destination address of a packet belongs to one of the three CIDR blocks, it should be routed to resources within one of the three corresponding subnets. From this high-level route table, a $2^{nd}$-level route table 2149 which takes sub-cell information into account may be constructed in a transformation step 2199, e.g., at the control plane of the packet processing service and/or at a decision master node in the depicted embodiment. In this 2nd-level table 2149, the destination information includes a sub-cell identifier and the identifiers of specific virtual network interfaces at each of the AINs which are associated with the subnets. As shown, for example, the entry for CIDR 192.168.1.0/24 indicates that the packets with destination addresses within that block may be routed via a VNI with identifier VNI-1 at AIN 2130A, a VNI with identifier VNI-2 at AIN 2130C, or a VNI with identifier VNI-3 at AIN 2130D.

In at least some embodiments, from this $2^{nd}$-level route table, a respective filtered route table may be generated within the DMNs of each sub-cell (the DMNs are not shown in FIG. 21-23 to avoid clutter), which takes the availability containers of the AINs into account. Examples of such filtered route tables 2251A and 2251B are shown in FIG. 22. In this version of the route tables, the entries in the $2^{nd}$-level route table 2149 may be modified as follows: (a) for entries within the same sub-cell as the DMN where the filtering is being performed, the VNI identifier information may be retained, and the sub-cell information may be discarded and (b) for entries in a different sub-cell, the VNI information may be discarded and the availability container information may be included. These two types of changes may be made because, in at least some embodiments, sub-cell or availability container information may not be required when communicating within a given availability container. In contrast, in such embodiments, when communicating outside one's local availability container, an identifier of the AIN (e.g., a host identifier or address) may be used instead of a branch VNI identifier. As shown, the filtered route tables 2251A and 2251B generated in each of the sub-cells or availability containers may have different entries derived from the same $2^{nd}$-level table entry. In table 2251A, generated in sub-cell 2150-2131A, the sub-cell or availability container information in the first two entries (for CIDRs 192.168.1.0/24 and 10.10.1.0/24, which are in the same availability container) is removed, while the identifier of the availability container is appended (e.g., using a notation equivalent to AIN 2130H@AC2131B) for the entry which corresponds to a non-local availability container. Conversely, in table 2251B, the VNI identifiers may be retained only for the 21.12.1.0/24 entry, and availability container identifiers (@AC2131A) of the remote availability container may be appended to the AIN identifiers for the other two entries.

When determining or generating an action for a given packet flow, a DMN may use filtered routing tables of the kind shown in FIG. 22 to try and select the most efficient route. For example, a route that minimizes the number of transmissions across AINs by using branch VNIs within the same AIN if possible may be preferred, and/or if such a route is not possible, a route that minimizes crossing availability container boundaries may be preferred in some embodiments. Table 2351 of FIG. 23 shows three different example route resolutions that may be generated by DMNs, each corresponding to packets directed to the same destination 192.168.1.100. The route resolution actions may vary based on the availability container in which the actions are generated by a DMN (and which corresponding filtered table 2251A or 2251B is used at the DMN) in the depicted embodiment. Thus, for example, for a flow of packets from 10.10.1.1 to 192.168.1.100, if the action is generated at a DMN in availability container 2131A in response to a query from AIN 2130C, a branch-VNI-to-branch-VNI route (VNI-4 to VNI-3) at AIN 2130C itself may be selected, as indicated by the forwarding rule in the first row of table 2351.

In contrast, if an action query for the same flow is received from AIN 2130E, the filtered route table 2251A may indicate that AIN 2130E does not have a local branch VNI for reaching the destination, so a different AIN (one of 2130A, 2130C or 2130D) may be used. As shown in the third row of table 2351, AIN 2130C may be selected for an AIN-to-AIN route corresponding to the flow, and a forwarding rule indicating that the packets of the flow that are received at AIN 2130E should be sent to AIN 2130C.

In the third example, shown in the middle row of table 2351, a route that crosses availability container boundaries may be selected, e.g., when a packet originating at 21.12.1.10 is to be directed to 192.168.1.100, and a corresponding action query is generated from AIN 2130H. In this scenario, the first row of filtered table 2251B may be used, and an AIN-to-AIN route with AIN 2130D may be selected for the flow.

Hub-Related Programmatic Interactions

Figure 24:
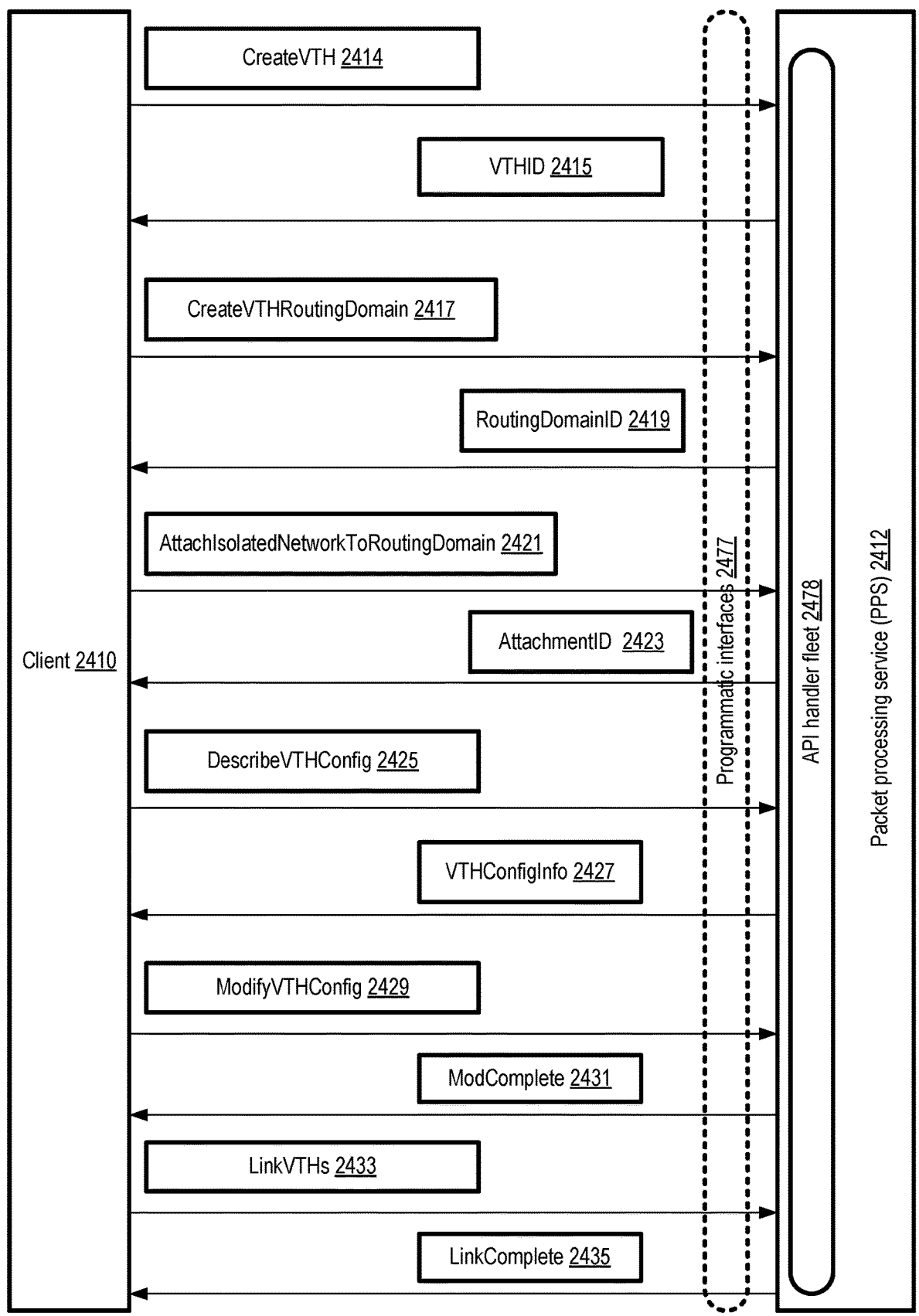
FIG. 24 illustrates example virtual traffic hub-related control plane programmatic interactions between a client and a packet processing service, according to at least some embodiments.

As mentioned earlier, a packet processing service may implement a variety of programmatic interfaces to enable clients to submit requests, e.g., to establish instances of applications such as virtual traffic hubs, make configuration changes to the hubs, and so on in at least some embodiments. FIG. 24 illustrates example virtual traffic hub-related control plane programmatic interactions between a client and a packet processing service, according to at least some embodiments. In the depicted embodiment, packet processing service (PPS) 2412, similar in features and functionality to PPS 102 of FIG. 1, may implement a set of programmatic interfaces 2477, such as APIs, command-line tools, web-based consoles, graphical user interfaces and the like. In at least some embodiments, an API handler fleet 2478 may receive requests submitted via such interfaces, and may pass on internal versions of at least some of the requests to various other components of the PPS 2412. Responses to the requests, generated by the other components, may be provided back to the clients 2410 from the API handler fleet. The API handler fleet may itself be automatically scaled up and down, e.g., independently of the scaling of the isolated packet processing cells of the PPS, by the control plane of the PPS in various embodiments as the rate at which requests are submitted increases or decreases. In other embodiments, a separate API handler fleet may not be used.

A client may submit a CreateVTH request via the programmatic interfaces 2477 in the depicted embodiment, requesting the creation of a new instance of a virtual traffic hub (VTH) of the kind introduced earlier. In response, one or more metadata records representing the new VTH instance may be stored at the PPS control plane, and an identifier (VTHID 2415) of the VTH instance may be provided to the client in at least some embodiments. In some embodiments, a number of targeted attributes of the VTH may be indicated in the CreateVTH request, such as the rate at which data packets are expected to be processed at the VTH, response time targets for packet transmissions, and so on.

As mentioned earlier, a given VTH instance may be used to implement multiple routing domains in some embodiments, with a given routing domain represented internally at the PPS at least in part by a high-level routing table to be used to direct traffic between a particular set of isolated networks. Thus, for example, routes between isolated networks IN1 and IN2 may be determined as part of the operations associated with one routing domain RD1 managed using a VTH instance VTH1, while routes between isolated networks IN3 and IN4 may be determined as part of the operations associated with a second routing domain RD2 managed using the same VTH instance VTH1 in some embodiments. A CreateVTHRoutingDomain request 2417 may be submitted by a client 2410 to establish a new routing domain associated with a specified VTH in the embodiment depicted in FIG. 17. In some embodiments, routing/forwarding metadata to be used for the routing domain, such as entries of a routing information base (RIB), forwarding information base (FIB), routing tables and the like may be passed as a parameter of the request to establish the routing domain; in other embodiments, the metadata may be provided in separate programmatic interactions. In response, the PPS may provide an identifier of the routing domain (RoutingDomainID 2419) in some embodiments. In at least one embodiment, by default, a given VTH may be associated with a single automatically created routing domain, so a separate request to create the first routing domain of the VTH may not be required. In scenarios in which multiple routing domains are associated with a given VTH instance, the VTH may be responsible for transmitting contents of network packets between isolated networks of individual ones of the routing domains, without crossing routing domain boundaries in various embodiments.

In various embodiments, a client may submit a programmatic request, AttachIsolatedNetworkToRoutingDomain 2421, to associate a specified isolated network (e.g., identified using one or more virtual network interface identifiers to be used for communications between the isolated network and the VTH) with a routing domain. The identifier of the routing domain may be included as a parameter of request 2421 in some embodiments. In one embodiment, if the VTH instance has only one routing domain, the identifier of the domain may not be required. In response to the attachment request 2421, additional metadata indicating that the specified isolated network has been linked to the VTH instance may be stored at the PPS control plane in some embodiments, and an attachment identifier 2423 may be provided to indicate that the requested attachment has been completed. After the attachment is complete, packets may be permitted to flow, e.g., via one or more virtual network interfaces, between the isolated network and the nodes of the VTH in various embodiments. In at least one embodiment, poll mode drivers (such as DPDK poll mode drivers, which do not require asynchronous notifications and therefore result in lower processing overhead than at least some other approaches for data transfers) may be used for transferring the packets to AINs (e.g., to I/O managers of the kind discussed earlier). In at least some embodiments, the particular isolated network being attached may be configured at premises external to the provider network data centers at which the PPS is implemented. A VPN connection or a dedicated physical link ("direct connect") to the provider network may be indicated (for example by identifying one or more gateways set up for traffic with the external network) in the attachment request 2421 in some embodiments. In some embodiments, separate types of attachment request APIs may be supported for isolated virtual networks external to the provider network—e.g., an AttachIsolatedNetworkViaVPN API may be supported for the VPN scenario, and an AttachIsolatedNetworkViaDirectConnect API may be supported for attaching isolated networks connected to the provider network via dedicated physical links.

In different embodiments, the assignment of an isolated packet processing cell (IPPC) to the VTH instance may occur in response to the first attachment request 2421 for a routing domain, in response to a request 2417 to create a routing domain, or in response to a request 2414 to create the VTH instance. Thus, the particular request that triggers the assignment of data plane resources (some collection of action implementation nodes and decision master nodes) may differ in different embodiments.

A programmatic DescribeVTHConfig request 2425 may be submitted by a client 2410 to view various properties of the VTH in the depicted embodiment, such as the number of routing domains of the VTH, the number and identifiers of different isolated networks attached to the routing domains or the VTH, the number of data plane nodes at each layer, and so on. In response, the requested information may be provided via one or more VTHConfigInfo messages 2427 in the depicted embodiment. In at least one embodiment, a user-friendly graphical view of the configuration may be provided.

Clients 2410 may submit ModifyVTHConfig messages 2429 of various types in different embodiments to request changes to the configuration of a VTH. Such changes may, for example include modified/additional FIB entries or specific routes supplied by the client, changes to the policies being used to determine actions, changes in the number of AINs and/or DMNs being used (e.g., increasing the number of AINs/DMNs to handle increased traffic levels), changes to availability or performance targets for the VTH, and so on in different embodiments. The PPS control plane may verify that the requested changes are acceptable with respect to the PPS's own policies regarding security, billing and the like, and make the requested changes if they are found acceptable. A ModComplete message 2431 may be sent to the client to indicate that the requested changes have been performed in some embodiments.

In at least one embodiment, multiple VTH instances may be established on behalf of a client (e.g., in different geographical regions), and a LinkVTHs request 2433 may be submitted by the client to establish a network path between a pair of VTH instances. Such a request may be referred to as a hub linkage request in some embodiments. In response, the appropriate networking configuration changes may be implemented at the PPS control plane, metadata indicating that a path between the pair of VTH instances has been configured/established may be stored, and a LinkComplete message 2435 may be sent to the client to indicate that the two VTH instances have been linked to enable traffic to flow between them in the depicted embodiment. After such a hub linkage is completed, traffic may be routed/forwarded from one isolated network associated with a first VTH, through the second (linked) VTH, to a second isolated network in various embodiments.

In some embodiments, one or more other types of VTH-related programmatic requests, not shown in FIG. 24, may be submitted by clients 2410 and fulfilled at the PPS. For example, in one embodiment, a given VTH instance may be shared among multiple client accounts, e.g., in response to the equivalent of a ShareVTHWithAccounts(AccountsList) request indicating the set of client accounts and the VTH instance to be shared. In some embodiments, an authorized client may programmatically accept or reject attachment requests submitted by other clients or users—e.g., client C1 may establish a VTH, share the VTH with other clients or users, and if/when an attachment request is submitted by one of the other clients or users, C1 may be sent a programmatic request to approve or reject the attachment of a specified isolated network to the VTH. In one embodiment, programmatic requests for packet processing metrics of the kind discussed earlier (e.g., total number of inbound packets received from one or more isolated networks at the VTH in some specified time interval, total number of outbound packets sent from the VTH to one or more isolated networks, total number of dropped inbound packets, and so on) may be supported. In at least one embodiment, at least some of the types of requests indicated in FIG. 24 and/or discussed above may not necessarily be supported by the packet processing service.

Linked Hubs

In some embodiments in which the packet processing service at which virtual traffic hubs are established is implemented at a provider network, the resources of the provider network may be geographically distributed, e.g., among several geographical regions, with individual regions comprises respective sets of cities, states or countries. Some clients of such a packet processing service may also have respective isolated networks, either inside the provider network, or in external premises, in different geographical regions. In at least some embodiments, the packet processing service may support linking of virtual traffic hubs in response to client requests, e.g., to enable traffic to be routed between isolated networks that are geographically far apart. Hubs may also or instead be linked for other reasons, e.g., based on preferences of clients that may wish to separate groups of isolated networks and associated hubs for administrative purposes while still enabling traffic to flow among the groups.

Figure 25:
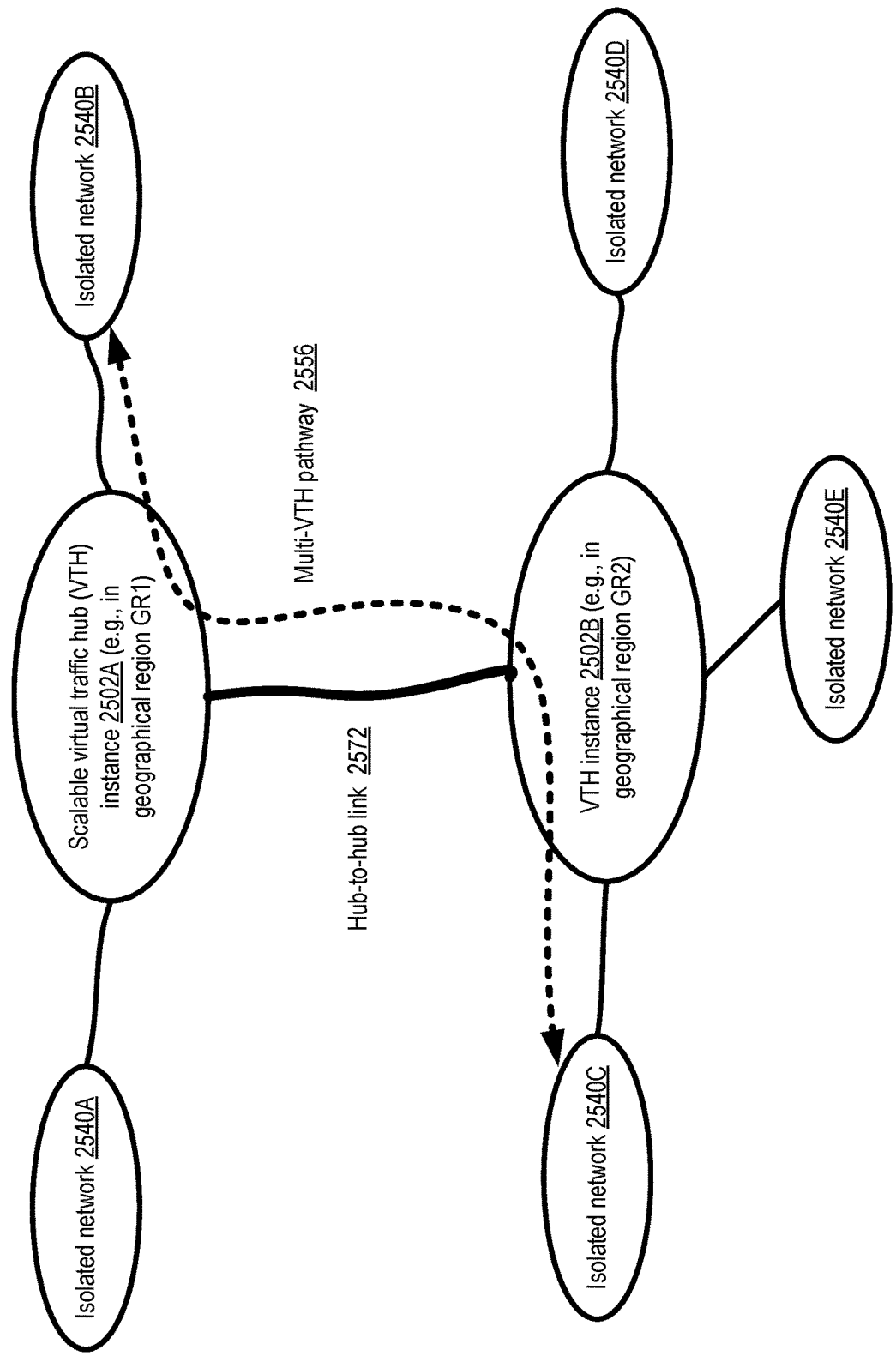
FIG. 25 illustrates an example scenario in which multiple virtual traffic hubs may be programmatically linked to one another, according to at least some embodiments.

FIG. 25 illustrates an example scenario in which multiple virtual traffic hubs may be programmatically linked to one another, according to at least some embodiments. In the depicted embodiment, two VTH instances, 2502A and 2502B, have been established on behalf of the same customer of a packet processing service similar to PPS 102 of FIG. 1. Isolated networks 2540A and 2540B have been programmatically associated with VTH 2502A, while isolated networks 2540C, 2540D and 2540E have been programmatically associated with VTH 2502B. Isolated networks 2540A and 2540B and VTH 2502A may, for example, be located in a different geographical region than isolated networks 2540C-2540E and VTH 2502B in the depicted scenario, although such geographical separation may not be required to link VTHs in at least some embodiments. In response to a programmatic request from a client, a hub-to-hub link 2572 may be established in the depicted embodiment, comprising for example some set of networking intermediary devices such as one or more routers, gateways or the like. The appropriate routing metadata may be propagated to the intermediary devices to enable data packets to flow along one or more multi-VTH-pathways 2556 in the depicted embodiment. In some embodiments, the pathways may utilize high-speed dedicated physical links associated with a provider network. By setting up such VTH-to-VTH links in response to client requests, the packet processing service may enable arbitrarily complex hub-and-spoke configurations to be set up in some embodiments, with resources in the spoke isolated networks of any given hub being able to communicate efficiently and in a scalable manner with other resources in spoke isolated networks of other hubs that may be geographically distant.

Methods for Supporting Virtual Traffic Hubs

Figure 26:
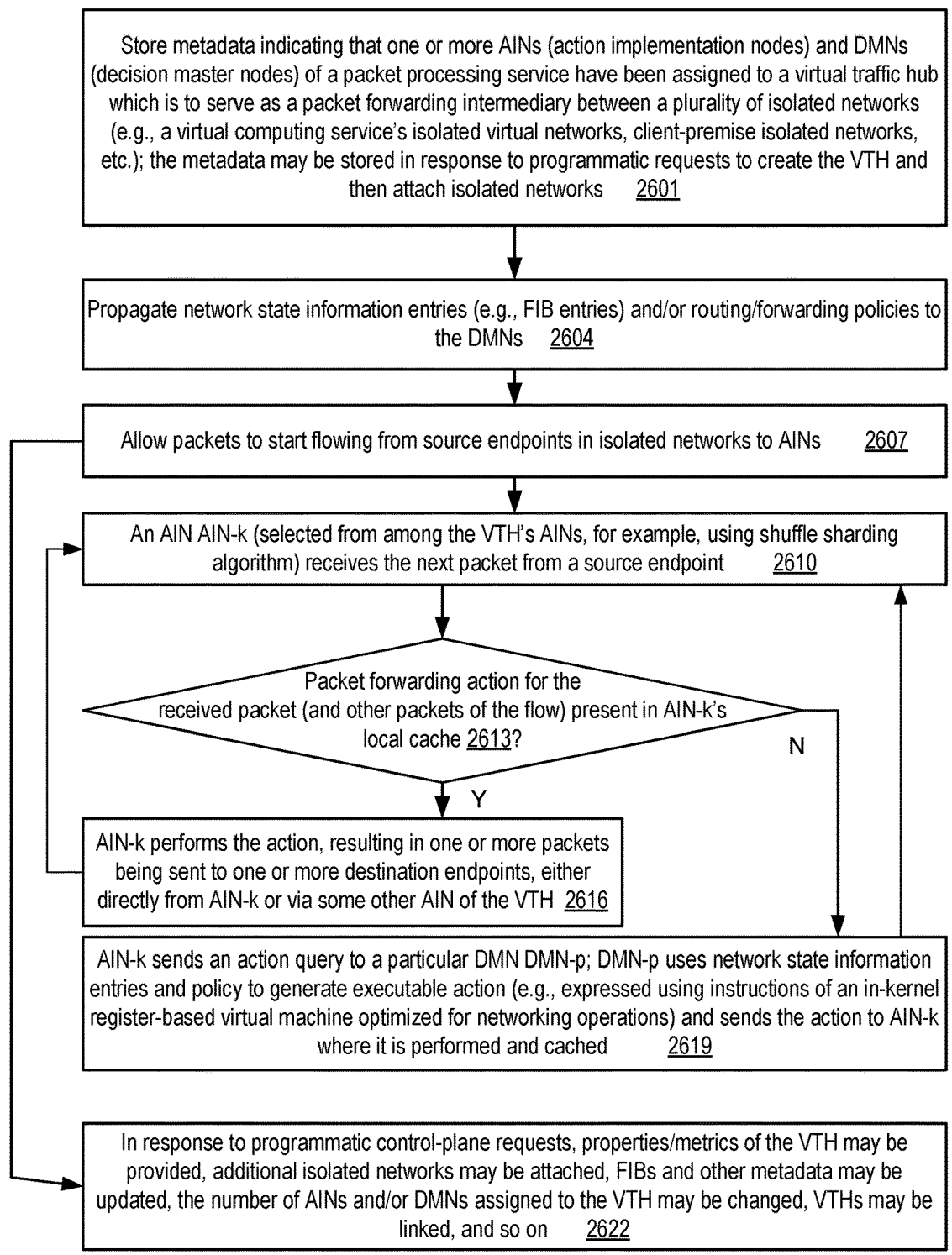
FIG. 26 is a flow diagram illustrating aspects of operations that may be performed to route traffic between isolated networks using a virtual traffic hub that utilizes resources of a packet processing service, according to at least some embodiments.

FIG. 26 is a flow diagram illustrating aspects of operations that may be performed to route traffic between isolated networks using a virtual traffic hub that utilizes resources of a packet processing service, according to at least some embodiments. As shown in element 2601, metadata indicating that one or more AINs (action implementation nodes) and DMNs (decision master nodes) of a packet processing service have been assigned to a virtual traffic hub (VTH) instance which is to serve as a packet forwarding intermediary between a plurality of isolated networks may be stored, e.g., at a control plane of the service. Individual ones of the AINs and DMNs may be implemented using one or more physical and/or virtual computing devices in different embodiments. In some embodiments, the packet processing service may be implemented as part of a suite of services of a provider network that includes a virtual computing service (VCS), and one or more of the isolated networks may comprise respective isolated virtual networks set up on behalf of VCS clients. Other isolated networks may comprise, for example, networks on client-owned or client-managed premises, such as data centers external to the provider network. The VTH instance may be created, and the metadata indicating the assignment of the AINs and DMNs may be stored, in response to one or more programmatic requests directed to the packet processing service in some embodiments. For example, in one embodiment one programmatic request may result in storage of metadata indicating that a new VTH has been created (without associating the VTH to any isolated network), and the metadata indicating the AIN/DMN assignments may be generated in response to a second request to attach one or more of the isolated networks to the VTH. As mentioned earlier, in some embodiments, a given VTH may be established for routing traffic of several different routing domains. In some embodiments, at least one isolated packet processing cell (IPPC) similar to the IPPCs shown in FIG. 1 may be assigned to the VTH.

As indicated in element 2604, network state information entries (e.g., FIB entries) and/or routing/forwarding policies that can be used to determine and/or generate packet processing actions for groups of related packets originating at the isolated networks may be propagated to the DMNs. In at least one embodiment, clients may provide routing information base (RIB) entries via programmatic interfaces to one or more control plane components of the packet processing service at which the VTH is instantiated, and corresponding forwarding information base (FIB) entries may be generated from the RIB entries and included in the state information provided to the DMNs. After the metadata has been propagated, in at least some embodiments packets may be allowed to flow from resources within the isolated networks to the AINs designated for the VTH (element 2607).

A given AIN, AIN-k may receive a packet from some source endpoint within a given isolated network in the depicted embodiment (element 2610). AIN-k may, for example, be selected as the recipient of the packet based on the use of flow hashing and/or shuffle-sharding algorithms in various embodiments. AIN-k may attempt to look up a packet forwarding action to be implemented for the received packet in a local cache, e.g., using a flow identifier of the packet as the lookup key in the depicted embodiment. If such an action is found in the cache, as detected in operations corresponding to element 2613, the action may be performed at AIN-k, resulting in one or more outbound packets corresponding to the received packet being sent to one or more destinations in another isolated network associated with the VTH (element 2616). In some cases an outbound packet may be sent along a path that includes another AIN, while in other embodiments the path may not include any other AINs than AIN-k itself.

If a representation of a forwarding action is not found in the cache, AIN-k may transmit an action query to a particular DMN (DMN-p) assigned to the VTH in the depicted embodiment (element 2619). DMN-p may use the network state information entries and/or policies which were propagated to the VTH's DMNs earlier to generate an executable packet processing/forwarding action and send the executable action to AIN-k. At AIN-k the action may be cached and performed in various embodiments. The action may, for example, be expressed as a set of instructions of an in-kernel register based virtual machine optimized for networking operations in some embodiments. When/if the next packet is received at an AIN assigned to the VTH, operations corresponding to elements 2610 onwards may be performed for the newly-received packet in various embodiments.

As mentioned earlier, in at least some embodiments one or more programmatic interfaces may be implemented by the packet processing service. In response to programmatic requests submitted via such interfaces, a number of different administrative or control plane VTH-related operations may be performed (element 2622). For example, properties or metrics associated with the VTH (such as the rate at which packets are received from individual ones of the isolated networks, the rate at which packets are forwarded to individual ones of the isolated networks, the resource utilization levels at various nodes of the VTH, and so on) may be provided in response to programmatic requests in some embodiments. In response to other types of requests, additional isolated networks may be attached programmatically to the hub, FIB entries and/or other metadata may be updated or provided to the packet processing service for use at the VTH, the number of AINs/DMNs assigned to the VTH may be changed, multiple VTHs may be linked, and so on in different embodiments.

Handling Overlapping Private Address Ranges

In some embodiments, the isolated networks for which connectivity is enabled using virtual traffic hubs of the kind discussed above may each have one or more associated private network address ranges, from which various addresses may be assigned to different resources (e.g., physical or virtual machines) within the isolated networks. As suggested by the use of the term "private" to describe such addresses, these addresses may typically not be advertised outside the isolated networks, at least by default. Because the address ranges are private, and may be selected independently by respective administrators or owners of the isolated networks, it may sometimes be the case that the address ranges of two or more isolated networks overlap. In such scenarios, some form of address translation may be required when communications among resources with potentially identical addresses is enabled. In at least some embodiments, a virtual traffic hub may be configured to implement such address translations, e.g., as part of the actions generated at the routing decisions layer of the hub and performed at the action implementation layer of the hub. In some embodiments, the appropriate translation rules/mappings to generate the actions may be provided by a client. In at least one embodiment, the rules/mappings may be generated automatically within the VTH.

Figure 27:
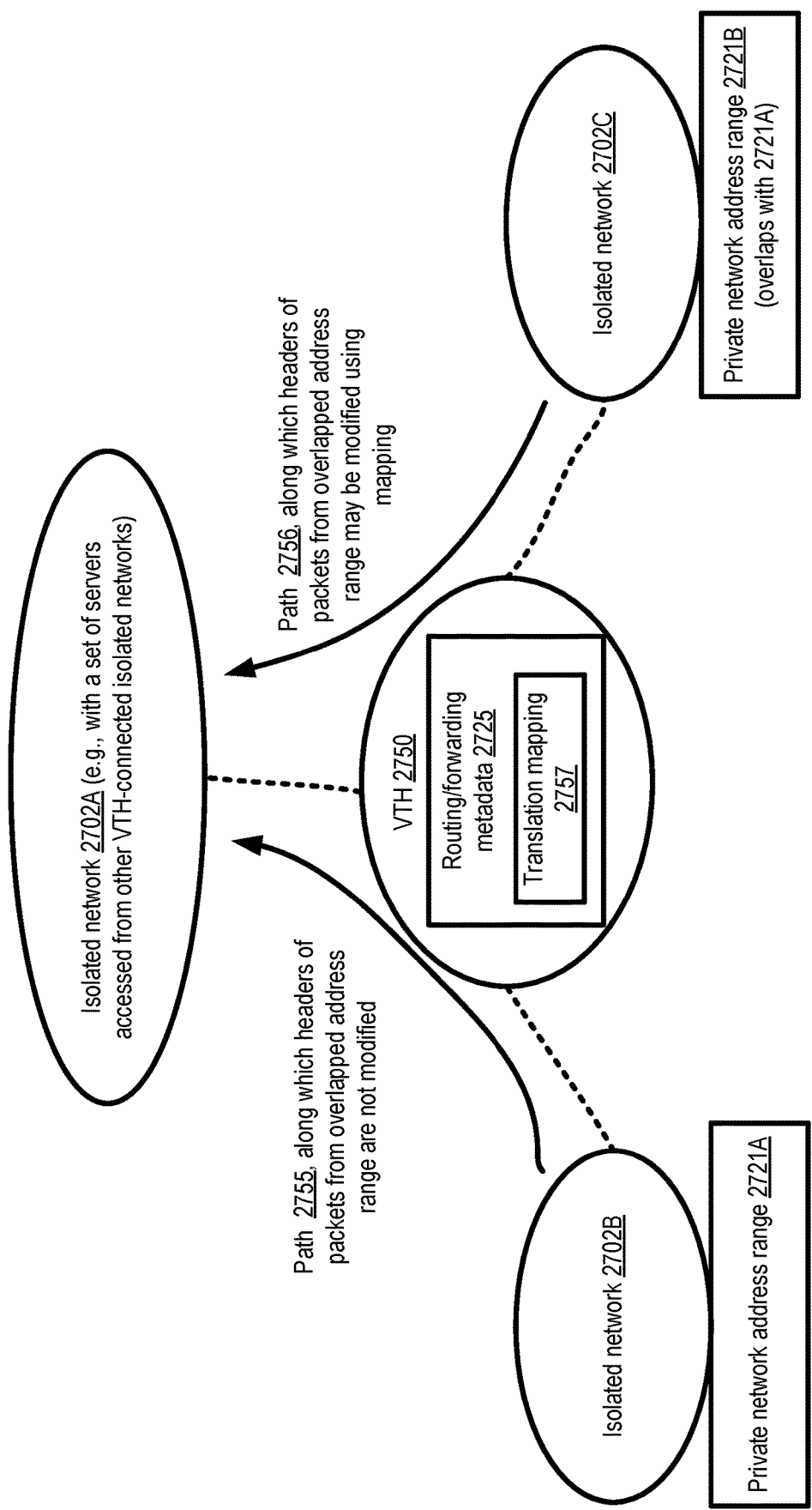
FIG. 27 illustrates an example system environment in which a virtual traffic hub may be used to connect isolated networks which may have overlapping network address ranges, according to at least some embodiments.

FIG. 27 illustrates an example system environment in which a virtual traffic hub may be used to connect isolated networks which may have overlapping network address ranges, according to at least some embodiments. In system 2700, a virtual traffic hub (VTH) 2750 has been established on behalf of a client, e.g., using the resources of a packet processing service similar to PPS 102 of FIG. 1, to enable network traffic to flow from isolated network 2702B to isolated network 2702A, and also to enable network traffic to flow from isolated network 2702C to isolated network 2702A. Isolated network 2702A may, for example, include some set of servers, such as email servers, file servers or the like, to which service requests are directed from the isolated networks 2702B and 2702C in the depicted embodiment.

Isolated networks 2702B and 2702C may have respective private network address ranges 2721A and 2721B, which may potentially overlap with one another. Such overlaps may exist, for example, because the networking configurations for the isolated networks may have been set up independently and at different times (e.g., within different business or public-sector organizations, or within different units of the same organization). In some cases, isolated networks that have been in operation for years may be connected at some point via VTHs such as VTH 2750, and it may not be practical to change the set of private addresses being used within the isolated networks. Individual ones of the isolated networks 2702 may, for example, comprise isolated virtual networks of a provider network, customer-premises networks external to the provider network, and so on in different embodiments.

In the depicted embodiment, the routing/forwarding metadata 2725 that is used to generate packet processing actions at the VTH (e.g., at decision master nodes that employ a longest prefix match algorithm to look up routing actions) may comprise a translation mapping 2757, which may be used to transform packet headers for packets originating at one of the isolated networks 2702B or 2702C, when transmitting the packets to isolated network 2702A. For example, consider a scenario in which isolated network 2702B has a virtual machine VM1 with a private IP address 192.168.1.1, and isolated network 2702C also has a virtual machine VM2 to which the same private IP address 192.168.1.1 has been assigned. Packets from VM1, transmitted along path 2755 via VTH 2750, may be forwarded without modifying the sender's IP address in the depicted embodiment. However, packets from VM2, being sent along path 2756, may be modified by applying the translation mapping at the VTH 2757 (e.g., changing the VM2 packets' sender IP address from 192.168.1.1 to, say, 12.7.1.1) in the depicted embodiment. Similarly, at least some response packets sent back from isolated network 2702A to isolated network 2702C may have their destination addresses translated by applying the translation mapping in reverse (e.g., changing the destination IP address from 12.7.1.1 to 192.168.1.1) in the depicted embodiment.

A translation mapping 2757 may indicate, for example, the specific translations or header transformations to be applied, and the sources/destinations (specified for example using the specific virtual network interfaces that are used for VTH-to-isolated-network or isolated-network-to-VTH communications) whose packets are to be transformed in various embodiments. As a result of the translation techniques implemented at the VTH, the internal networking configuration settings of the isolated networks need not be modified in the depicted embodiment, thus simplifying the task of managing interconnected isolated networks substantially. Note that at least in some embodiments, such translation techniques may be applied for packets flowing directly among pairs of isolated networks with overlapping address ranges, and not just for the three-isolated-network scenario depicted in FIG. 27. For example, address translations may be performed at VTH 2750 for packets flowing from isolated network 2702B to isolated network 2702C, and/or for packets flowing from isolated network 2702C to isolated network 2702B in the depicted embodiment.

According to at least some embodiments, a system may comprise a set of computing devices of a provider network. The computing devices may include instructions that upon execution on a processor cause the computing devices to perform one or more configuration operations to enable connectivity, using a first virtual traffic hub (VTH), between a plurality of isolated networks including a first isolated network. The first virtual traffic hub may comprise a plurality of layers including (a) a routing decisions layer at which respective routing action for network packets are identified and (b) an action implementation layer at which routing actions identified at the routing decisions layer are performed. In various embodiments, individual ones of the layers may include one or more nodes of a packet processing service similar to that described above. The actions may be identified at the routing decisions layer at least in part using, for example, metadata supplied by a client, as well as a longest prefix match algorithm in at least one embodiment. Respective network addresses may be assigned to one or more resources of the first isolated virtual network from a first private address range (e.g., a range of IP version 4 or IP version 6 addresses).

In at least one embodiment, a determination may be made, e.g., at one or more nodes of the virtual traffic hub and/or at control plane elements of the packet processing service being used for the virtual traffic hub, that the first private address range overlaps with (has at least one address in common with) a second private address range of a second isolated network. In different embodiments, the determination may be made in response to various types of triggering events—e.g., when a request to associate or attach the second isolated network to the virtual traffic hub is received, or when a post-attach configuration change is made at the second isolated network. An indication of a translation mapping may be propagated to at least a first decision master node (DMN) of the routing decisions layer in some embodiments. The translation mapping may be intended to be applied for at least a portion of the second private address range. From the first DMN, a representation of a first action which includes applying the translation mapping may be provided to one or more action implementation nodes (AINs) of the action implementation layer of the VTH. At a particular action implementation node, the first action may be performed with respect to a received packet from the second isolated network. This may result, for example, in forwarding of a modified version of the received packet (which originated at a second resource within the first isolated network) to a second resource outside the second isolated network (e.g., at a third isolated network associated with the hub, or at the first isolated network). The modified version of the received packet may comprise one or more header elements changed using the translation mapping in at least some embodiments.

FIG. 28 and FIG. 29 collectively illustrate examples of alternative approaches for detecting and responding to overlapping address ranges among isolated networks connected via a virtual traffic hub, according to at least some embodiments. In option A of FIG. 28, for example, a client 2801 may include a translation mapping as a parameter in a request (AttachIsolatedNetwork) to attach an isolated network (which has an overlapping private address range with respect to some other isolated network that is currently attached, or is going to be attached) to a VTH or a routing domain of a VTH. The AttachIsolatedNetwork request may, for example, be submitted to the packet processing service 2802 as one of the steps of configuring a VTH, similar to the steps discussed earlier. The inclusion of the mapping parameter within the request may serve as an indication that the overlap exists in some embodiments. The packet processing service may provide a programmatic response 2804 indicating that the mapping is accepted in the depicted embodiment. In some embodiments, the packet processing service 2802 may perform a set of validation or verification operations, e.g., to ensure that the provided mapping does not result in conflicts with other private IP address ranges of isolated networks associated with the VTH, before accepting the mapping.

In Option B of FIG. 28, a client 2801 may submit an AttachIsolatedNetwork request to the packet processing service 2802, and the service may detect whether an overlap exists between the private IP address ranges configured at the to-be-attached isolated network and some other isolated network which is already attached to the targeted VTH. If such an overlap is detected, the client 2801 may be notified, e.g., via an AddressOverlapDetected message 2809, which may include details of the overlapping address range in at least some embodiments. In response to the AddressOverlapDetected message 2809, the client may provide a translation mapping 2810, which may be stored as part of the VTH-related metadata at the packet processing service.

In Option C of FIG. 28, if/when the PPS 2802 receives a request 2821 to attach an isolated network and detects an address overlap, the service may generate a proposed or candidate translation mapping for the overlapping range, and send that proposed mapping 2823 to the client programmatically for approval. If/when the client approves the proposed candidate mapping, the mapping may be propagated to the DMNs assigned to the VTH and corresponding actions may begin to be generated and applied in the depicted embodiment.

In another approach, illustrated in Option D of FIG. 29, prior to requesting an attachment of an isolated network, a client 2801 may provide an indication of a set of isolated networks that are to be connected using a VTH to the PPS 2802, and request the PPS to detect address overlaps (e.g., via DetectAddressOverlaps message 2903). The PPS 2802 may examine the networking configurations of the isolated networks, and if any overlaps among private IP addresses are detected, an indication of such overlapped address ranges may be provided programmatically to the client (e.g., via CurrentOverlappedRanges message 2904). The client 2801 may then submit attachment requests 2906 indicating translation mappings to be applied with respect to the overlapped ranges identified by the PPS in the depicted embodiment.

In Options A-D illustrated in FIG. 28 and FIG. 29, the client generates and/or approves the translation mappings to be applied at the VTH. In some embodiments, clients may wish to leave the details of detecting and generating address translation mappings entirely to the PPS, and may not necessarily be interested in approving the mappings. In Option E of FIG. 29, for example, a client may use an AutomateOverlappingAddressHandling request 2908 to inform the PPS 2802 that address overlap detection and management is to be fully automated, without requiring additional work from the client. In response, the PPS 2802 may send an acknowledgement message 2909 indicating that automated handling of overlapping address ranges has been initiated in the depicted embodiment. Subsequently, when an isolated network is to be attached to a VTH on behalf of the client 2801, the PPS 2802 may determine whether that isolated network has any private address ranges that overlap with those of other attached isolated networks. If such overlaps are detected, the PPS 2802 may generate a translation mapping and start using the mapping, e.g., without additional interactions with the client 2801.

In at least some embodiments, the PPS 2802 may comprise a post-attach configuration change detector 2957, which may check whether any new address ranges have been configured or identified for use within isolated networks that have already been associated with the VTH, and if so, whether those new address ranges overlap with existing address ranges in use in other isolated networks associated with the VTH. If such overlaps are detected, corresponding new translation mappings may be generated automatically and used in the depicted embodiment. Note that such automated detection of post-attachment configuration changes may be performed regardless of the particular option (Option A-Option E of FIG. 28 and FIG. 29) being used to detect the address overlaps and generate/use the mappings in at least some embodiments.

If and when the client 2801 wishes to view translation mappings that are in use for their VTH, a ShowTranslationMappingsInUse request 2910 may be submitted to the PPS 2802 in the depicted embodiment, and the current set of in use mappings 2911 (including one or more attributes of the mappings, such as when they were generated, the sources from which the mappings were obtained, and the like) may be provided or displayed in response. Requests to display the mappings in use at a VTH may be received and fulfilled regardless of the particular option (Option A-Option E of FIG. 28 and FIG. 29) that is used to detect the address overlaps and generate/use the mappings in at least one embodiment. In various embodiments, any of a variety of response actions may be undertaken if/when an address overlap is detected among one or more pairs of isolated networks connected via a hub—e.g., in some cases the overlap response action may include notifying one or more clients that an overlap exists, in other cases the response action may include auto-generating a candidate mapping, etc. In at least some embodiments, prior to programmatically attaching/associating a given isolated network to a hub, the PPS may verify that either (a) no overlaps exist between the address ranges of the to-be-associated isolated network and other currently-attached isolated networks or that (b) if any such overlaps exist, corresponding translation mappings have been generated and propagated to the decisions layer of the virtual traffic hub. Later, as and when configuration changes are made at one or more of the attached isolated networks in such embodiments, new address range overlaps may in some cases be detected, and corresponding actions may be initiated by the VTH. Other approaches towards detecting and responding to overlapped private address ranges than those shown in FIG. 28 and FIG. 29 may be employed in some embodiments.

Figure 30:
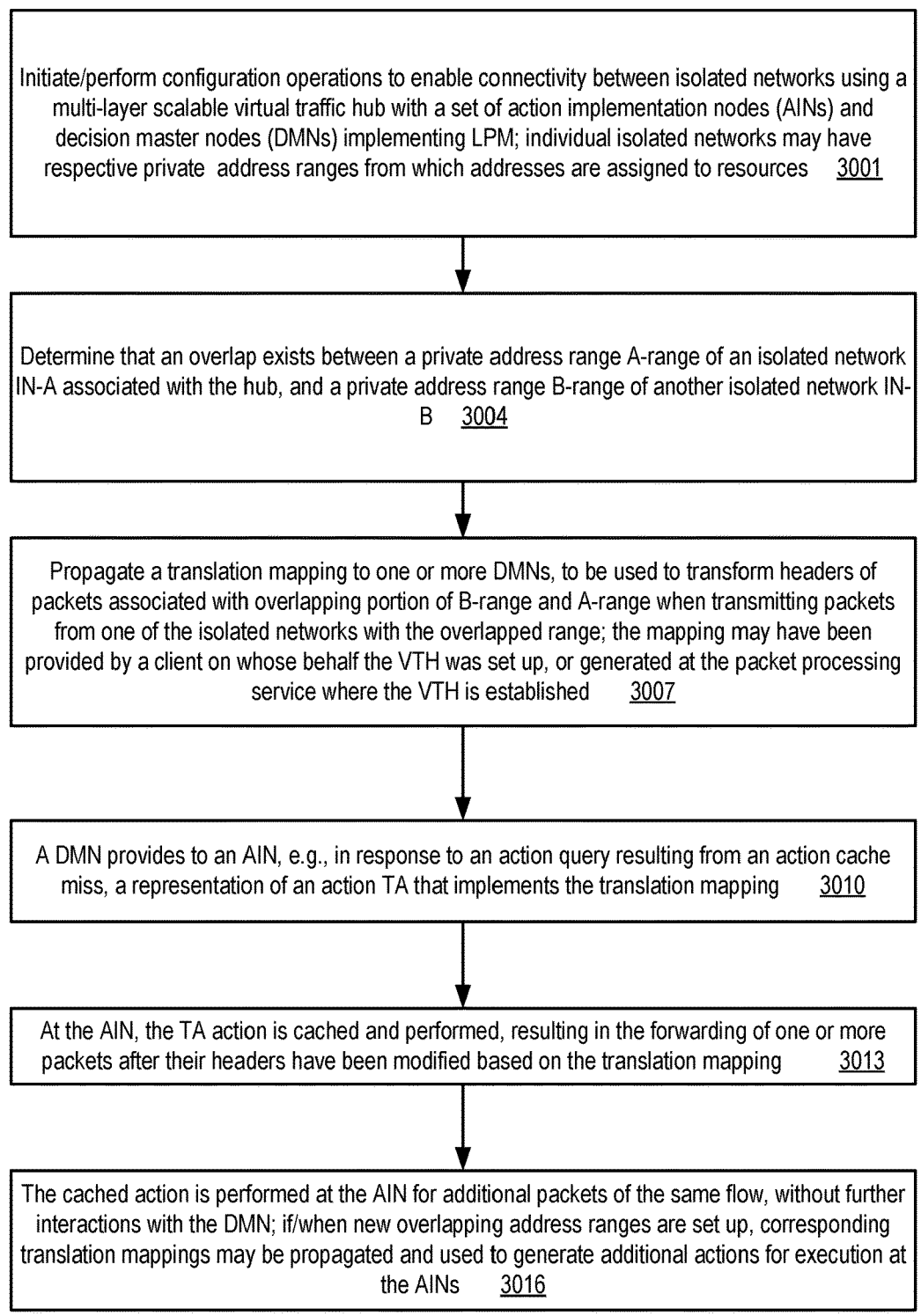
FIG. 30 is a flow diagram illustrating aspects of operations that may be performed to route traffic between isolated networks using a virtual traffic hub, in scenarios in which the isolated networks may have overlapping address ranges, according to at least some embodiments.

FIG. 30 is a flow diagram illustrating aspects of operations that may be performed to route traffic between isolated networks using a virtual traffic hub, in scenarios in which the isolated networks may have overlapping address ranges, according to at least some embodiments. As shown in element 3001, configuration operations to enable connectivity between various isolated networks using a multi-layer scalable virtual traffic hub (VTH) with a set of action implementation nodes (AINs) and decision master nodes (DMNs) may be initiated or performed. The AINs and DMNs may be part of the data plane of a packet processing service similar to PPS 102 of FIG. 1 in the depicted embodiment. A longest prefix match algorithm may be employed at the DMNs as part of the operations performed to determine routing/forwarding actions to be taken for various packets in some embodiments as discussed earlier. Individual ones of the isolated networks may have respective private address ranges from which addresses are selected for and assigned to their resources.

A determination may be made that an overlap exists between a private address range A-range of an isolated network IN-A that is associated with the hub, and a private address range B-range of another isolated network IN-B in the depicted embodiment (element 3004). Such a determination may be made, for example, when a programmatic request to attach IN-B to the hub is received, or when a configuration change is made within IN-B which results in the selection or use of a new set of addresses. A translation mapping may be propagated to one or more of the DMNs in the depicted embodiment (element 3007), e.g., from the control plane of the packet processing service. The mapping may, for example, be used to transform headers of packets associated with the overlapping portion of B-range and A-range when transmitting packets from one of the isolated networks with the overlapped range. In various embodiments, the mapping may have been provided by a client on whose behalf the VTH was set up, or may have been generated at the packet processing service where the VTH is established. In at least some embodiments, the mapping may be propagated prior to (e.g., as a pre-requisite) enabling traffic to begin flowing among at least some pairs of the isolated networks.

A DMN may provide a representation of an action TA that implements the translation mapping to an AIN, e.g., in response to an action query resulting from an action cache miss at the AIN in at least some embodiments (element 3010). At the AIN, the TA action may be cached and performed, resulting in the forwarding of one or more packets after their headers have been modified based on the translation mapping in the depicted embodiment (element 3013). The cached TA may be performed at the AIN for additional packets of the same flow, e.g., without further interactions with the DMN (element 3016). If/when new overlapping address ranges are set up within the isolated networks that have already been associated with the VTH, or if/when new isolated networks with overlapping address ranges are attached, translation mappings for the additional overlapping ranges may be generated and propagated to the DMNs, where they may be used to generate additional actions for execution at the AINs in the depicted embodiment.

Automated Propagation of Routing Metadata Between Isolated Networks

In some embodiments in which a virtual traffic hub is uses to provide connectivity between isolated networks, some or all of the private networks associated with the hub may have respective within-isolated-network route tables that may be changed as needed, e.g., by administrators or by the clients on whose behalf the isolated networks have been set up. These route tables may be used, for example, to determine where to direct packets originating at resources such as virtual or physical machines within the isolated networks—e.g., whether a given packet should be sent to a virtual traffic hub, or sent to a resource within the isolated network itself. When new routes are added to such local route tables within a given isolated network, or existing routes are modified or removed, the changes may potentially affect the traffic that enters or leaves the isolated network via the hub—e.g., local route tables within other isolated networks may not have the entries needed to allow packets to be transmitted using the correct updated routing information. Even after a virtual traffic hub with the appropriate forwarding information base is connected to an isolated network IN1, in at least some embodiments traffic may not necessarily begin to flow from resources within the isolated network to the hub until the appropriate entries (e.g., identifying paths to resources in other isolated networks IN2, IN3 etc. via the hub) are added to the IN1's own internal route tables.

Figure 31:
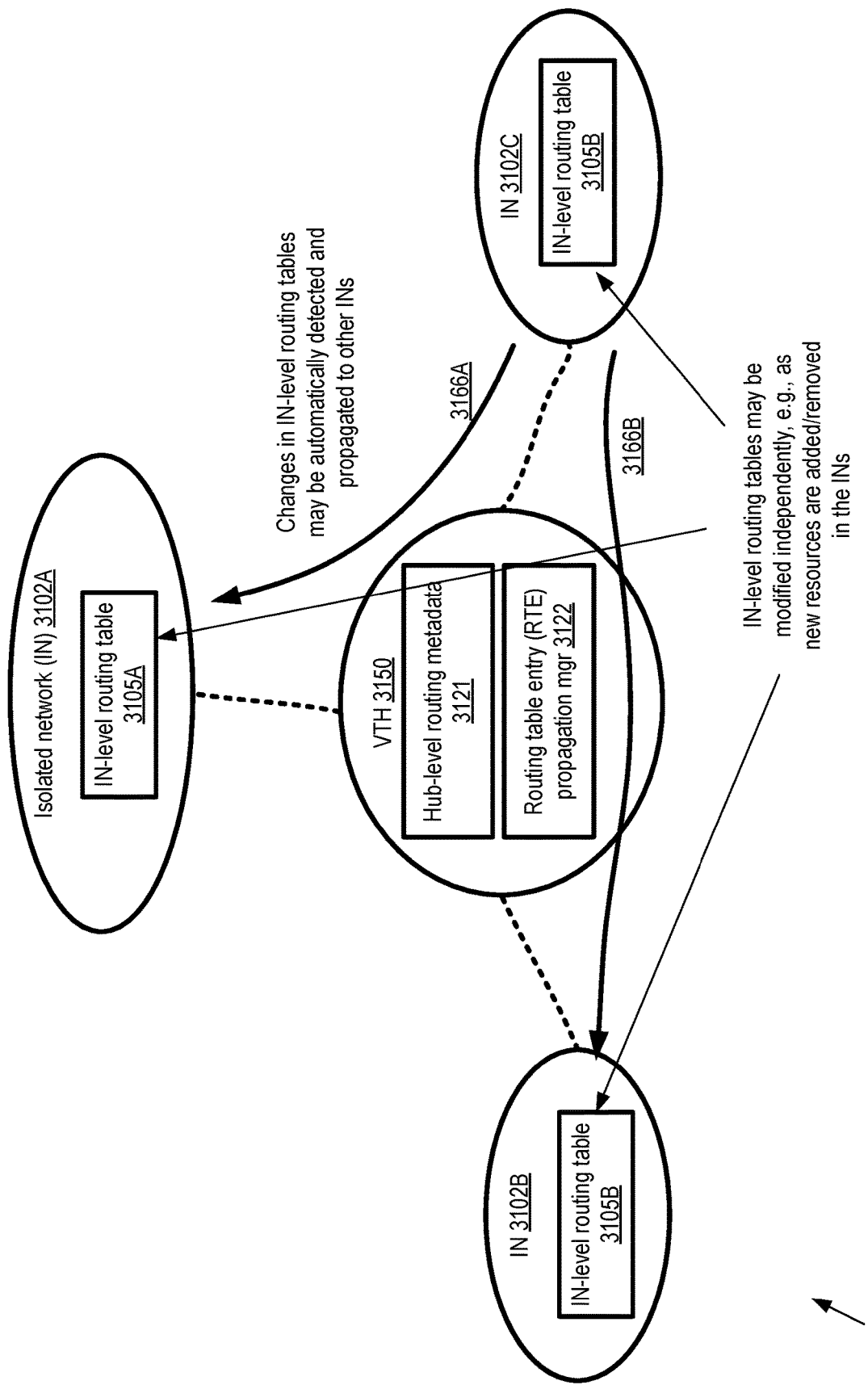
FIG. 31 illustrates an example system environment in which a virtual traffic hub may be used to automatically propagate routing information among isolated networks, according to at least some embodiments.

In at least one embodiment, a virtual traffic hub may be configured to (e.g., in addition to performing the kinds of operations discussed earlier) automatically propagate local routing metadata between isolated networks, e.g., to enable the local routers within the isolated networks to start directing traffic to/from the virtual traffic hub. FIG. 31 illustrates an example system environment in which a virtual traffic hub may be used to automatically propagate routing information among isolated networks, according to at least some embodiments. As shown, system 3100 may include a plurality of isolated networks (INs) 3102, such as 3102A, 3102B and 3102C, programmatically attached to a virtual traffic hub (VTH) 3150 implemented using resources of a packet processing service similar to PPS 102 of FIG. 1. Individual ones of the isolated networks may have their own routing tables in the depicted embodiment, which may be referred to as IN-level routing tables, such as table 3105A at IN 3102, table 3105B at IN 3102B, and table 3105C at IN 3102C. These IN-level routing tables may be modified independently of one another, e.g., as new resources are configured or decommissioned within the individual isolated networks. As shown, VTH 3150 may comprise a set of hub-level routing metadata 3121 as well as a routing table entry propagation manager 3122 in the depicted embodiment. The hub-level routing metadata 3121 may be generated and/or stored based on input provided by clients via APIs of the kind discussed earlier (e.g., APIs whose parameters include forwarding information base entries, or routing information base entries that may be converted to forwarding information base entries) in the depicted embodiment. In some embodiments, one or more of the INs 3102 may comprise isolated virtual networks set up at a virtualized computing service (similar to isolated virtual networks discussed for example in the context of FIG. 3). In at least one embodiment, at least some of the nodes of the VTH 3150, e.g. at the routing decisions layer or the action implementation layer, may be implemented using resources of a provider network, while one or more of the resources used for a given isolated network 3102 may be external to the provider network, e.g., at a customer premise.

The propagation manager 3122 may be responsible for intelligently propagating changes made at a given IN-level routing table 3105 of a given isolated network to the appropriate set of other IN-level routing tables within other isolated networks in the depicted embodiment. For example, as indicated by arrows 3166A and 3166B, changes made to IN-level routing table 3105B may be propagated to tables 3105A and 3105B. In at least some cases, the entries introduced into the remote IN-level routing tables (e.g., 3105A or 3105B in the above example) may not be copies of the entries in the source IN-level routing table (e.g., 3105C)—instead, a transformed version of the source entry (generated using an address translation mapping), or a new entry which takes the available paths to/from the VTH 3150 into account, may be inserted into the remote IN-level routing tables. In a more general sense, the VTH 3150 may be responsible for propagating updated routing-related information (as opposed to necessarily copying contents of route table entries) as needed among its associated isolated networks in the depicted embodiment. The decision to propagate the routing information may be made, for example, when an update is detected to an already-attached isolated network's routing table, and/or when a request to attach a new isolated network to the VTH 3150 is received in various embodiments. The propagation manager 3122 may utilize various types of application programming interfaces and programmatic requests supported at the isolated networks 3102 in some embodiments to obtain/inspect contents of IN-level routing tables, to be notified when changes are made to such IN-level routing tables, and so on, in the depicted embodiment.

According to some embodiments, a system may comprise a set of computing devices of a provider network. The computing devices may include instructions that upon execution on a processor cause the computing devices to store metadata indicating that a virtual traffic hub is configured as an intermediary for network traffic between a first isolated network and a second isolated network. The first isolated network may have an associated first routing table, and the second isolated network may have its own associated second routing table in at least some embodiments. The virtual traffic hub may comprise a plurality of layers including (a) a routing decisions layer at which a routing action for a network packet may be determined and (b) an action implementation layer at which routing actions identified at the routing decisions layer may be performed in at least some embodiments. In at least some embodiments, the actions may be determined at the routing decisions layer based at least in part on employing a longest prefix match algorithm to look up an entry in a set of routing/forwarding entries. The computing devices may determine that at least a first entry of the first routing table is to be represented in the second routing table, e.g., to enable network packets originating at one or more resources of the second isolated network to be transmitted via the virtual traffic hub to one or more resources of the first isolated network in some embodiments. The computing devices may cause a new entry corresponding to the first entry may be included in the second routing table in such embodiments. Based at least in part on the new entry, a network packet originating at a first resource of the second isolated network may be transmitted to an action implementation node of the virtual traffic hub in various embodiments, and a routing action may be performed at the action implementation node, resulting in a transmission of contents of the network packet along a path to one or more resources of the first isolated network.

The propagation of routing information from one isolated network to another via a virtual traffic hub may be triggered by any of several types of events in different embodiments. FIG. 32 illustrates examples of triggering events that may lead to the propagation of routing information by a virtual traffic hub to one or more isolated networks, according to at least some embodiments. The reception of an attachment request (AttachIsolatedNetwork) 3203 via a programmatic interface at the packet processing service control plane 3202 may represent one type of event that leads to route table entry propagations 3204. For example, the control plane of the packet processing service at which the hub is implemented may issue a set of route detection APIs to obtain entries in the IN-level routing tables of the to-be-attached isolated network, and propagate corresponding entries to the IN-level routing tables of the other networks of the routing domain in the depicted embodiment. Similarly, in at least some embodiments, new entries may be added to the IN-level routing table of the to-be-attached isolated network as a result of the issuance of APIs by the control plane 3202.

In a second type of triggering event, post-attachment routing table entry changes 3213 at a given isolated network may be detected by the packet processing service control plane 3202. In some embodiments, an automated notification mechanism or API may be used by the control plane 3202 to detect when changes to IN-level routing tables occur, while in other embodiments the control plane 3202 may periodically check for updates to the IN-level routing tables using route-related APIs or requests of the isolated networks. If/when the changes are detected, corresponding entries 3214 may be propagated to the appropriate set of other isolated networks in the depicted embodiment.

Figure 33:
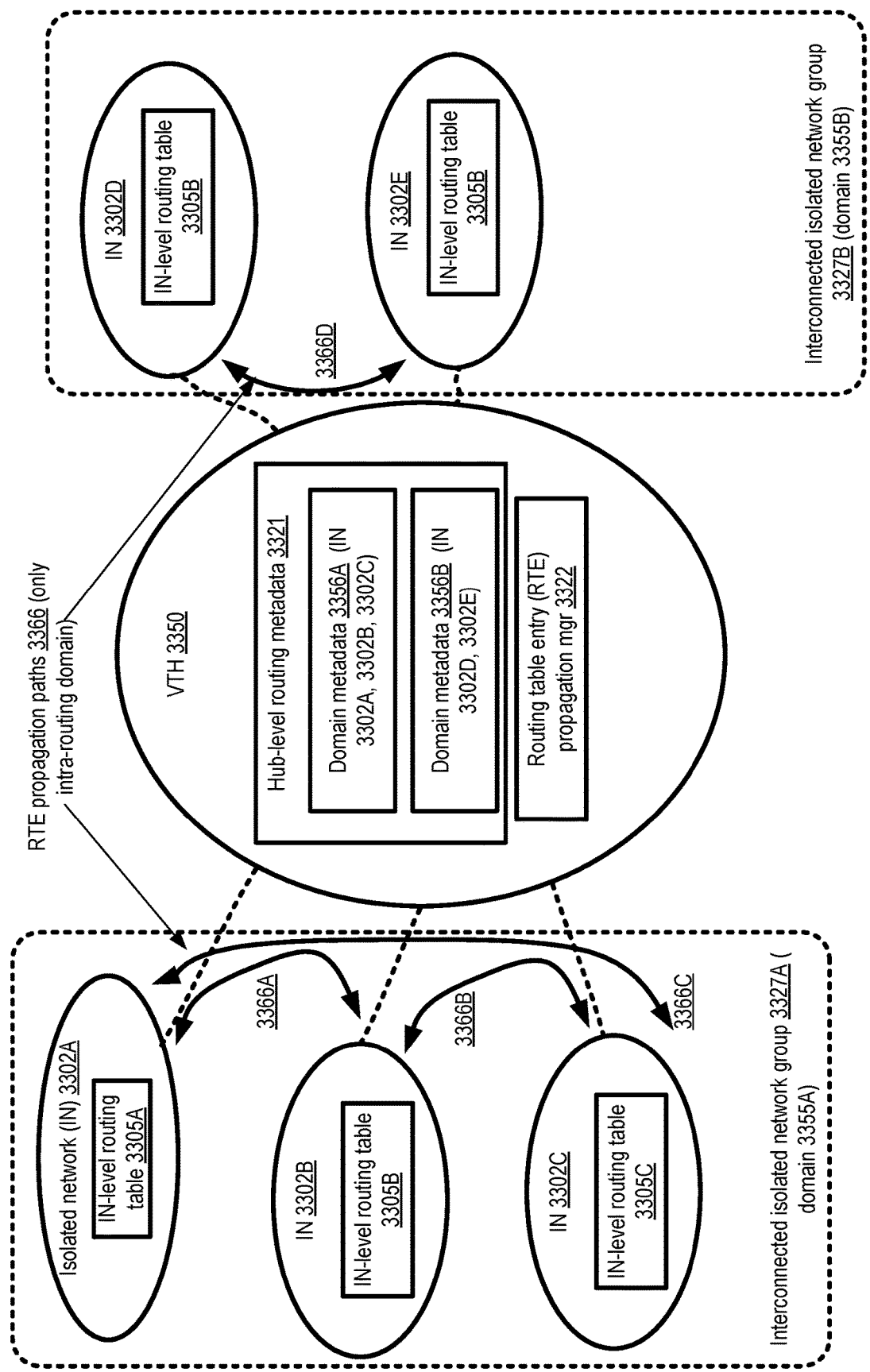
FIG. 33 illustrates examples of a domain-restricted propagation of routing information by a virtual traffic hub, according to at least some embodiments.

As mentioned earlier, several different routing domains, each comprising a plurality of interconnected isolated networks, may be set up using a virtual traffic hub in at least some embodiments. The automated propagation of routing information may be performed taking domain boundaries into account in at least some embodiments. FIG. 33 illustrates examples of a domain-restricted propagation of routing information by a virtual traffic hub, according to at least some embodiments. In the depicted embodiment, two routing domains may be set up using a virtual traffic hub 3350 similar in functionality to the VTHs introduced above: domain 3355A (comprising an interconnected group 3327A of isolated networks 3301A, 3302B and 3302C) and domain 3355B (comprising a different interconnected group 3327B of isolated networks 3301D and 3302E). The VTH may store separate hub-level routing domain metadata 3356A and 3356B (e.g., including respective FIBS or RIBs) for respective routing domains 3355A and 3355B in the depicted embodiment. Individual ones of the isolated networks 3302A-3302E may have their respective IN-level routing tables 3305A-3305E.

As indicated by arrows 3366A-3366D, the routing table entry (RTE) propagation manager 3322 of the VTH 3350 may propagate RTEs along paths that do not cross domain boundaries in the depicted embodiment. Thus, routing information may be propagated between isolated networks 3302A and 3302B (arrow 3366A), between isolated networks 3302A and 3302C (arrow 3366C) and between isolated networks 3302B and 3302C (arrow 3366B), but not from any of the isolated networks of group 3327A to any of the isolated networks of group 3327B in the depicted embodiment. Similarly, within domain 3355B routing information may be propagated between INs 3302D and 3302E (arrow 3366D), but routing information of group 3327B may not be passed on to any of the isolated networks of domain 3355A. The routing domain metadata 3356 may be examined by the RTE propagation manager 3322 in at least some embodiments to determine where routing information from a given isolated network 3302 is to be propagated. For example, if a request to attach another isolated network 3302F to domain 3355 is received, in some embodiments the propagation manager 3322 may consult the domain metadata 3356B and determine that routing information of to-be attached isolated network 3302F is to be propagated among INs 3302D and 3302E, and not among other isolated networks of other domains (such as INs 3302A-3302C).

Figure 34:
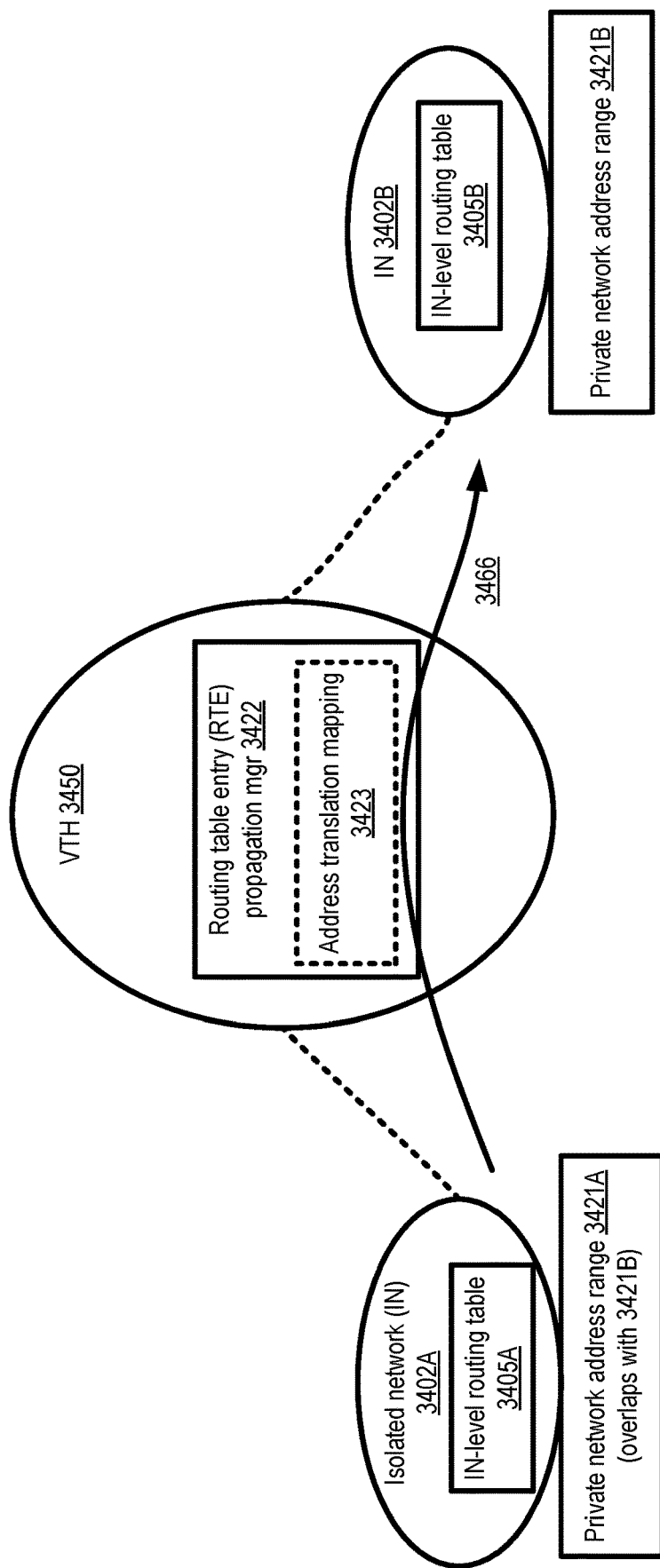
FIG. 34 illustrates an example of the use of an address translation mapping during the propagation of routing information by a virtual traffic hub, according to at least some embodiments.

In various embodiments, as discussed earlier, private network address ranges of different isolated networks may overlap in some cases. In such embodiments, when propagating routing information from one isolated network to another, an address translation mapping may be used for the overlapping portions of the address ranges. FIG. 34 illustrates an example of the use of an address translation mapping during the propagation of routing information by a virtual traffic hub, according to at least some embodiments. In the depicted embodiment, a virtual traffic hub 3450 is configured as a routing intermediary between isolated networks (INs) 3402A and 3402B. Isolated network 3402A has IN-level routing table 3405A, while isolated network 3402B has its own IN-level routing table 3405B. A private network address range 3421A of isolated network 3402 overlaps with a private network address range 3421B of isolated network 3402B. As a result of the overlap, some entries in table 3405A may contain addresses that are already assigned to resources in IN 3402B, and vice versa.

In the embodiment depicted in FIG. 34, the routing table entry propagation manager 3422 of the VTH 3450 may utilize an address translation mapping 3423 to transform at least a portion of one or more entries 3466 propagated from IN 3402A to IN 3402B. In some embodiments, the translation mapping 3423 may be generated automatically at the VTH 3450, while in other embodiments, a client may provide the translation mapping 3423. Generally speaking, any of the approaches towards detecting overlapping private address ranges and obtaining corresponding translation mappings discussed earlier, e.g., in the context of FIG. 28 and FIG. 29, may be employed in embodiments in which routing information propagation includes address translation as in the example scenario depicted in FIG. 34. In response to determining that an overlap exists of the kind indicated in FIG. 34, the VTH or the packet processing service may initiate one or more overlap response actions in various embodiments. Such actions may include, for example, providing an indication of the overlap via a programmatic interface (e.g., to a client or a network administrator), generating or obtaining the translation mapping 3423 and applying it to modify routing information propagated to one or both of the isolated networks involved, and so on. In at least one embodiment, an indication of the specific overlap response actions to be performed if/when such an overlap is detected may be obtained via a programmatic interface— e.g., the client on whose behalf the VTH is set up may provide a directive indicating the specific type of response to be undertaken for address overlaps. In some embodiments, a client may indicate programmatically that the detection of overlaps and/or responses to such overlaps are to be fully automated, e.g., without requiring additional interactions with the client, in which case the packet processing service may generate the translation mapping 3423 and use it to modify propagated routing information.

Figure 35:
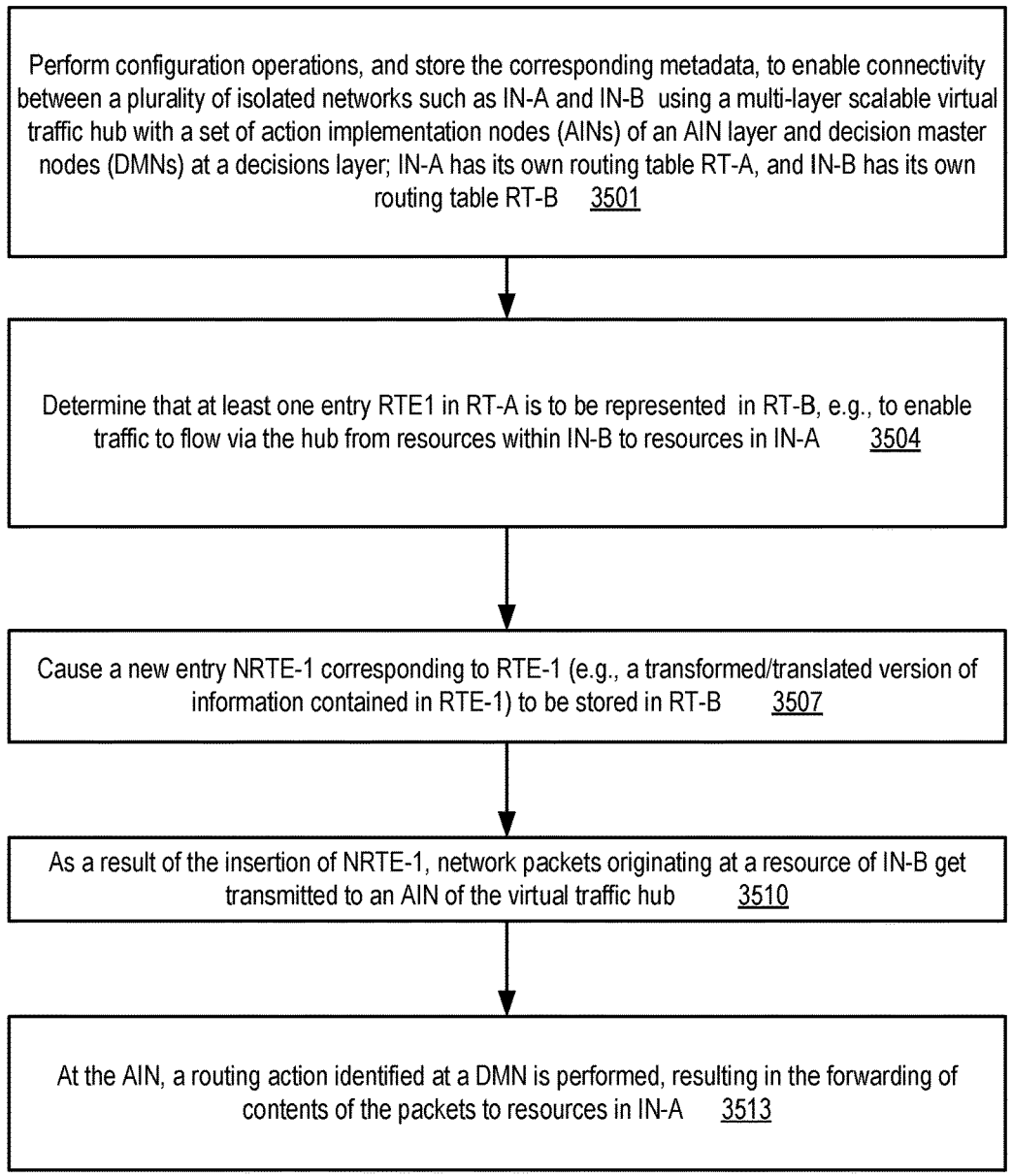
FIG. 35 is a flow diagram illustrating aspects of operations that may be performed at a virtual traffic hub to propagate routing information between isolated networks, according to at least some embodiments.

FIG. 35 is a flow diagram illustrating aspects of operations that may be performed at a virtual traffic hub to propagate routing information between isolated networks, according to at least some embodiments. As shown in element 3501, configuration operations to enable connectivity between a plurality of isolated networks such as IN-A and IN-B using a multi-layer scalable virtual traffic hub (VTH) may be performed in the depicted embodiment, and metadata indicating the establishment of the connectivity may be stored. The VTH may be implemented using a packet processing service similar to PPS 102 shown in FIG. 1, and may comprise a set of action implementation nodes (AINs) of an AIN layer and some number of decision master nodes (DMNs) at a decisions layer. In at least some embodiments, the DMNs may identify or generate actions to be performed at the AINs for various packets or packet flows, and the operations performed at the DMNs may include utilizing a longest prefix match algorithm. The isolated networks connected via the VTH may have their respective routing tables, which may for example be used for transmitting packets within the isolated networks (or to the VTH from the isolated networks) in the depicted embodiment. In the above example scenario, IN-A may have its own routing table RT-A, and IN-B may have its own routing table RT-B. Changes to these isolated-network-level routing tables may be made independently in at least some embodiments, e.g., based on changes to the set of resources deployed/configured in the isolated networks. Note that at least in some embodiments, the VTH itself may maintain a hub-level routing table and/or other routing/forwarding metadata, e.g., for each routing domain for which the VTH is configured as an intermediary between isolated networks.

A determination may be made, e.g., at a route information propagation manager of the VTH or the packet processing service, that at least one entry RTE-1 in one of the isolated-network-level routing tables (e.g., RT-A of IN-A) is to be represented in another isolated-network-level routing table (e.g., RT-B of IN-B) (element 3504). Such a propagation of routing information may be needed, for example, to enable traffic originating at resources of the IN-B to send packets to resources within IN-A. In some embodiments, only a subset of the routing table entries of a given isolated network such as RT-A may have to represented by corresponding entries in RT-B—e.g., some isolated-network-level routing information may not necessarily have to be shared with other isolated networks. In one embodiment, for example, a client may inform the packet processing service programmatically regarding which subsets of route table entries whose information is not to be propagated outside a given isolated network (or specifically which routing information is to be propagated).

The routing information propagation manager, which may for example be implemented using one or more computing devices of the packet processing service's control plane, may cause a new entry NRTE-1 corresponding to RTE-1 to be stored in RT-B (element 3507) in the depicted embodiment. The new entry NRTE-1 may represent at least some of the information that was contained in RTE-1 in the depicted embodiment, but the information may not necessarily be expressed in the same way as it was in RT-A in at least some embodiments—e.g., an address translation mapping may be used to generate NRTE-1 in some cases, or an address of a virtual network interface associated with the VTH may be included in NRTE-1 instead of an address internal to IN-A.

As a result of the insertion of NRTE-1, network packets originating at one or more resources within the isolated network at which NRTE-1 is inserted (e.g., IN-B) may get transmitted to an AIN of the VTH (element 3510) in at least some embodiments. At the AIN, a routing action identified at a DMN may be performed, resulting in the forwarding of contents of the network packets to resources in the isolated network whose information was propagated (e.g., IN-A) in such embodiments. In effect, the automatic propagation of routing information by the packet processing service or the VTH may simplify the task of network administrators of the isolated networks in various embodiments, as the administrators may not have to keep track of all the destinations to which routing changes made locally have to be propagated to enable traffic to flow as intended via the VTH.

Handling DNS Operations Using Virtual Traffic Hubs

Figure 36:
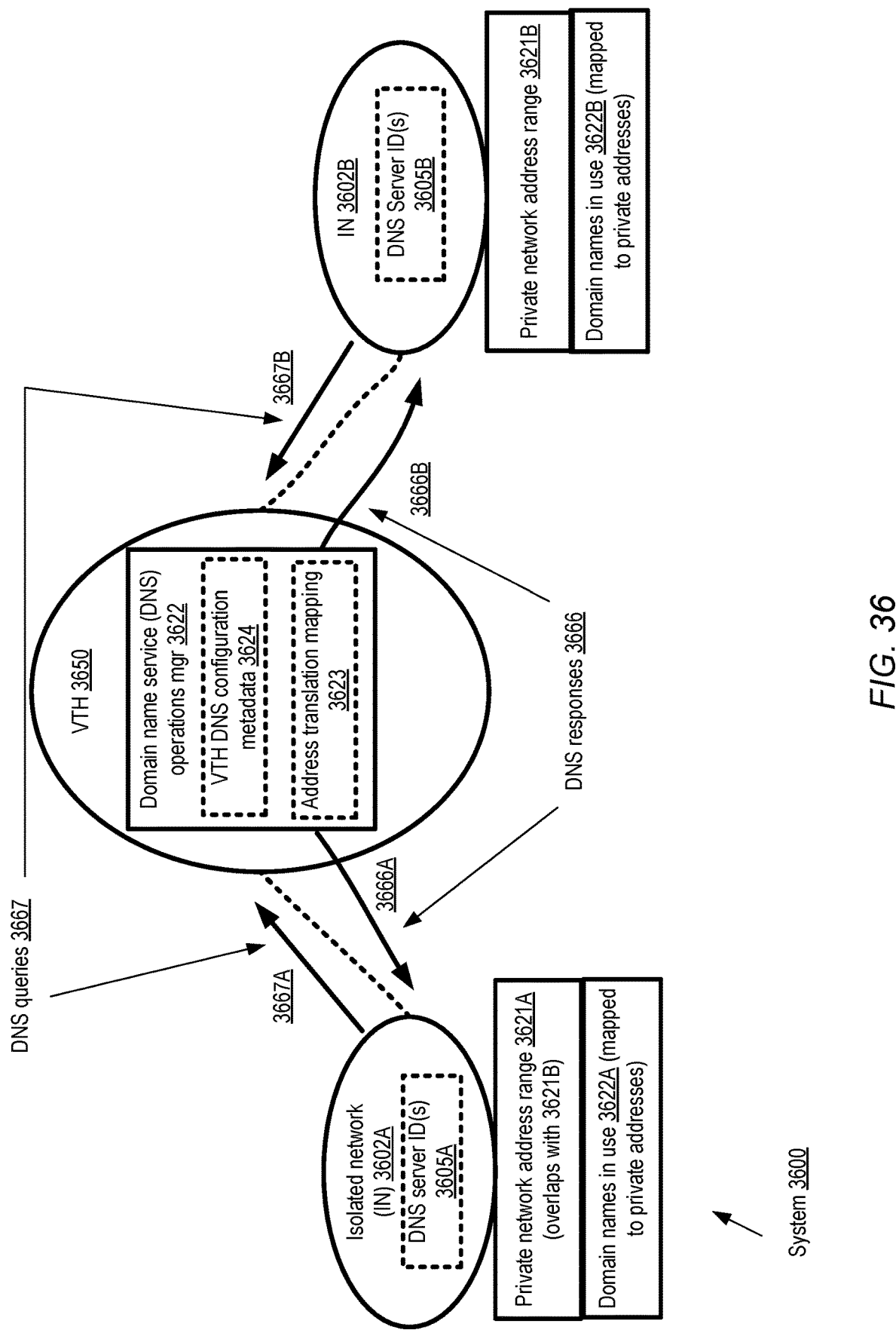
FIG. 36 illustrates an example system environment in which a virtual traffic hub may participate in the distribution of Domain Name System (DNS) information to resources of isolated networks, according to at least some embodiments.

In at some embodiments, a virtual traffic hub that is set up at least in part to route traffic among resources at isolated networks using client-supplied forwarding/routing metadata may also perform other types of networking-related operations, including for example providing DNS (Domain Name System) information. FIG. 36 illustrates an example system environment in which a virtual traffic hub may participate in the distribution of Domain Name System (DNS) information to resources of isolated networks, according to at least some embodiments. As shown, system 3600 may comprise a virtual traffic hub (VTH) 3650 of a packet processing service similar to PPS 102 of FIG. 1. VTH 3650 may be set up, e.g., as a result of a set of configuration operations performed at the packet processing service control plane in response to programmatic requests from clients, to provide connectivity among resources of at least two isolated network (INs) 3602A and 3602B in the depicted embodiment. The VTH 3650 may, for example, comprise several layers including a routing decisions layer with one or more decision master nodes (DMNs) similar to those discussed earlier, and an action implementation layer with one or more action implementation nodes (AINs) similar to those discussed earlier; the DMNs may determine the actions to be implemented for various packet flows, e.g., using forwarding/routing metadata, and the AINs may cache the actions and perform the actions when packets of the corresponding flows are received at the VTH. In at least some embodiments, any combination of the different VTH features discussed earlier, including generating and executing optimized executable actions for forwarding data packets, providing address translations for data packets flowing among the isolated networks, propagating IN-level routing information from one isolated network to another, and so on, may be implemented by VTH 3650 in addition to providing DNS support of the kind discussed below.

The isolated networks (INs) 3602A and 3602B may each have a respective private IP address range 3621, such as ranges 3621A and 3621B, from which addresses may be assigned to individual resources (such as virtual or physical machines) in the respective isolated network. Such private IP address ranges may be selected, for example, by clients on whose behalf the isolated networks are set up, independently for the different isolated networks, and may in some cases overlap with one another. For example, in the embodiment depicted in FIG. 36, at least one address in range 3621A of IN 3602A is also in range 3621B of IN 3602B. Furthermore, in at least some embodiments, as indicated in elements 3622A and 3622B, various resources in one or more of the isolated networks 3602 may have been assigned domain names (e.g., of the form "<xyz>.com") that are mapped to respective private addresses from the ranges 3621. Each of the isolated networks may have its own DNS settings such as a respective set of one or more DNS server identifiers 3605 (e.g., 3605A or 3605B) in at least some embodiments.

The VTH 3650 may comprise a DNS operations manager 3622 in the depicted embodiment, e.g., implemented using some combination of control plane and data plane components (e.g., DMNs and AINs) at one or more computing devices. Any of several different modes of DNS support may be provided using the VTH 3650 in different embodiments, as discussed below in further detail. A set of VTH-specific DNS configuration metadata 3624 may be stored in the depicted embodiment, indicating for example the specific types of DNS message interceptions and/or transformations to be performed, the additional DNS information sources (e.g., one or more managed DNS services implemented by a provider network) to be consulted, and so on. In at least some embodiments, a representation of an address translation mapping 3623 may also be stored to enable overlapping address ranges to be handled, e.g., for straightforward routing purposes as well as for DNS messages.

In various embodiments, the DNS operations manager 3622 may determine that a particular DNS message (e.g., a response 3666 to a DNS query 3667 originating at one of the isolated networks 3602) that is directed towards a resource R1 in one of the INs 3602 is to indicate a resource R2 within one of the other INs (R1 and R2 are not shown in FIG. 36). R2 may have a DNS name D1, for example, and a DNS query to obtain R2's IP address may have been submitted from R1. Furthermore, the operations manager 3622 may determine that within R2's IN, R2 is assigned a private IP address IPAddr1 which falls within the overlapping private IP address range—thus, some other resource R3 in R1's IN may also potentially be assigned the same private IP address IPAddr1. Accordingly, in at least some embodiments, the operations manager 3622 may obtain (e.g., using the address translation mapping 3623) a different or translated version TIPAddr1 of IPAddr1, and cause this modified version TIPAddr1 to be included, instead of IPAddr1, in the DNS message that is delivered to R1. In some embodiments, the translation mapping 3623 used to modify a DNS message may be provided by a client via a programmatic interface. In other embodiments, the VTH may automatically detect overlapping private IP address ranges as discussed above, and may automatically generate an address translation mapping to be used for DNS messages.

According to some embodiments, a system may comprise a set of computing devices of a provider network. The computing devices may include instructions that upon execution on a processor cause the computing devices to perform configuration operations to set up a virtual traffic hub enabling connectivity between at least a first and second isolated networks, and store metadata indicating the hub and its associations. Individual ones of the isolated networks may have respective private network address ranges, from which respective addresses may be assigned to one or more resources (e.g., virtual machines, physical machines etc.) of the isolated networks. In at least some embodiments, the private IP addresses of the different isolated networks associate with the VTH may overlap with one another—e.g., at least one address in one isolated network's address range may also be present in another isolated network's address range. The virtual traffic hub may comprise a plurality of layers including (a) a routing decisions layer at which a routing action for a network packet may be identified/determined and (b) an action implementation layer at which routing actions identified at the routing decisions layer may be performed in at least some embodiments. In at least some embodiments, the actions may be determined at the routing decisions layer based at least in part on employing a longest prefix match algorithm to look up an entry in a set of routing/forwarding entries.

In various embodiments, the computing devices may determine that (a) a particular domain name system (DNS) message, directed to a second resource in the second isolated network, is to include an indication of a first resource of the first isolated virtual network, and that (b) at the first isolated network, the first resource is assigned a first network address within an overlapping private address range. In response, the computing devices may obtain a transformed version of the first network address in at least some embodiments, and cause the transformed version to be included in the particular DNS message delivered to the second resource. Using such an approach, the problem of potentially receiving a DNS response with an IP address which is shared by a local resource (within the second isolated network), when the actual resource for which the query was generated is in another isolated network and happens to be assigned the same IP address as the local resource, may be avoided in various embodiments.

As indicated earlier, DNS support may be provided in several different ways or modes via VTHs in some embodiments, with the particular mode being indicated by a client of the packet processing services via one or more programmatic interfaces. FIG. 37 illustrates examples of programmatic interactions between a client and a packet processing network at which a virtual traffic hub may be used to perform DNS-related operations, according to at least some embodiments. The packet processing service at which VTHs are set up may implement a variety of programmatic interfaces in various embodiments, such as one or more web-based consoles, a set of APIs, command line tools, graphical user interfaces and the like.

Three alternative options A, B and C for setting up VTH-based DNS support programmatically using such programmatic interfaces are shown by way of example in FIG. 37. In Option A, a client 3701 may, for example, submit a programmatic request 3703 (ShareDNSInfo) to the packet processing service (PPS) 3702, indicating that DNS information is to be shared among a specified list of isolated networks associated with a given VTH in some embodiments. In effect, such a programmatic request may allow the packet processing service to start processing DNS requests originating at individual ones of the isolated networks via the VTH. The packet processing service may store metadata indicating that automatic sharing of DNS information is to be implemented, and in at least some embodiments may provide an acknowledgement message 3704, indicating that the requested sharing of DNS information has been initiated. As part of internal operations to implement the requested sharing, in some embodiments routers within the isolated networks may be configured to transmit DNS requests to the VTH (e.g., to one of a set of AINs of the VTH), and executable actions to perform address translations when needed for DNS hosts/resources with overlapping private IP addresses may be generated at DMNs. As a result of storing the metadata indicating the sharing approach, DNS messages may be modified as discussed above to handle overlapping IP addresses.

According to Option B, a special DNS endpoint (e.g., an IP address associated with a particular virtual network interface of the kind discussed earlier) may be established at the VTH, and the DNS servers settings of the isolated network(s) may be set to point to that endpoint in the depicted embodiment. For example, a client 3701 may submit a GetVTH-DNS-Settings request 3708 to the PPS 3702. The PPS 3702 may provide the DNS endpoint information, e.g., via VTH-DNS-EndpointInfo message 3709 to the client. The client 3701 may then change an isolated network's DNS settings, e.g., using a SetIsolatedNetworkDNSServer message 3710 directed to the control plane 3702 of the isolated network itself. As a result, metadata entries indicating that the VTH (via its DNS endpoint) is to be used as a DNS server for requests originating in the isolated network may be stored in the depicted embodiment. In some embodiments, the VTH may be used as the primary DNS server for the isolated network, while in other embodiments the VTH may be included as a non-primary DNS server, to which DNS queries may be directed only if the isolated network's primary DNS server is unable to resolve the queries.

According to Option C of FIG. 37, a client 3701 may not necessarily change DNS settings, but may instead simply submit an InterceptDNSResponsesAtVTH request 3721 via a programmatic interface to the PPS 3702. Such a request may, for example, indicate that responses to DNS requests from sources outside an isolated network are to be intercepted at the VTH, and modified as and when needed, e.g., to handle overlapping private IP addresses in scenarios similar to those discussed earlier. In response, the PPS 3702 may store metadata indicating that such interceptions are to be performed (e.g., using combinations of DMNs and AINs), perform one or more networking configuration operations at the isolated networks associated with the VTH to cause at least a subset of DNS messages to be directed to the VTH, and provide an acknowledgement message 3723 (DNSInterceptionInitiated) indicating that the requested types of interceptions have been begun in the depicted embodiment. Other types of programmatic interactions, not shown in FIG. 37, may be employed in some embodiments to configure VTHs to perform various types of DNS operations.

Figure 38:
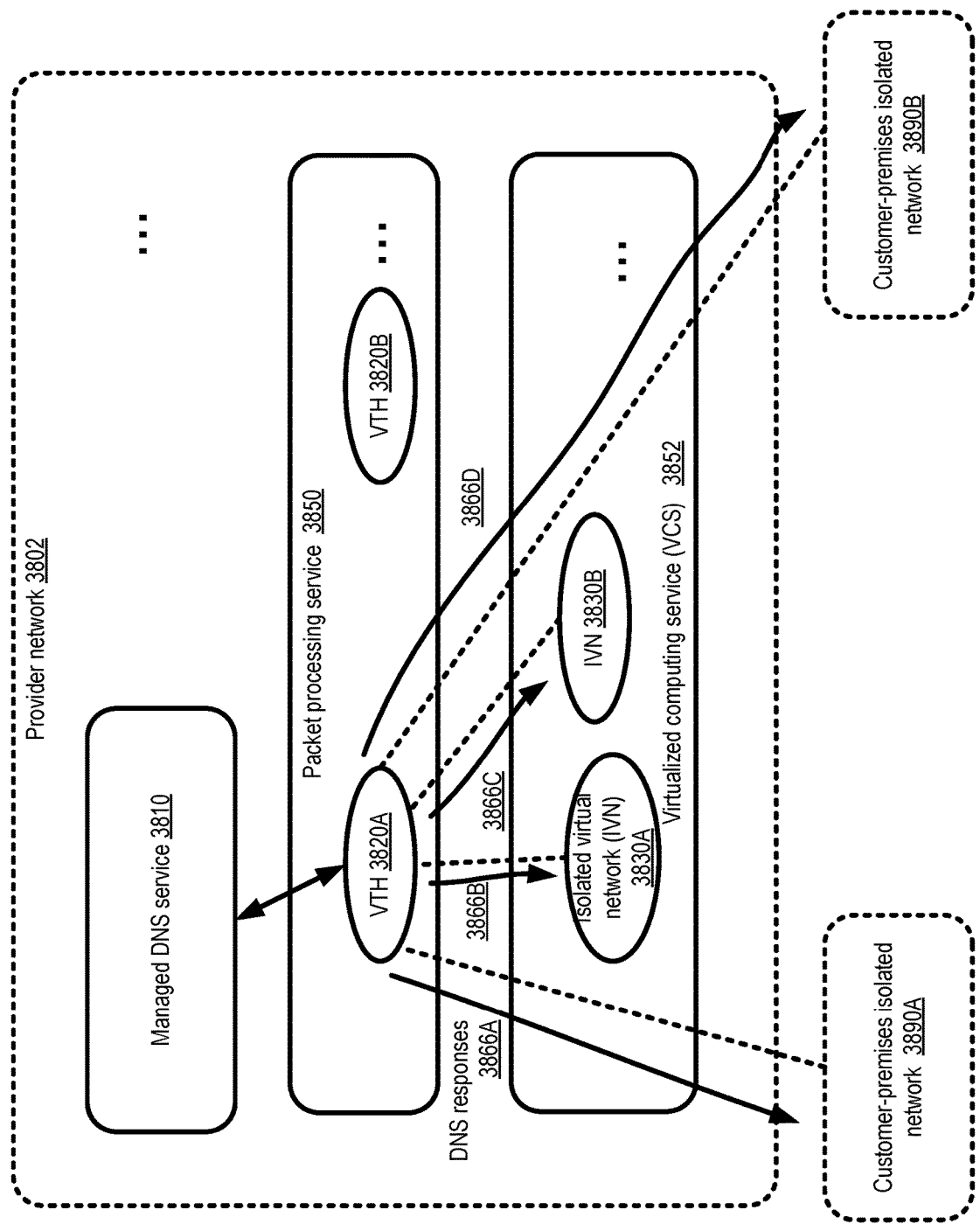
FIG. 38 illustrates an example use of a virtual traffic hub to provide DNS information to isolated networks within and outside a provider network, according to at least some embodiments.

As discussed earlier, in at least some embodiments a packet processing service used for instantiating VTHs may be implemented at a provider network. FIG. 38 illustrates an example use of a virtual traffic hub to provide DNS information to isolated networks within and outside a provider network, according to at least some embodiments. In the depicted embodiment, provider network 3802 may comprise a plurality of network-accessible service, some of which may utilize other services—for example, a managed DNS service 3810 and/or the packet processing service 3850 may comprise virtual machines set up using the virtualized computing service 3852. As discussed earlier, e.g., in the context of FIG. 3, in at least some embodiments VTHs 3820, such as 3820A or 3820B, may be set up to process packets transmitted among a set of isolated virtual networks (IVNs), such as IVNs 3830A or 3830B established on behalf of various clients of the virtualized computing service 3852.

In the depicted embodiment, isolated networks 3890, such as 3890A or 3890B, set up at customer premises external to the provider network 3802, may also be connected to each other (and to IVNs 3830) via the VTHs 3820. Generally speaking, any combination of isolated virtual networks 3830 of the VCS 3852 and/or external (e.g., customer-premise) isolated networks may be associated programmatically with a VTH such as 3820A in the depicted embodiment, and DNS support may be provided via the VTH to resources within any of the IVNs or external isolated networks. For example, hosts or virtual machines may be assigned domain names mapped to private IP addresses in IVN 3830A, IVN 3830B, customer-premises isolated network 3890A, and/or customer-premises isolated network 3890B in the depicted embodiment. The different isolated networks associated with a given VTH 3820 may each have private IP address ranges which may overlap with one another in at least some embodiments. DNS queries regarding the domain names being used for resources in any of the isolated networks shown may also originate at any of the isolated networks; e.g., a query for a domain name set up in network 3890A may originate at a resource in network 3890B or 3830A, and a query for a domain name set up in network 3830A may originate at a resource in network 3890A or 3830B. The VTH 3820A may determine when an IP address included in a DNS message directed to any of the isolated networks needs to be modified, e.g., to deal with overlapping IP addresses in the manner discussed above, and apply the necessary address transformations to the DNS messages (e.g., DNS responses 3866A, 3866B, 3866C or 3866D) in the depicted embodiment.

In at least some embodiments, one or more of the IP addresses included in a DNS message may be obtained at a VTH 3820 from a managed DNS service 3810 of the provider network. Such a managed DNS service 3810 may, for example, be used by entities that host applications using the VCS 3852 for their own end-user customers, so that the end user customers can access the applications using domain names rather than IP addresses. The managed DNS service 3180 may also interact seamlessly with other parts of the computing infrastructure of the provider network, such as load balancing services, health management services and the like to help with routing application requests to the appropriate VCS resources in at least some embodiments. In at least some embodiments, the managed DNS service may store DNS records for domain names configured within various isolated networks, such as networks 3830 and/or 3890. A VTH 3820 may act as a client of the managed DNS service in some embodiments, and use information obtained from the managed DNS service to prepare DNS responses to be provided to resources within the isolated networks. In other embodiments, the VTH 3820 may serve as an intermediary between the isolated networks and the managed DNS service.

Figure 39:
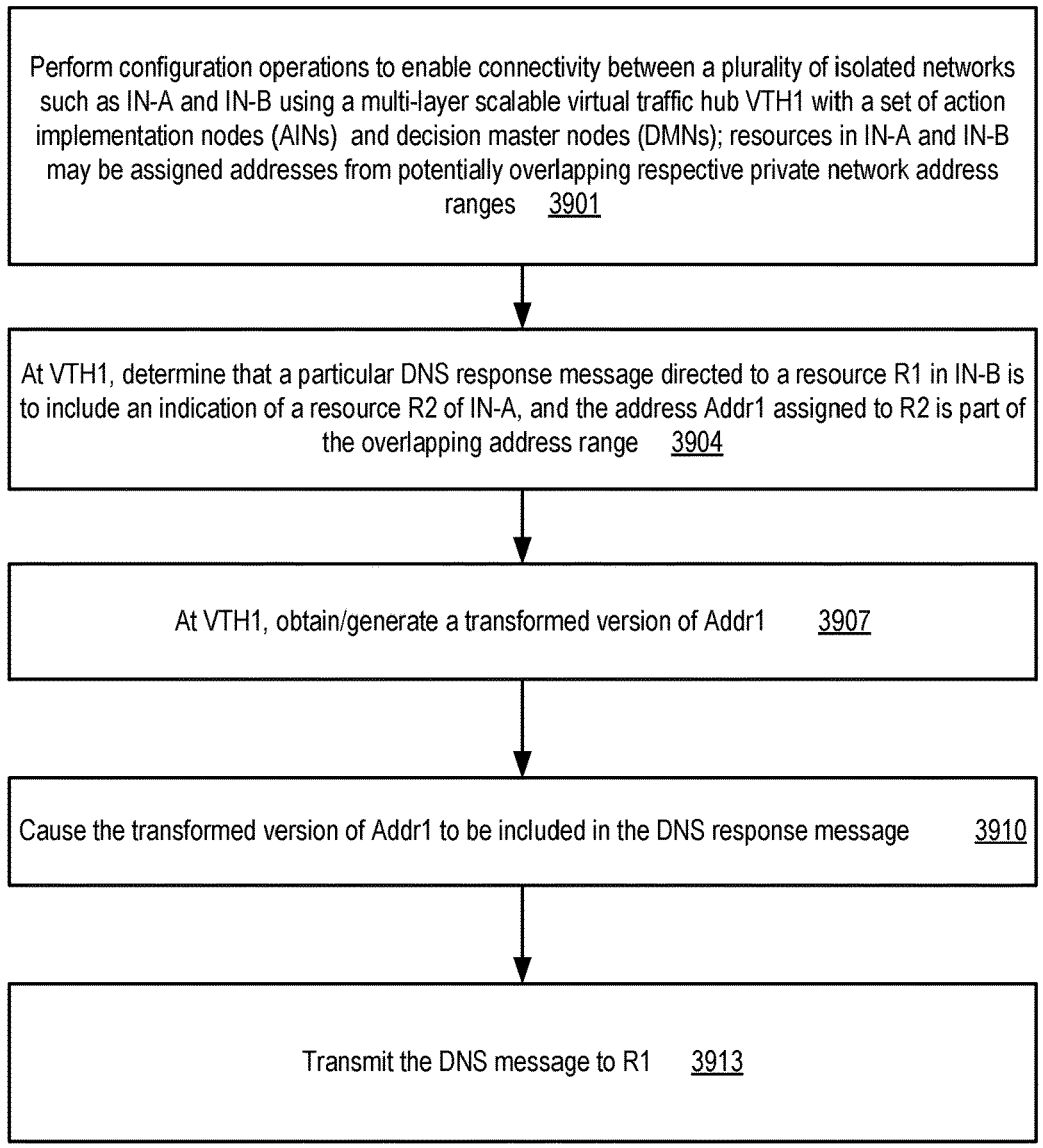
FIG. 39 is a flow diagram illustrating aspects of operations that may be performed at a virtual traffic hub to propagate DNS information to resources at isolated networks, according to at least some embodiments.

FIG. 39 is a flow diagram illustrating aspects of operations that may be performed at a virtual traffic hub to propagate DNS information to resources at isolated networks, according to at least some embodiments. As shown in element 3901, a set of configuration operations may be performed, e.g., at a packet processing service similar to PPS 102 of FIG. 1, to enable connectivity between a plurality of isolated networks such as IN-A and IN-B using a multi-layer scalable virtual traffic hub VTH1. VTH1 may, for example, be assigned a set of action implementation nodes (AINs) and decision master nodes (DMNs) as discussed earlier. Resources in IN-A and IN-B may be assigned addresses from potentially overlapping respective private network address ranges in various embodiments.

At VTH1, a determination may be made that a particular DNS message directed to a resource R1 in IN-B is to include an indication of a resource R2 of IN-A, and that the private address Addr1 assigned to R2 is part of an overlapping address range (element 3904). A transformed version of Addr1 may be generated or obtained at VTH1, e.g., using an address translation mapping that may have been provided by a client or may have been produced at VTH1 (element 3907). VTH1 may cause the transformed version of Addr1 to be included in the DNS response message (element 3910), and the DNS response message may be sent on to R1 in the depicted embodiment (element 3913).

It is noted that in various embodiments, at least some operations other than those illustrated in the flow diagrams of FIG. 15, FIG. 26, FIG. 30, FIG. 35 and/or FIG. 39 may be used to implement the packet processing-related and/or DNS-related techniques described above. Some of the operations shown may not be implemented in some embodiments or may be implemented in a different order, or in parallel rather than sequentially.

Use Cases

The techniques described above, of using isolated packet processing cells to implement instances of various types of networking applications such as virtual traffic hubs may be useful in a variety of scenarios. As more and more distributed applications are migrated to provider network environments, especially environments in which isolated virtual networks can be established for different clients, the need for efficient and fault-tolerant management of packet transformation operations is also increasing. The clean separation of function between a fast action implementation layer and a decision making layer may simplify the rollout of new functionality or additional nodes at the various layers without affecting the work being done at the other layers. A wide variety of client-selected customized packet processing operations, e.g., associated with Layer 3 of the Internet networking protocol stack or its equivalent in other protocol stacks, may be implemented efficiently using the described techniques, including for example virtual routing applications, multicast applications and the like. Clients of a packet processing service may not be required to deal with such problems as possible overlaps among private address ranges used in isolated networks, the propagating of route changes from one isolated network to another, and/or the propagation of DNS information to resources within isolated networks.

The overall responsiveness of applications that utilize the packet processing operations may be improved, e.g., by quickly adding packet processing resources as the application workload increases. The security of networking applications may be enhanced by isolating the set of resources utilized for a given instance of an application. Further, the user experience of system administrators and/or application owners may be improved by providing configuration information and metrics separately on a per-application-instance level.

Illustrative Computer System

Figure 40:
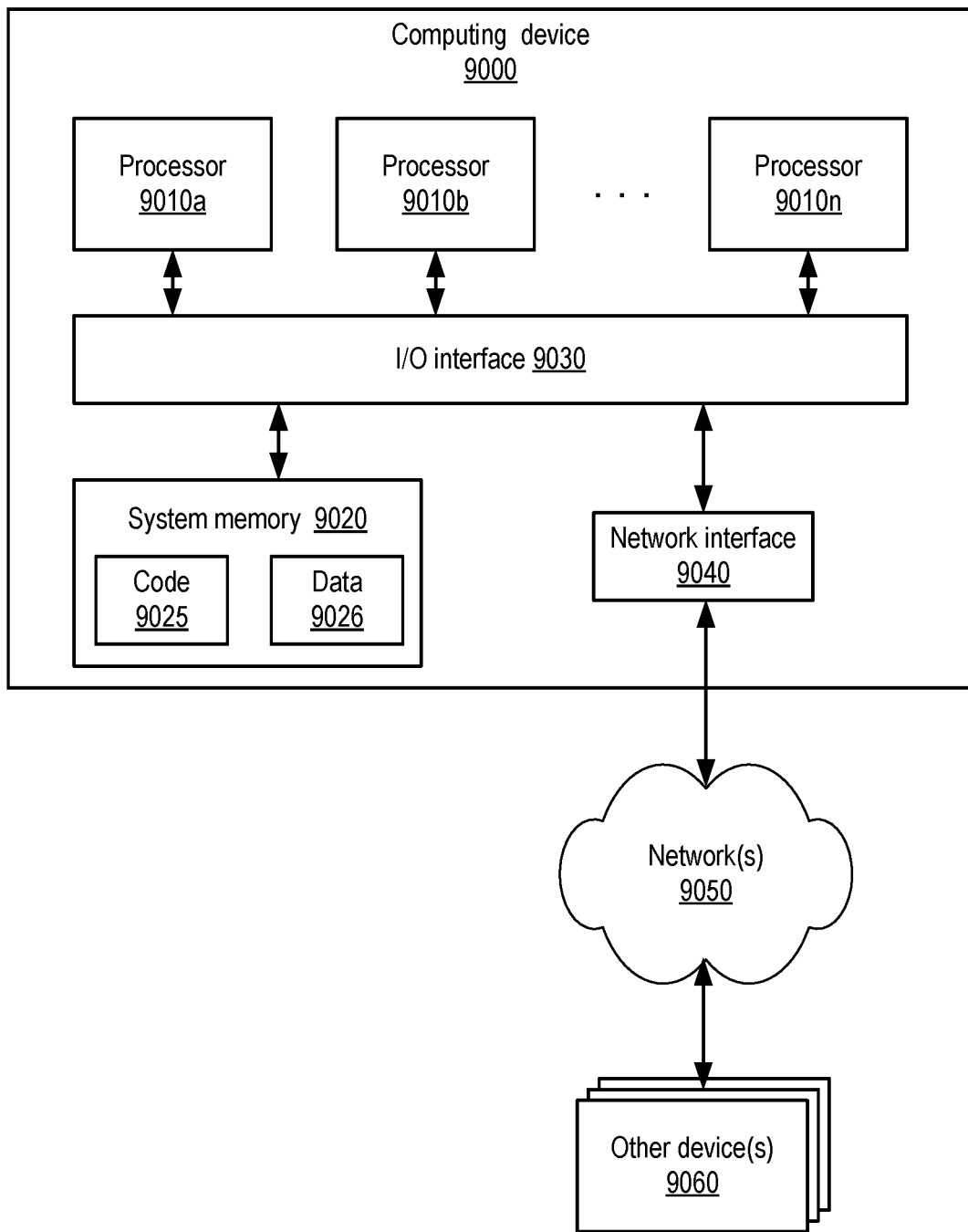
FIG. 40 is a block diagram illustrating an example computing device that may be used in at least some embodiments.

In at least some embodiments, a server that implements a portion or all of one or more of the technologies described herein, including the various data plane and control plane components of packet processing services and client-side devices that may interact programmatically with such services, may include a general-purpose computer system that includes or is configured to access one or more computer-accessible media. FIG. 40 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 39, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 39 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 40 may be used to implement the described functionality in various embodiments; for example, software components running on a variety of different devices and servers may collaborate to provide the functionality. In at least one embodiment, one or more non-transitory computer-accessible storage media may comprise program instructions that when executed on one or more processors cause one or more computer systems (e.g., systems comprising one or more computing devices similar to that shown in FIG. 40) to implement portions or all of the described functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a packet processing service of a provider network;
   wherein the one or more computing devices include instructions that upon execution on a processor cause the one or more computing devices to:
      in response to a programmatic request to configure a first virtual traffic hub as an intermediary for network traffic between a plurality of isolated networks, store metadata indicating (a) at least a first action implementation node assigned to the first virtual traffic hub, and (b) at least a first routing decision master node assigned to the first virtual traffic hub;
      propagate, to the first routing decision master node, respective sets of state information entries for a first isolated network;
      obtain, at the first action implementation node, a first executable action from the first routing decision master node, wherein the first executable action is to be implemented for one or more packets of a first network flow, wherein the first executable action is generated at the first routing decision master node based at least in part on the respective sets of state information entries, and wherein an indication of semantics of the first executable action is not provided to the first action implementation node;
      store, in a flow-indexed cache of the first action implementation node, the first executable action;
      cause, based at least in part on implementing the first executable action at the first routing action implementation node, contents of one or more data packets of the first network flow to be transmitted to a second isolated network.

2. The system as recited in claim 1, wherein the instructions upon execution on a processor cause the one or more computing devices to:
   generate, at the first decision master node, one or more executable instructions of the first executable action using an instruction set of an in-kernel register-based virtual machine optimized for network processing.

3. The system as recited in claim 1, wherein the first action implementation node comprises a plurality of execution engines including a first execution engine, wherein the instructions upon execution on the processor cause the one or more computing devices to:
   instantiate, at the first action implementation node, respective flow-indexed caches corresponding to individual ones of the execution engines;
   utilize, at the first action implementation engine, a deterministic mapping function to determine that a first execution engine is to assigned to process packets of the first network flow, wherein input to the deterministic mapping function comprises one or more flow identification packet headers, wherein the first executable action is stored by the first execution engine in a corresponding flow-indexed cache without acquiring a lock, and wherein, upon obtaining a data packet of the first network flow, the first execution engine performs a lookup operation in the first flow-indexed cache without acquiring a lock.

4. The system as recited in claim 1, wherein a path to the second isolated network comprises at least a second action implementation node.

5. The system as recited in claim 1, wherein the instructions upon execution on a processor cause the one or more computing devices to:
   obtain, via a programmatic interface, one or more routing information base (RIB) entries associated with an isolated network;
   generate, using the one or more routing information entries, one or more forwarding information base (FIB) entries; and
   transmit, to the first routing decision master node, the one or more forwarding information base entries, wherein the one or more forwarding base entries are included in the network state information entries.

6. A method, comprising:
   performing, at one or more computing devices:
      storing metadata indicating (a) at least a first action implementation node is assigned to a virtual traffic hub which is programmatically associated with one or more isolated networks, and (b) at least a first routing decision master node is assigned to the first virtual traffic hub;
      obtaining, at the first action implementation node, a representation of a first action from the first routing decision master node, wherein the first action is to be implemented for a first network flow, and wherein the first action is determined at the first routing decision master node using state information of the one or more isolated networks;
      causing, based at least in part on performing the first action at the first action implementation node, contents of one or more data packets received from a first isolated network to be transmitted to a second isolated network, wherein the one or more packets are part of the first network flow.

7. The method as recited in claim 6, further comprising performing, by the one or more computing devices:

in response to an attachment request received via a programmatic interface, storing metadata indicating that a first virtual network interface associated with the first isolated network has been programmatically attached to the first virtual traffic hub, wherein at least one packet of the first network flow is directed to the first action implementation node via the first virtual network interface after the programmatic attachment is completed.

8. The method as recited in claim 7, further comprising performing, by the one or more computing devices:
utilizing a poll mode driver to obtain the at least one packet via the first virtual network interface.

9. The method as recited in claim 6, further comprising performing, by the one or more computing devices:
in response to a hub linkage request received via a programmatic interface, storing metadata indicating that a path between the first virtual traffic hub and a second virtual traffic hub has been configured, wherein the second virtual traffic hub is associated with a third isolated network; and
causing, based at least in part on performing a second executable action at the first action implementation node, contents of one or more data packets received from the first isolated network to be transmitted to a second action implementation node assigned to the second virtual traffic hub.

10. The method as recited in claim 6, further comprising performing, by the one or more computing devices:
obtaining, via a programmatic interface, one or more entries of one or more of: (a) a route table of the first isolated network or (b) a forwarding information base of the first isolated network; and
propagating, to one or more decision master nodes of the first virtual traffic hub, including the first decision master node, the state information of the one or more isolated networks, wherein the state information comprises the one or more entries.

11. The method as recited in claim 6, further comprising performing, by the one or more computing devices:
obtaining, via one or more programmatic interactions, an indication of a first routing domain and a second routing domain associated with the first virtual traffic hub, wherein the first routing domain includes the first and second isolated networks, and wherein the second routing domain includes a third isolated network and a fourth isolated network; and
transmitting contents of network packets between isolated networks of individual ones of the routing domains, without crossing routing domain boundaries.

12. The method as recited in claim 6, wherein the first action implementation node is configured within a provider network, and wherein the first isolated network is external to the provider network.

13. The method as recited in claim 6, wherein the representation of the first action comprises an executable program which is expressed in an instruction set of an in-kernel register-based virtual machine optimized for network processing.

14. The method as recited in claim 6, wherein the first isolated network comprises a first isolated virtual network established at a virtualized computing service of a provider network, and wherein the second isolated network comprises a second isolated virtual network established at the virtualized computing service.

15. The method as recited in claim 6, further comprising:
in response to a second programmatic request, modifying one or more of: (a) the number of action implementation nodes assigned to the first virtual traffic hub, or (b) the number of decision master nodes assigned to the first virtual traffic hub.

16. Non-transitory computer-accessible storage media storing program instructions that when executed on one or more processors cause one or more computer systems to:
store metadata indicating that (a) at least a first action implementation node is assigned to a virtual traffic hub which is programmatically associated with one or more isolated networks, and (b) at least a first routing decision master node is assigned to the virtual traffic hub;
obtain, at the first action implementation node, a representation of a first action from the first routing decision master node, wherein the first action is to be implemented for a first network flow, and wherein the first action is determined at the first routing decision master node using state information of the one or more isolated networks;
cause, based at least in part on performing the first action at the first action implementation node, contents of one or more data packets received from a first isolated network to be transmitted to a second isolated network, wherein the one or more packets are part of the first network flow.

17. Non-transitory computer-accessible storage media as recited in claim 16, wherein the program instructions when executed on one or more processors cause the one or more computer systems to:
store, in a cache at the first action implementation node, an entry comprising (a) the representation of the first action and (b) a usage timing record of the first action; and
remove, from the cache after the first action has been performed with respect to one or more data packets, the entry based at least in part on a determination that the usage timing record indicates that the first action meets an eviction criterion.

18. Non-transitory computer-accessible storage media as recited in claim 16, wherein the first action implementation node is instantiated at a first host, wherein the first virtual traffic hub is established on behalf of a first client of a network-accessible service of a provider network, wherein the program instructions when executed on one or more processors cause the one or more computer systems to:
instantiate, at the first host, a second action implementation node assigned to a second virtual traffic hub, wherein the second virtual traffic hub is established on behalf of a second client of the network-accessible service.

19. Non-transitory computer-accessible storage media as recited in claim 16, wherein the program instructions when executed on one or more processors cause the one or more computer systems to:
transmit, from the first action implementation node in response to receiving a first packet of the first network flow, a first action query to the first routing decision master node, wherein the first action query comprises at least a portion of the first packet;
transmit, from the first routing decision master node to the first action implementation node in response to the first action query, a first message followed by a second message, wherein the first message comprises the representation of the first action, and wherein the second message comprises at least the portion of the first packet;

store the representation of the first action in a cache by the first action implementation node in response to receiving the first message from the first routing decision master node; and retrieve, from the cache, the representation of the first action by the first action implementation node in response to receiving the second message from the first routing decision master node.

20. Non-transitory computer-accessible storage media as recited in claim 16, wherein the program instructions when executed on one or more processors cause the one or more computer systems to:

provide, via a programmatic interface, one or more packet processing metrics of the virtual traffic hub, wherein the packet processing metrics include one or more of: (a) a number or rate of packets received at the virtual traffic hub from one or more isolated networks during a time interval, (b) a number or rate of packets transmitted from the virtual traffic hub to one or more isolated networks during a time interval, or (c) a number or rate of received packets for which no corresponding outbound packets were transmitted from the virtual traffic hub during a time interval.

* * * * *